US012226055B2

(12) United States Patent
Yoo et al.

(10) Patent No.: US 12,226,055 B2
(45) Date of Patent: Feb. 18, 2025

(54) AIR CIRCULATION APPARATUS AND RELATED METHODS

(71) Applicant: LG ELECTRONICS INC., Seoul (KR)

(72) Inventors: Hyun sun Yoo, Seoul (KR); Seung Yup Lee, Seoul (KR); Sang Yoon Lee, Seoul (KR); Byung Soo Oh, Seoul (KR); Hyun-Joo Jeon, Seoul (KR); So Ra Cheon, Seoul (KR); Ji sun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1199 days.

(21) Appl. No.: 17/014,439

(22) Filed: Sep. 8, 2020

(65) Prior Publication Data

US 2021/0289997 A1 Sep. 23, 2021

Related U.S. Application Data

(60) Provisional application No. 62/992,138, filed on Mar. 19, 2020.

(30) Foreign Application Priority Data

Apr. 29, 2020 (KR) ........................ 10-2020-0052552

(51) Int. Cl.

| | |
|---|---|
| ***A47K 10/48*** | (2006.01) |
| ***A47K 3/28*** | (2006.01) |
| ***E03C 1/04*** | (2006.01) |
| ***F26B 3/04*** | (2006.01) |

(52) U.S. Cl.

CPC .............. *A47K 10/48* (2013.01); *A47K 3/281* (2013.01); *E03C 1/0408* (2013.01); *F26B 3/04* (2013.01)

(58) Field of Classification Search

CPC ........ A47K 10/48; A47K 3/281; A47K 3/288; B01D 5/0027; B01D 5/0042; B01D 5/0072; B01D 5/009; A61L 9/20; E03C 1/0408; F26B 3/04; F24F 1/0014; F24F 13/12; A45D 20/16; B60S 3/002

See application file for complete search history.

(56) References Cited

U.S. PATENT DOCUMENTS

| | | | | | |
|---|---|---|---|---|---|
| 4,961,272 | A * | 10/1990 | Lee | A47K 10/48 | 34/239 |
| 6,154,916 | A * | 12/2000 | Ayers | B60S 3/002 | 15/312.1 |
| 8,973,286 | B1 * | 3/2015 | Hyde | D06F 58/30 | 68/5 R |
| 2003/0234100 | A1 * | 12/2003 | Ross | A47K 10/48 | 62/331 |

* cited by examiner

*Primary Examiner* — Edelmira Bosques
*Assistant Examiner* — Bao D Nguyen
(74) *Attorney, Agent, or Firm* — Bryan Cave Leighton Paisner LLP

(57) ABSTRACT

An air circulation system includes at least one flow generator to generate an airflow, an air inlet, a first air outlet and a second air outlet each for exhausting airflow, an air conditioning device to air condition the exhausted airflow, and a controller. The controller is configured to position at least one of the first and second air outlets to be vertically separated from each other and to operate the flow generator to provide the exhaust airflow to the first and second air outlets. The exhaust airflow from the first and second air outlets are of different temperatures.

17 Claims, 56 Drawing Sheets

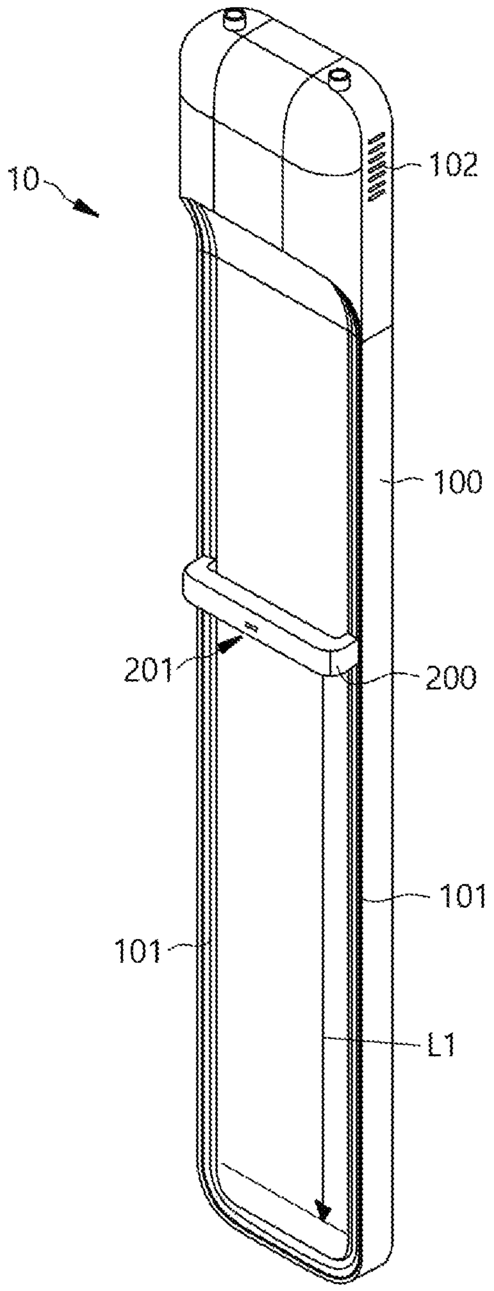
[Fig 1]

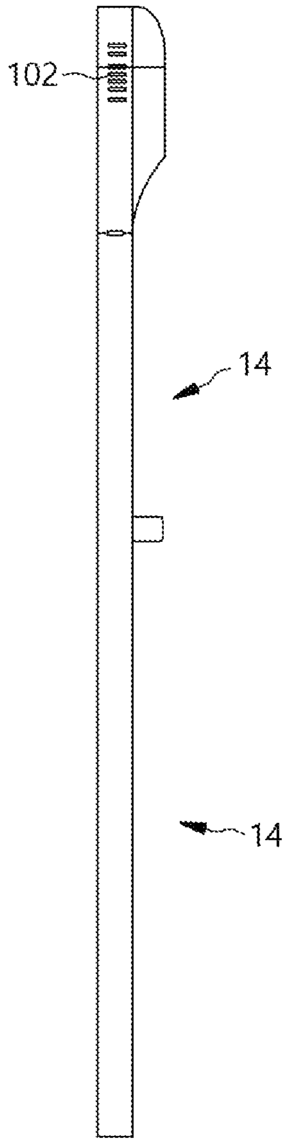
[Fig 2]

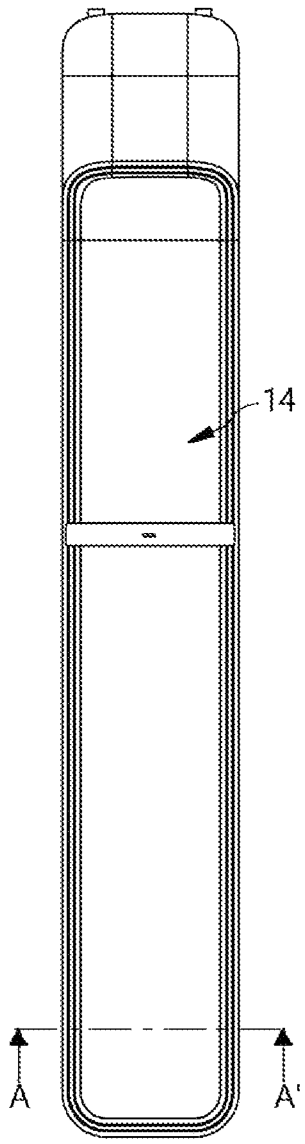
[Fig 3]

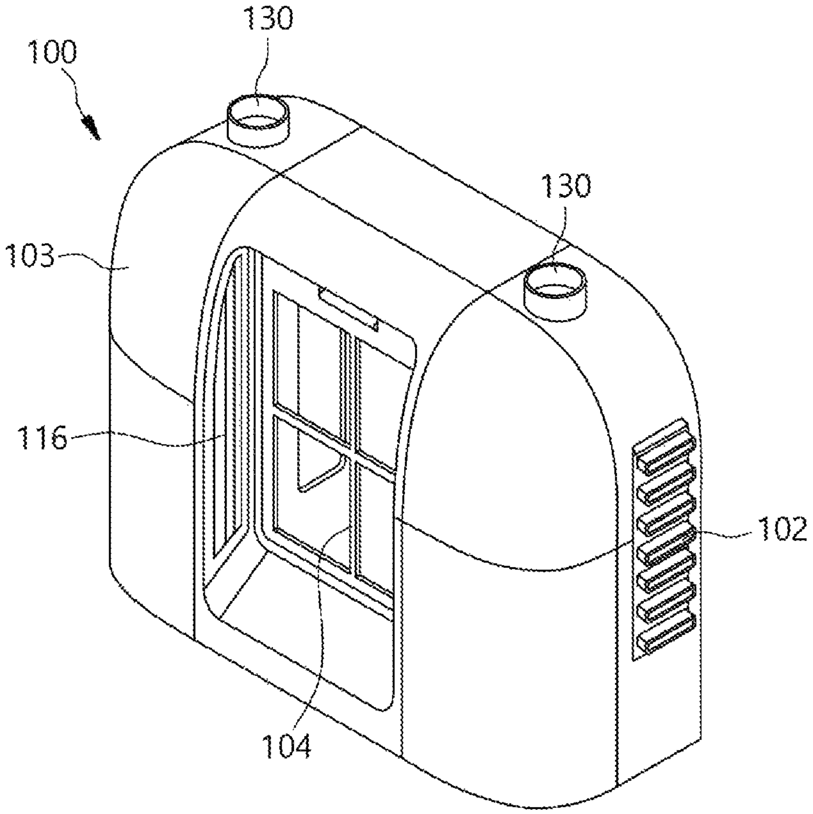
[Fig 4]

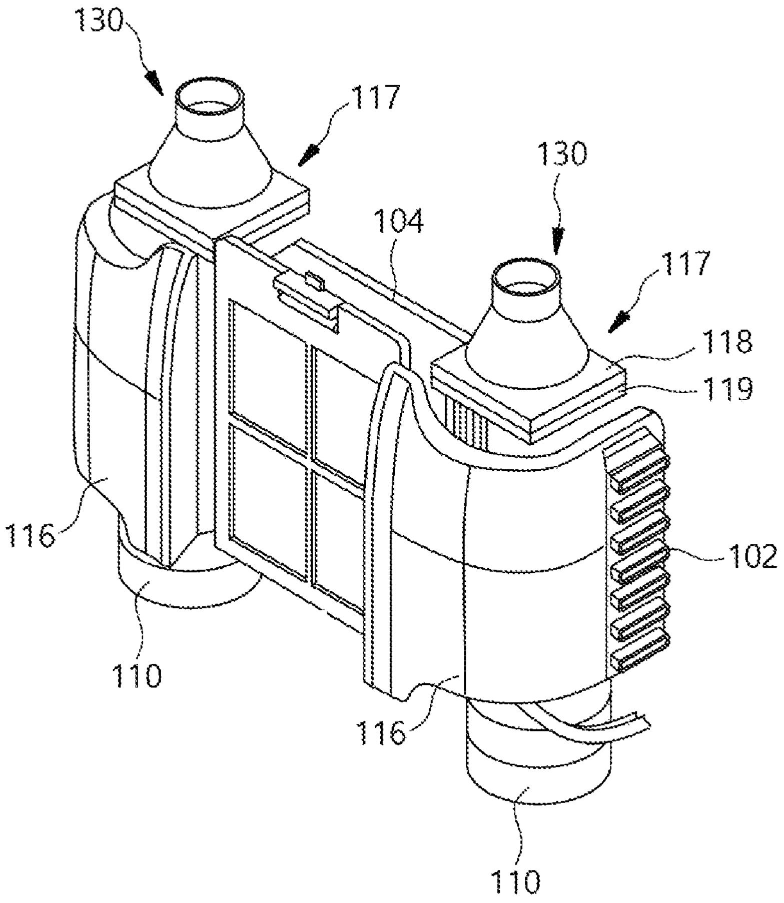
[Fig 5]

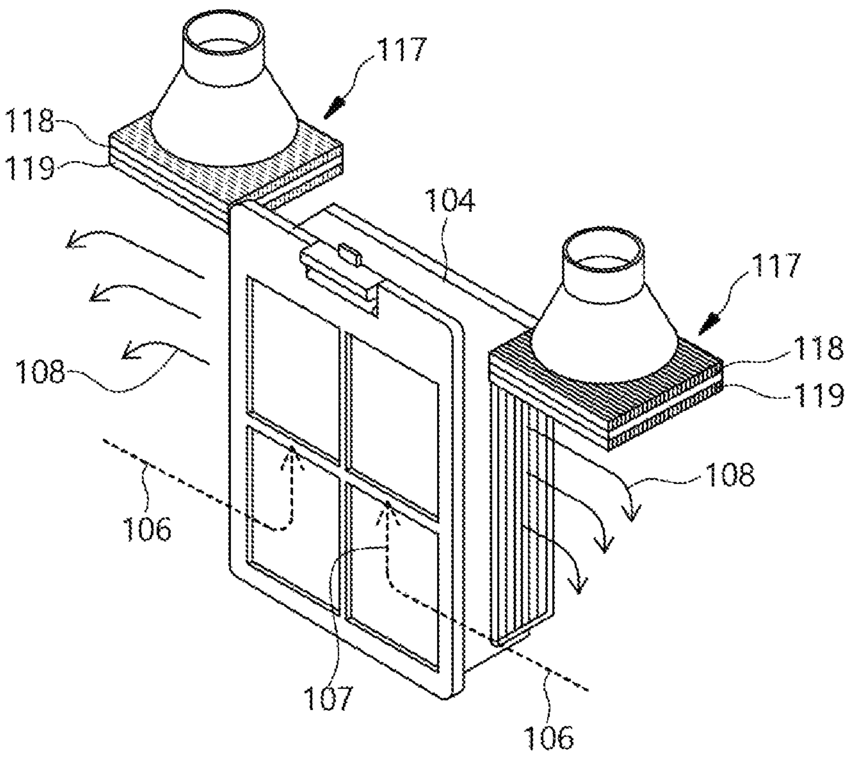
[Fig 6]

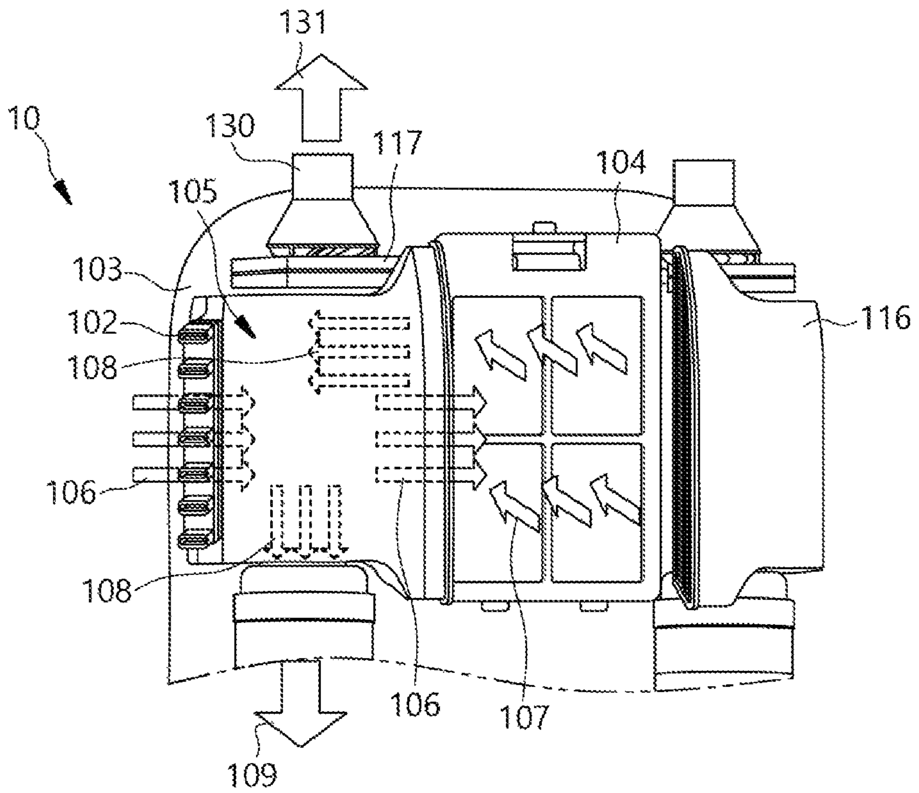
[Fig 7]

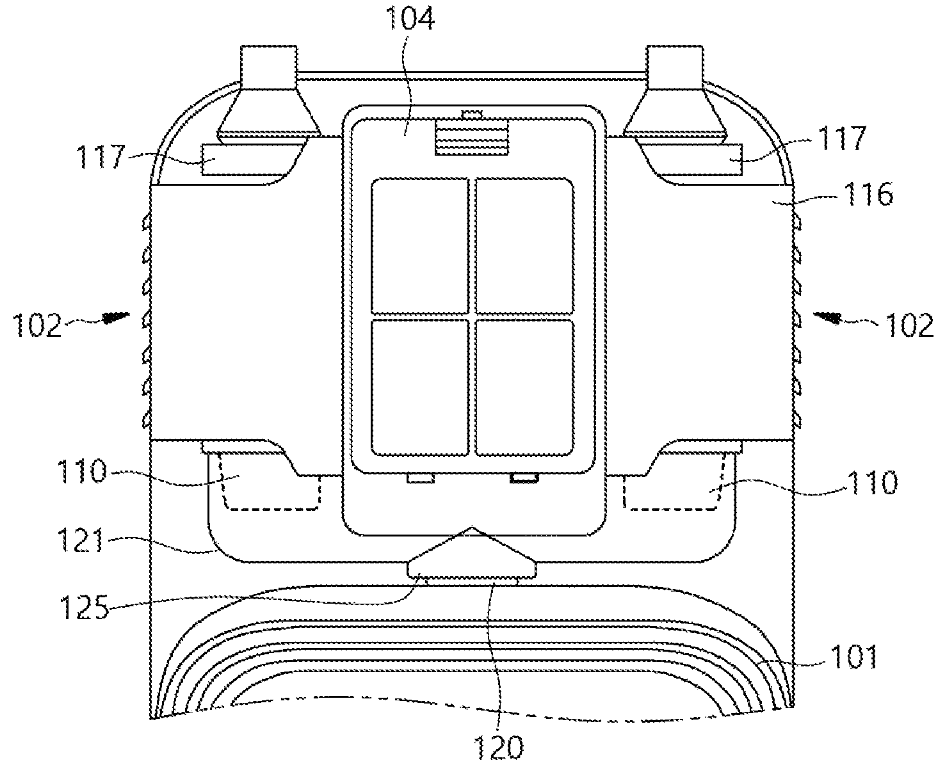
[Fig 8]

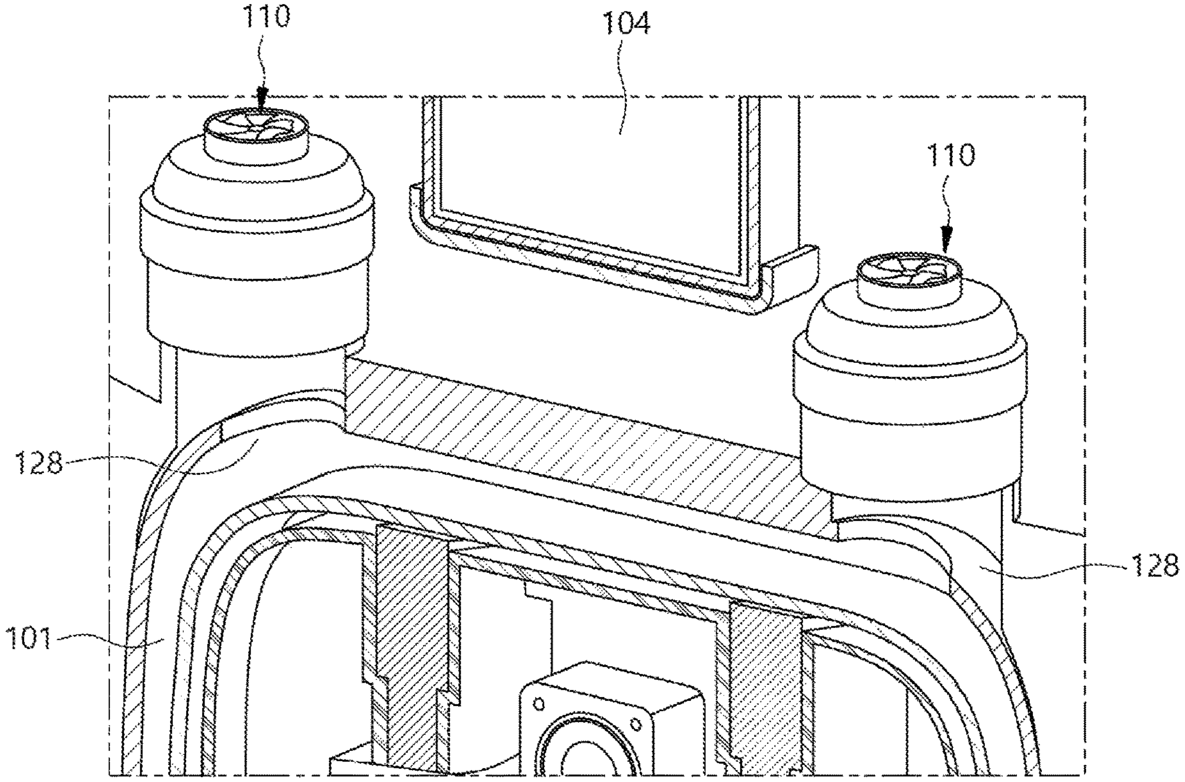
[Fig 9a]

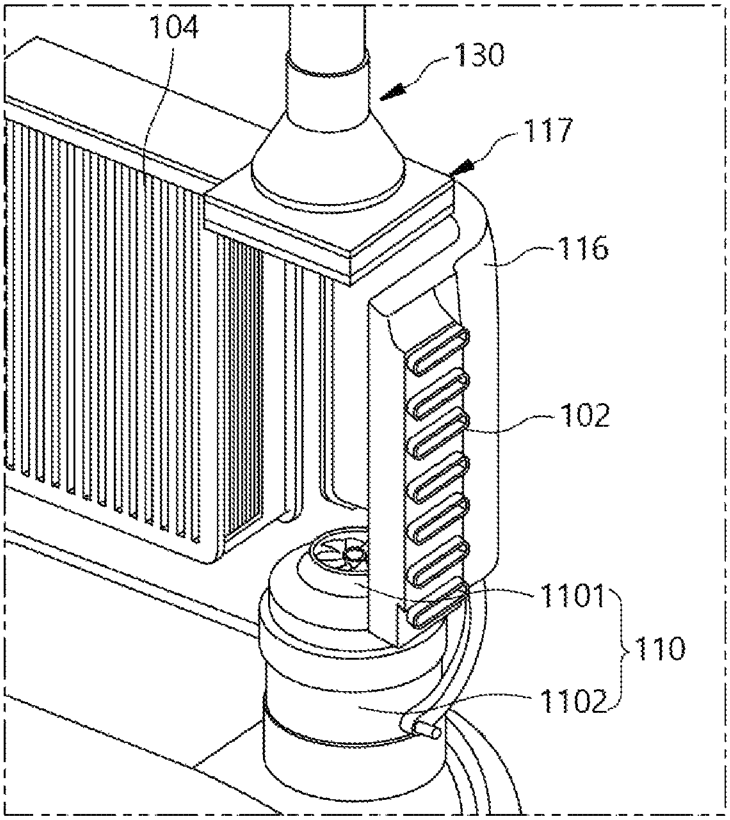
[Fig 9b]

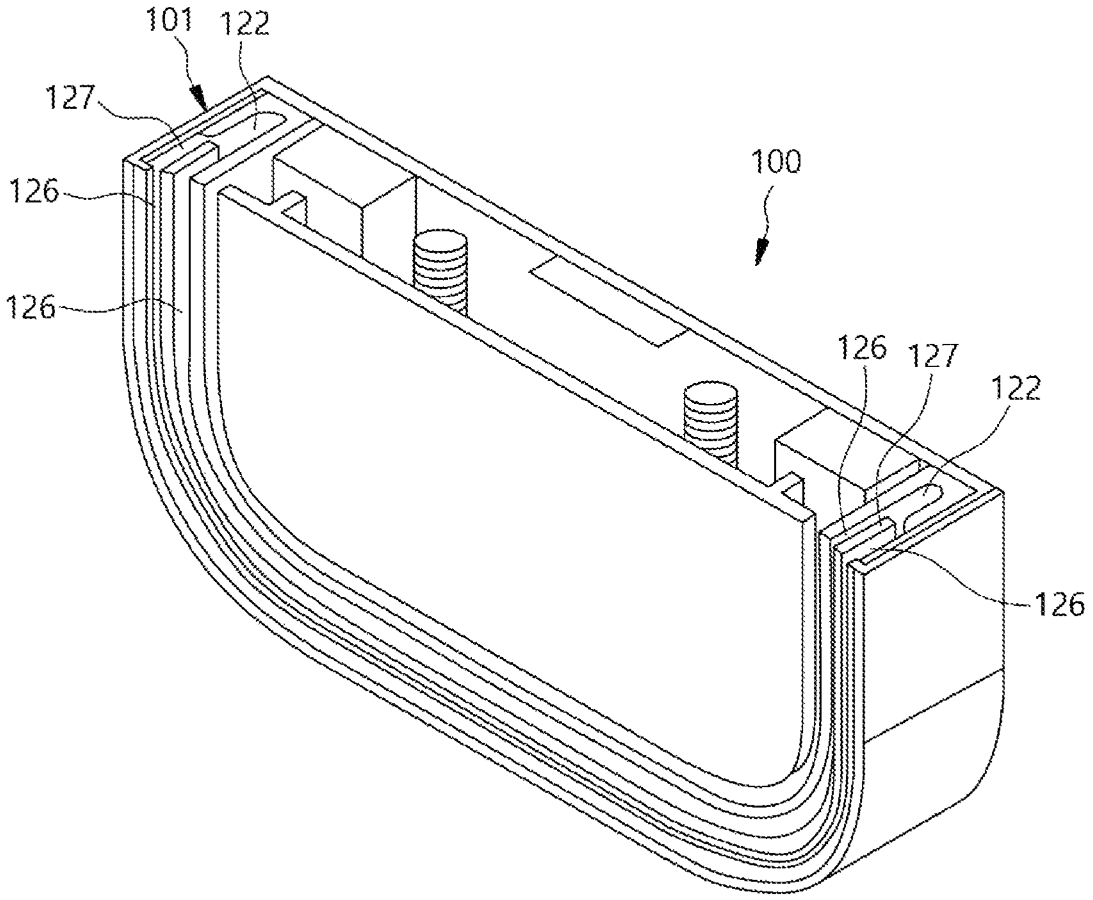
[Fig 10]

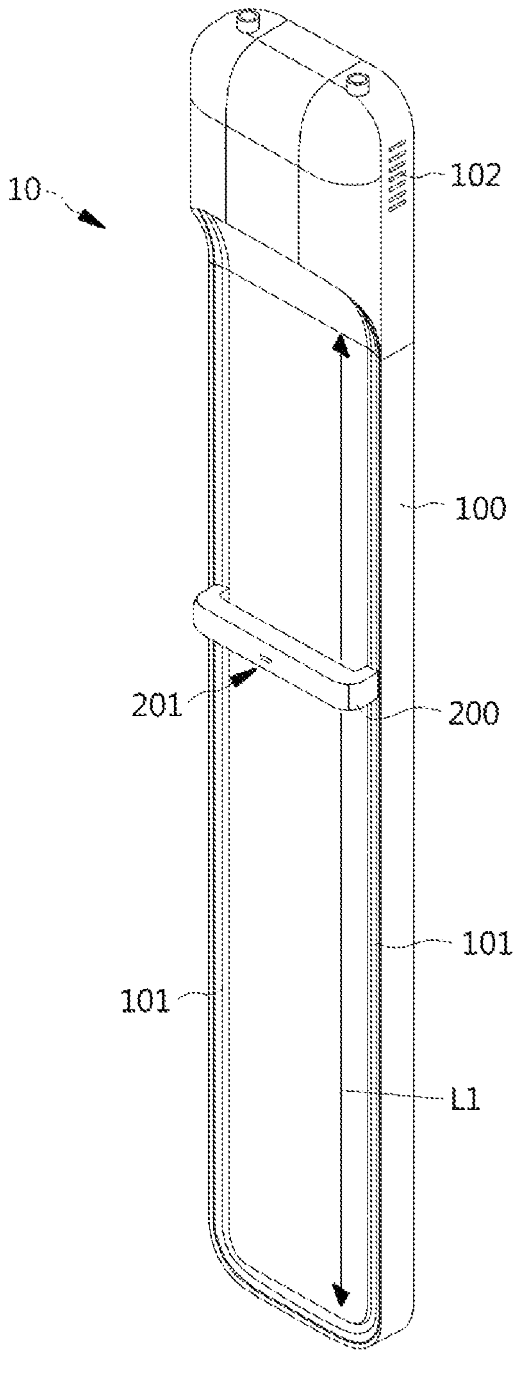
[Fig 11A]

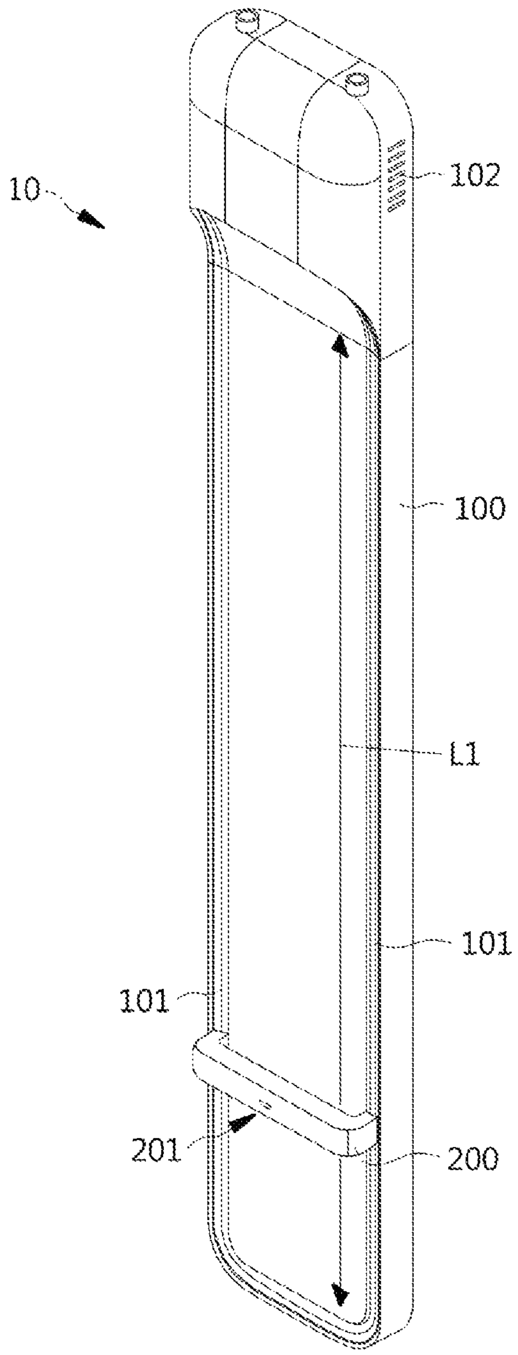
[Fig 11B]

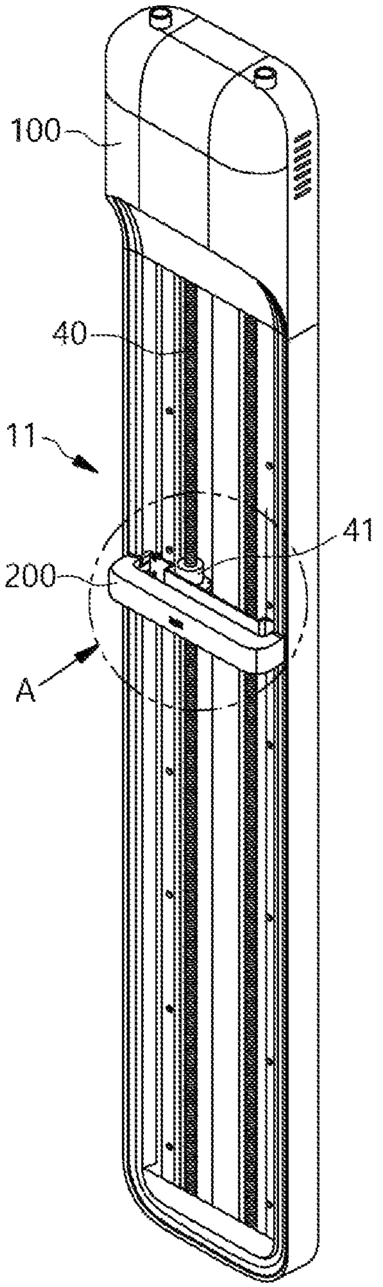
[Fig 12A]

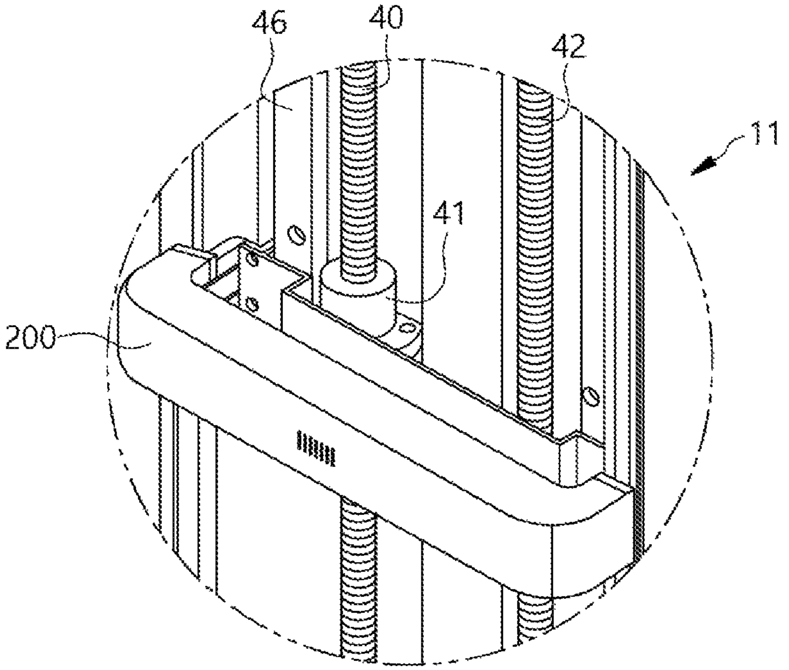
[Fig 12B]

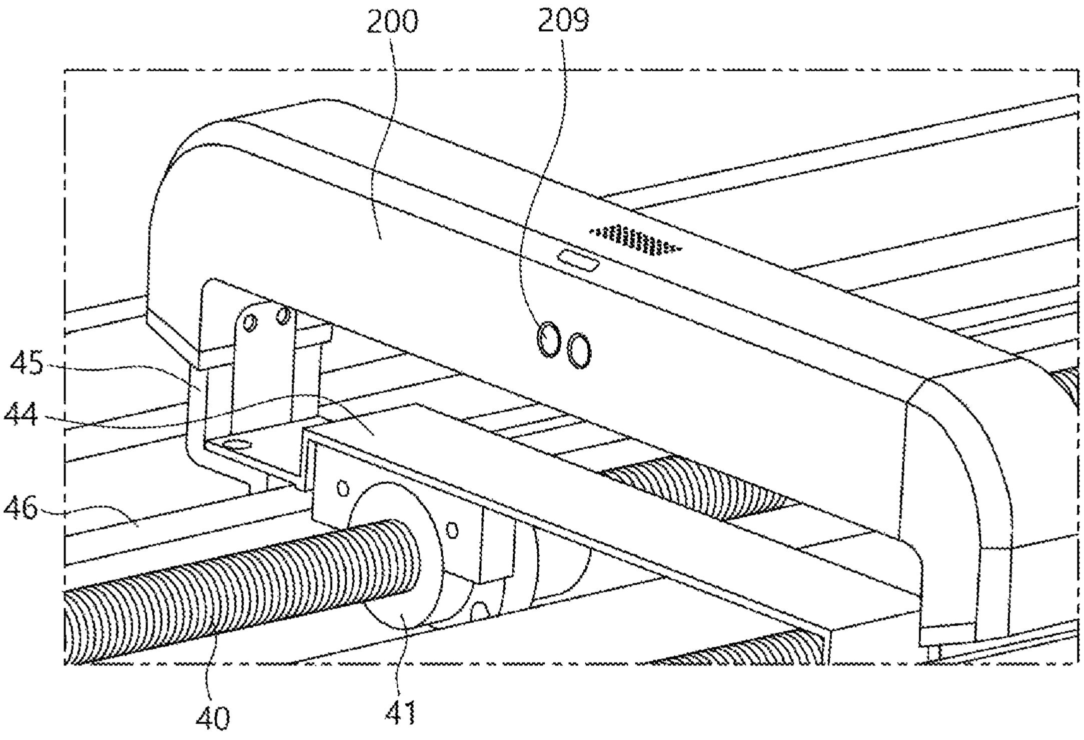
[Fig 12C]

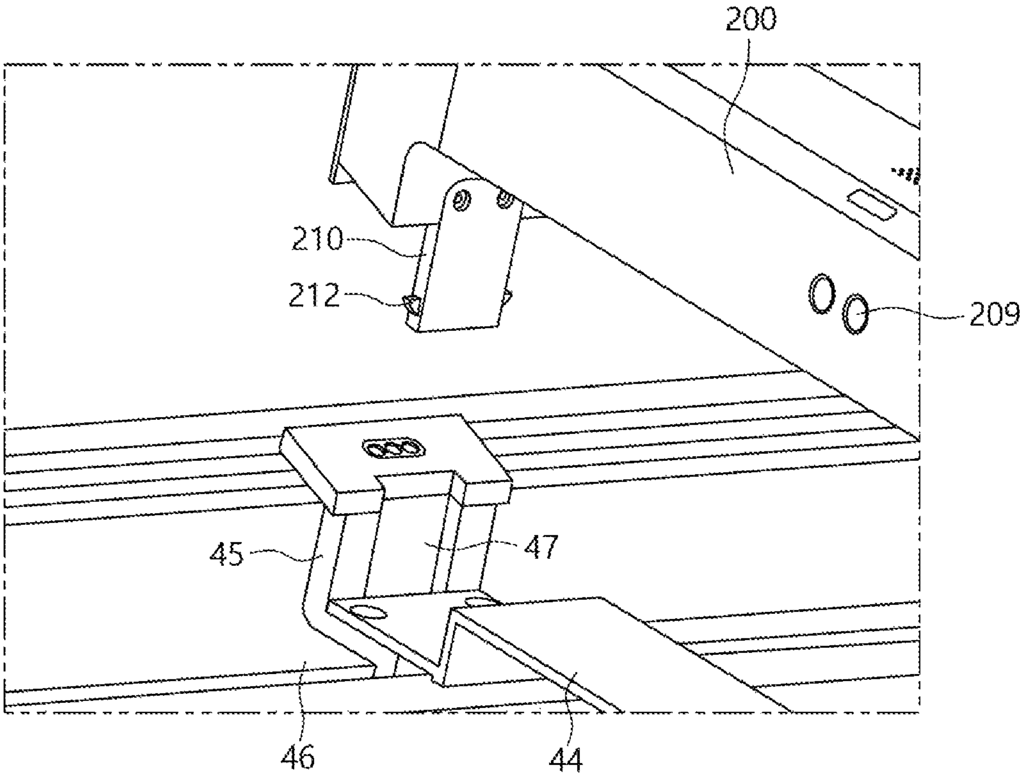
[Fig 12D]

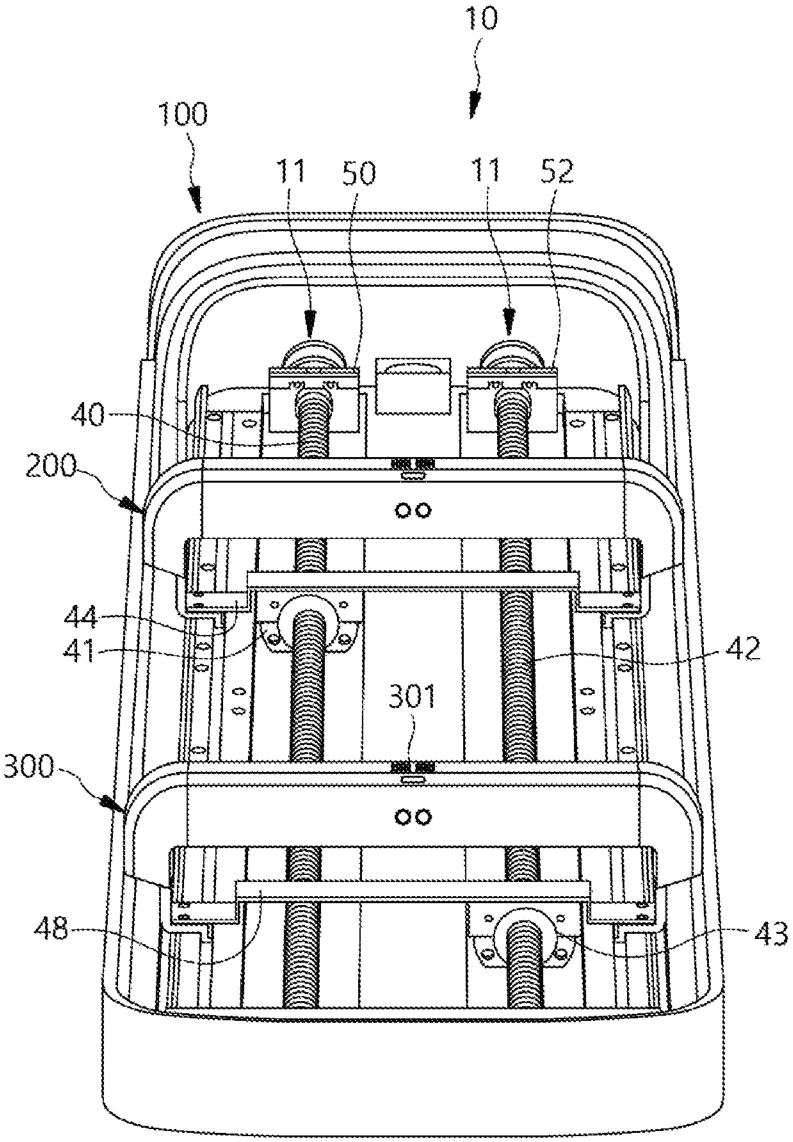
[Fig 13]

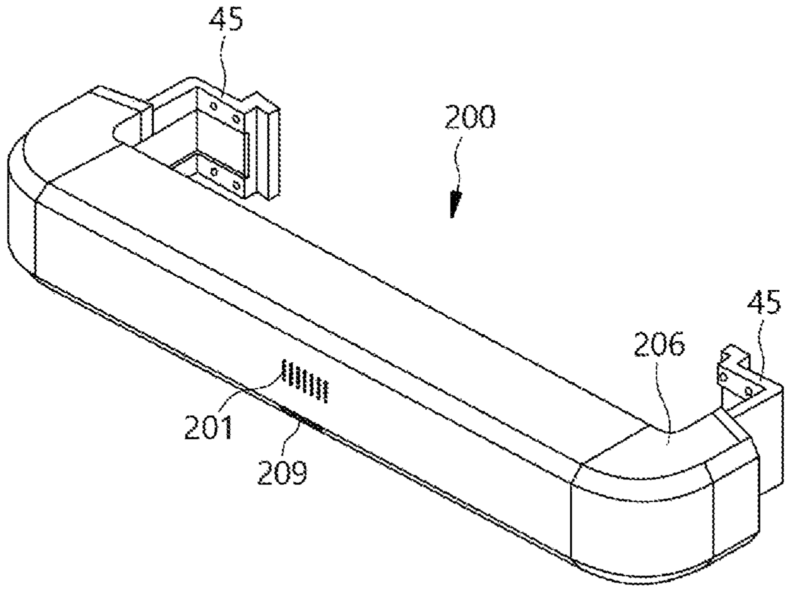
[Fig 14]

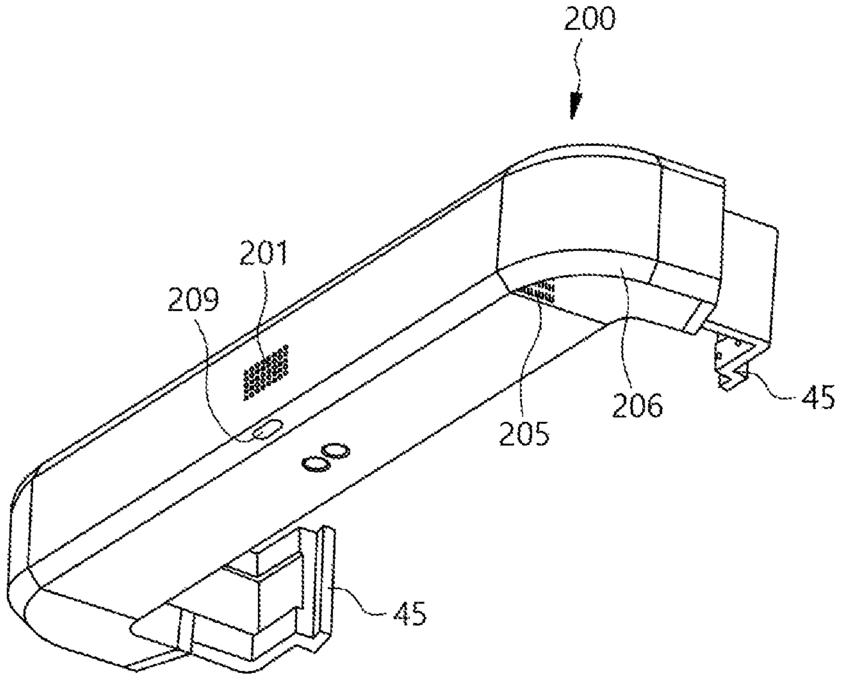
[Fig 15]

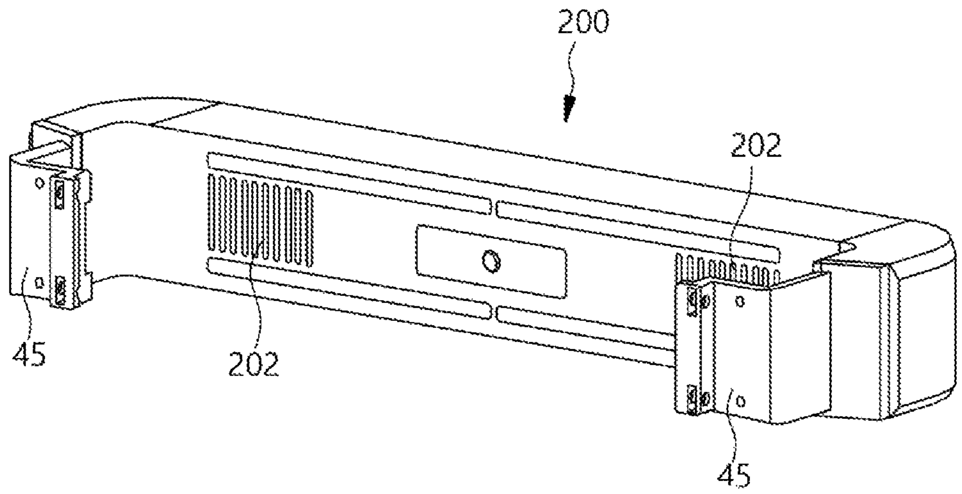
[Fig 16]

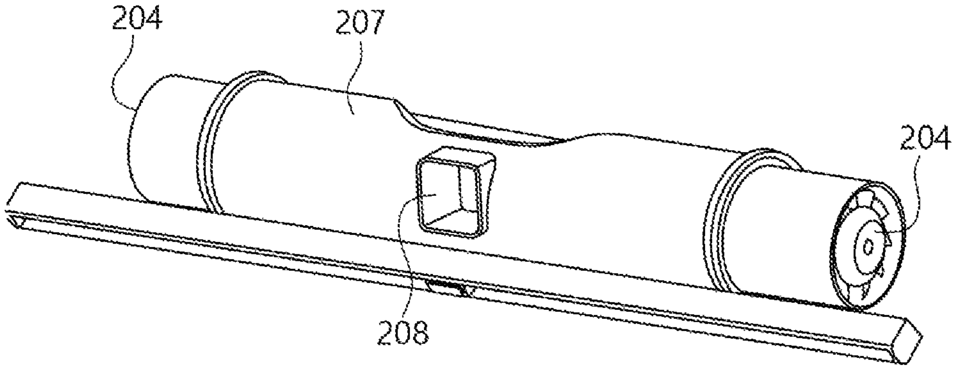
[Fig 17]

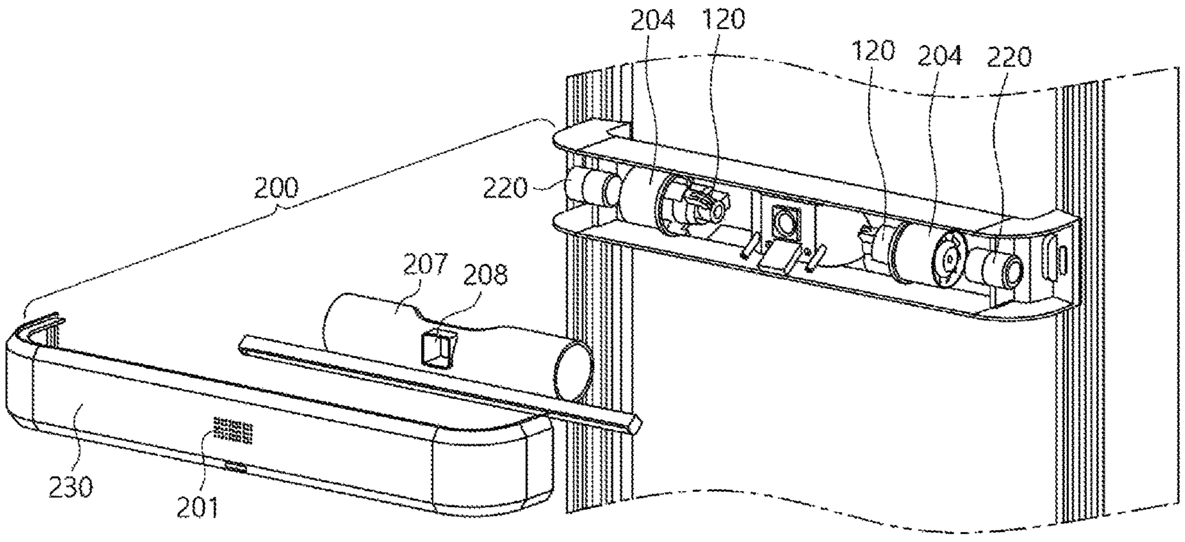
[Fig 18]

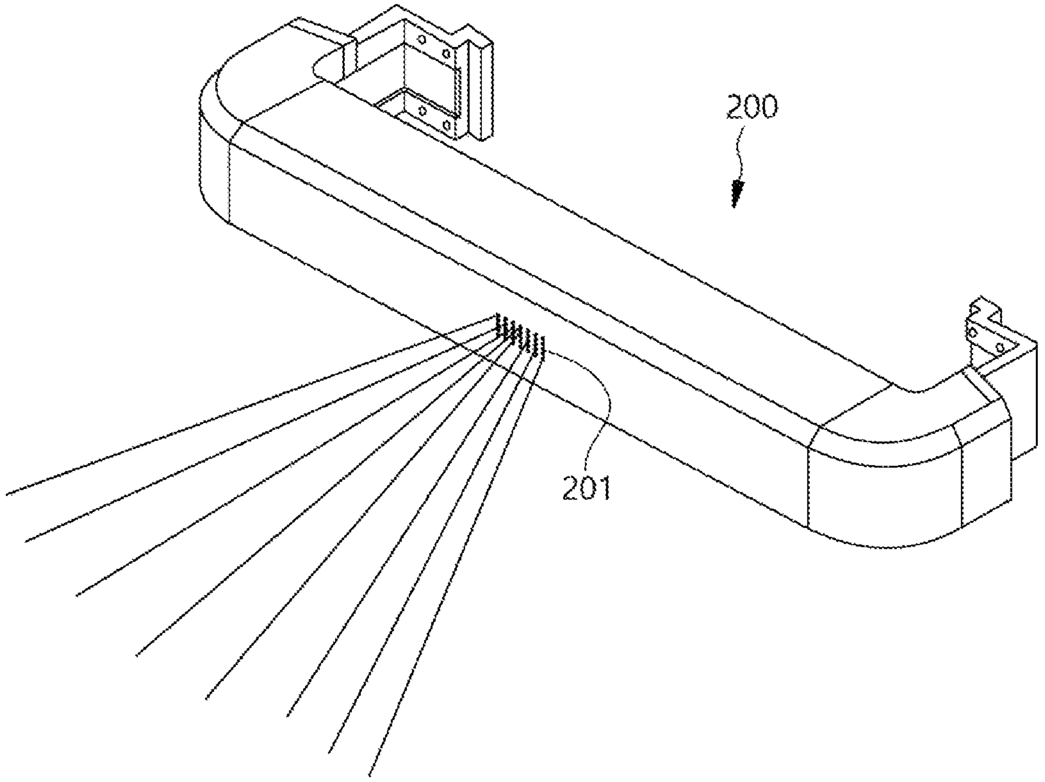
[Fig 19]

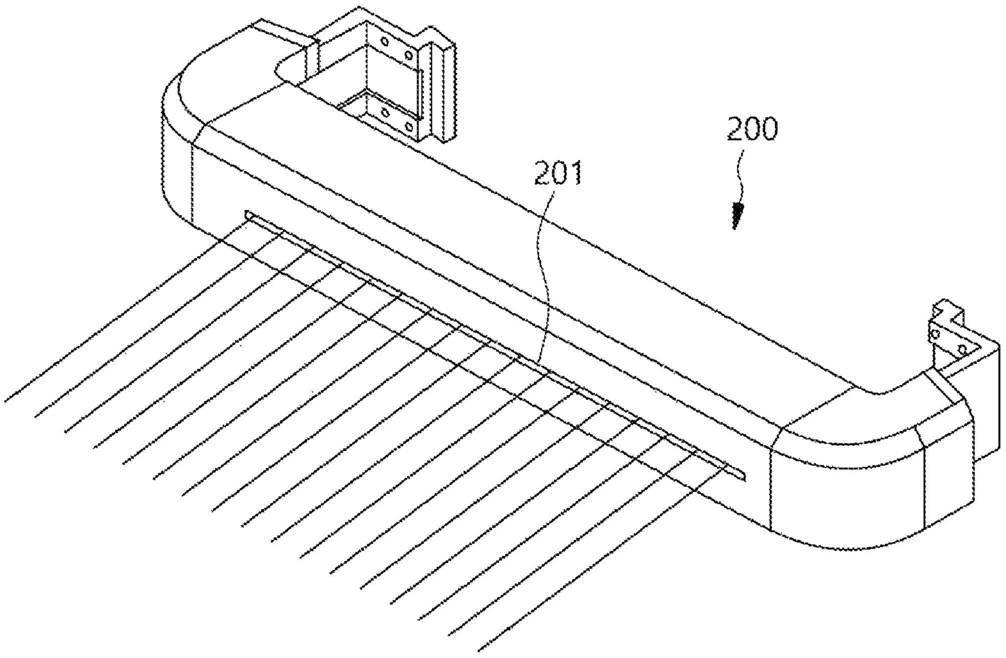
[Fig 20]

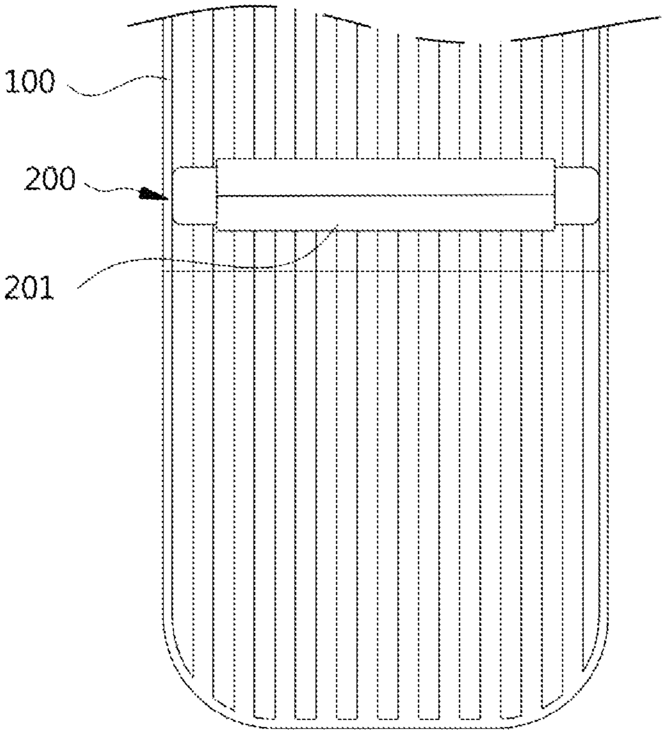
[Fig 21A]

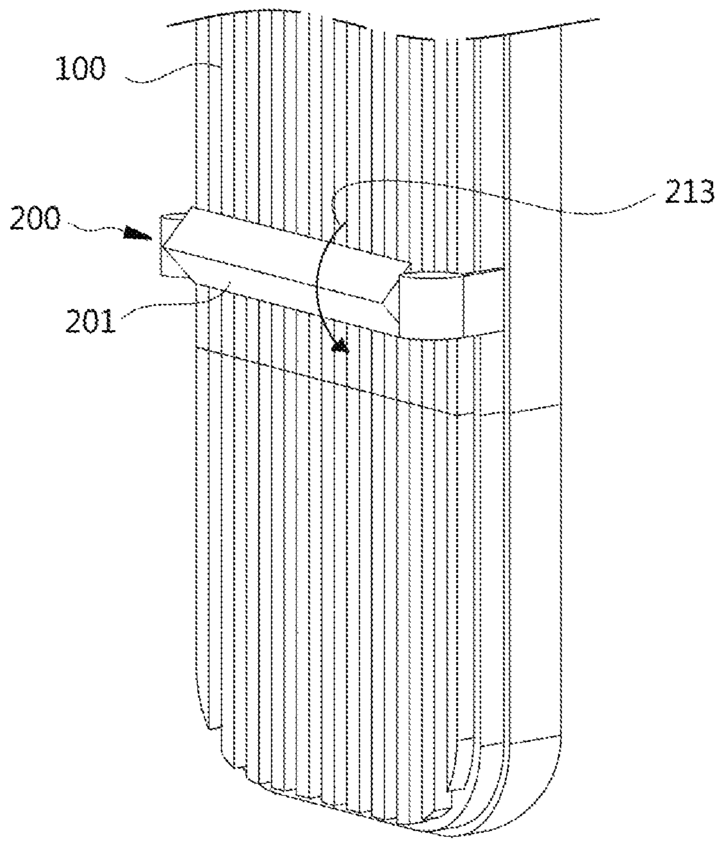
[Fig 21B]

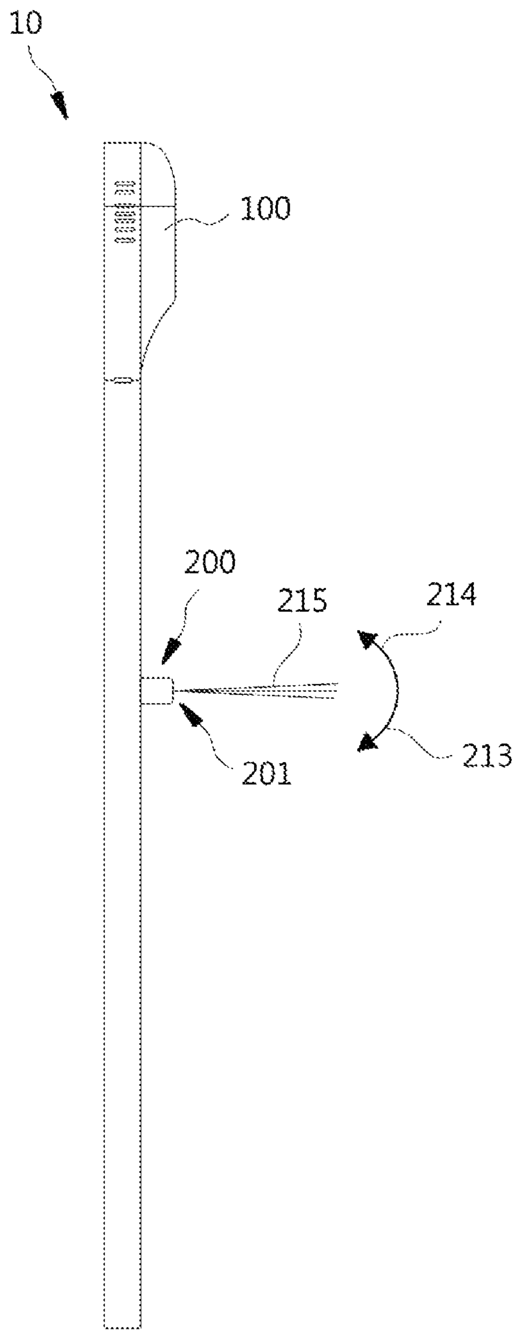
[Fig 22A]

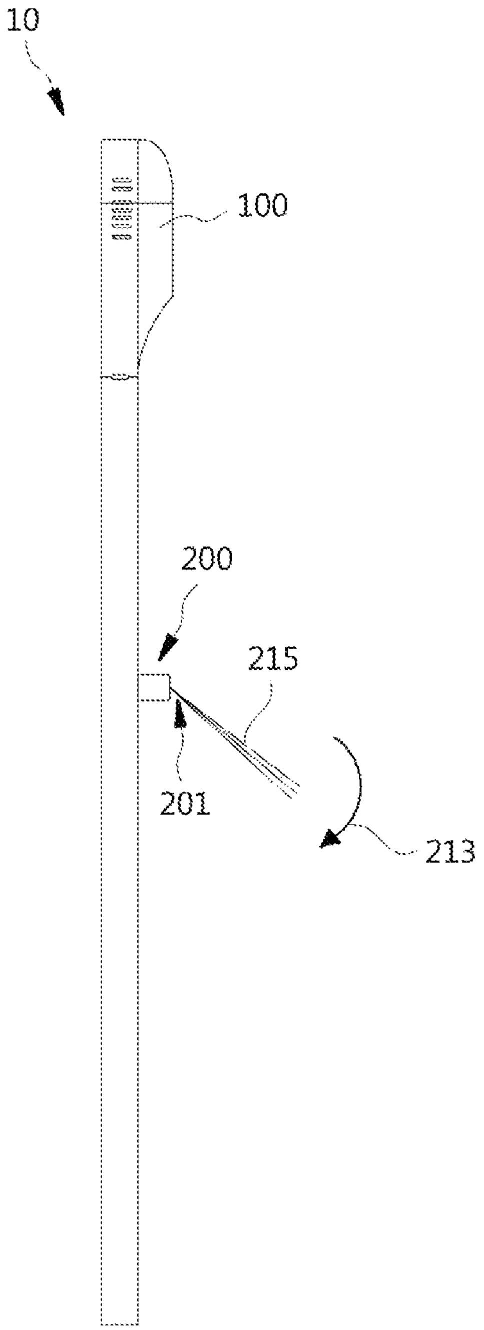
[Fig 22B]

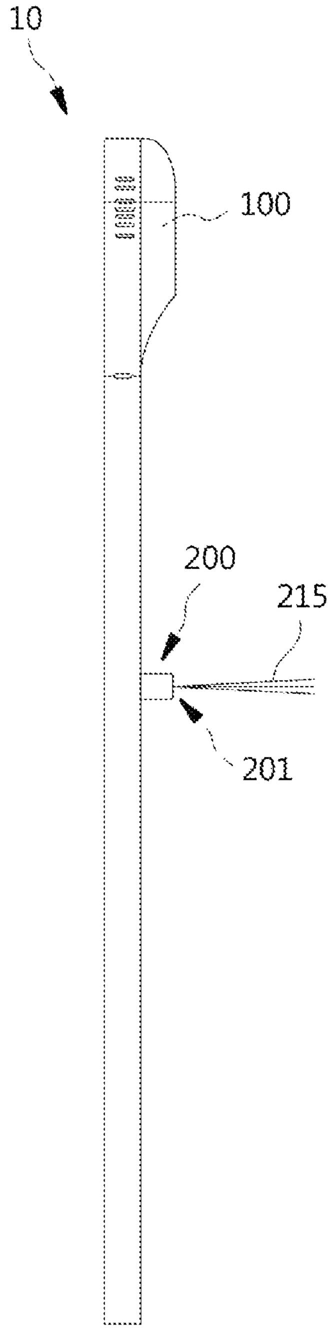
[Fig 22C]

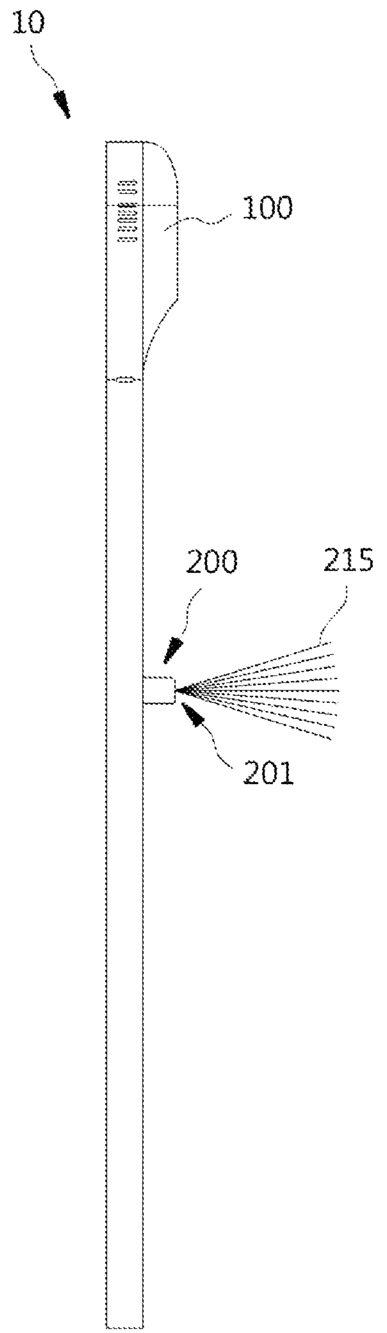
[Fig 22D]

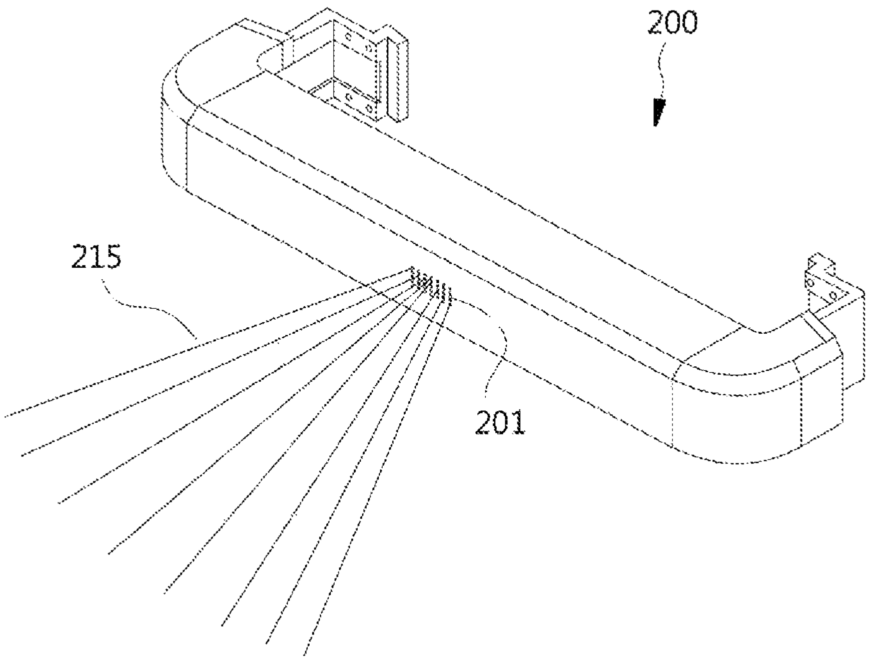
[Fig 23A]

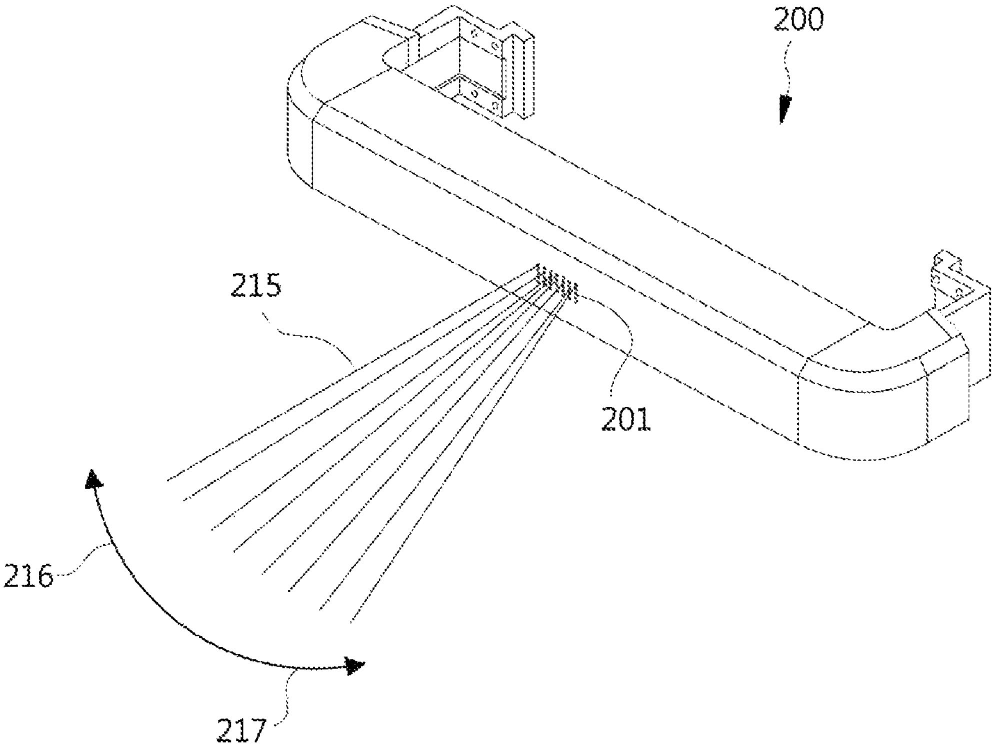
[Fig 23B]

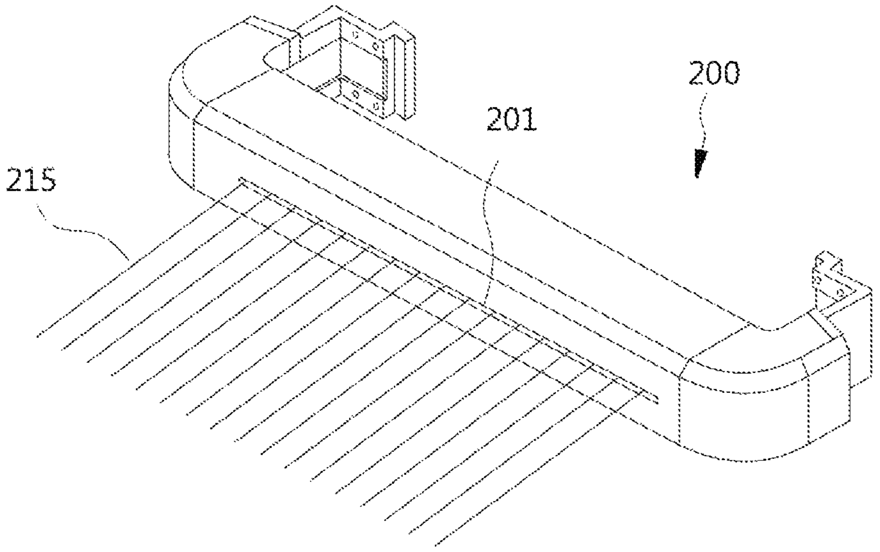
[Fig 23C]

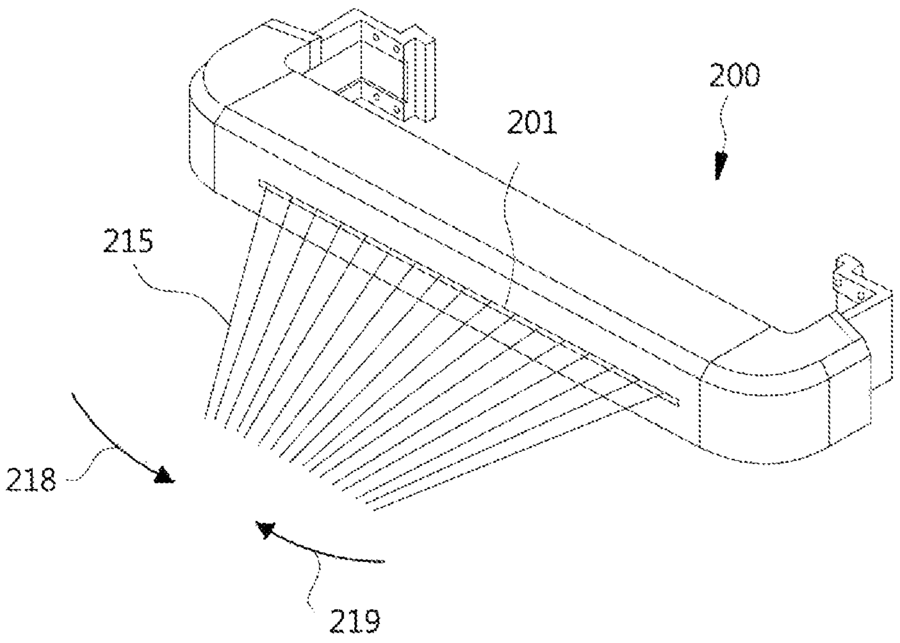
[Fig 23D]

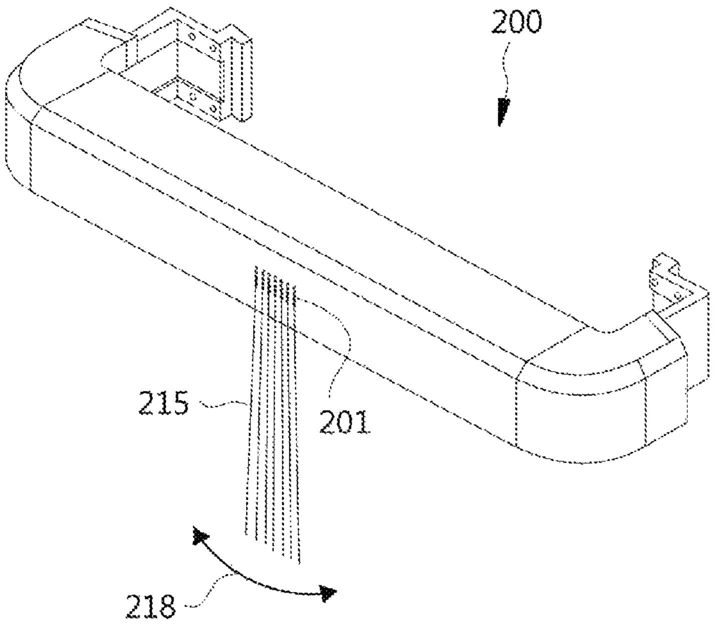
[Fig 23E]

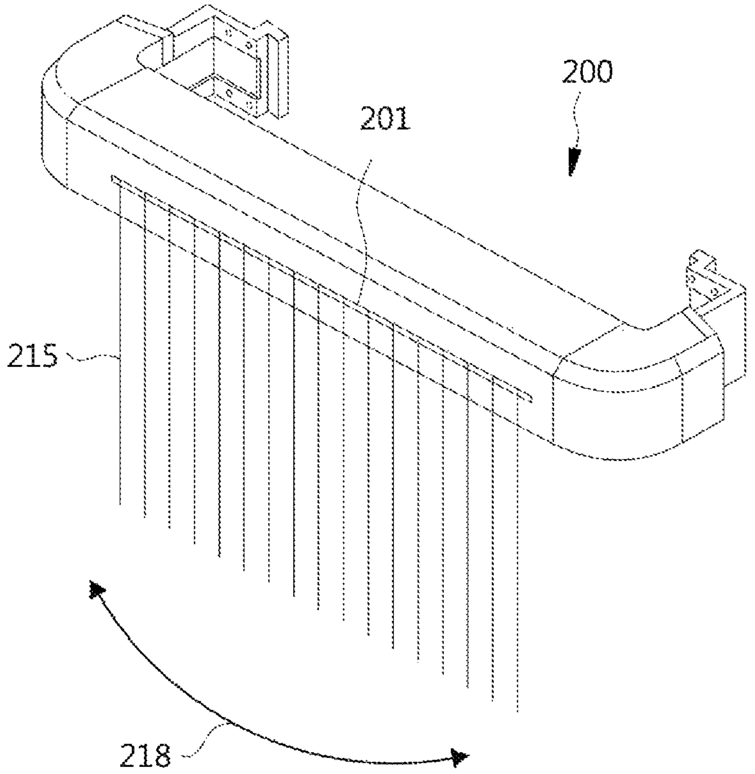
[Fig 23F]

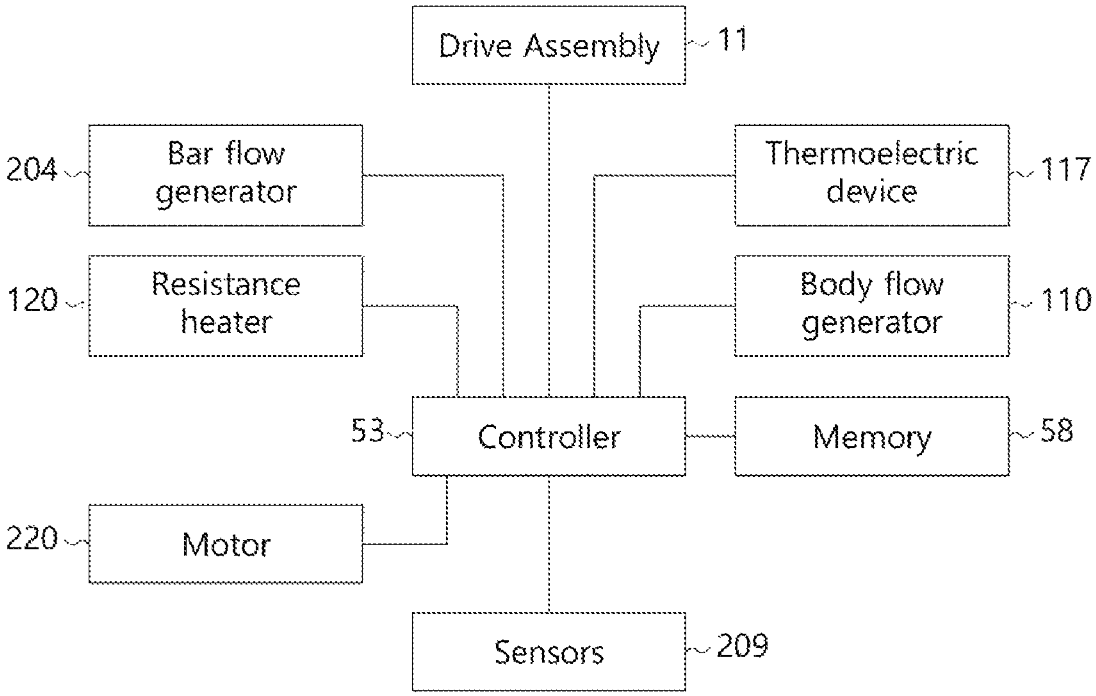
[Fig 24]

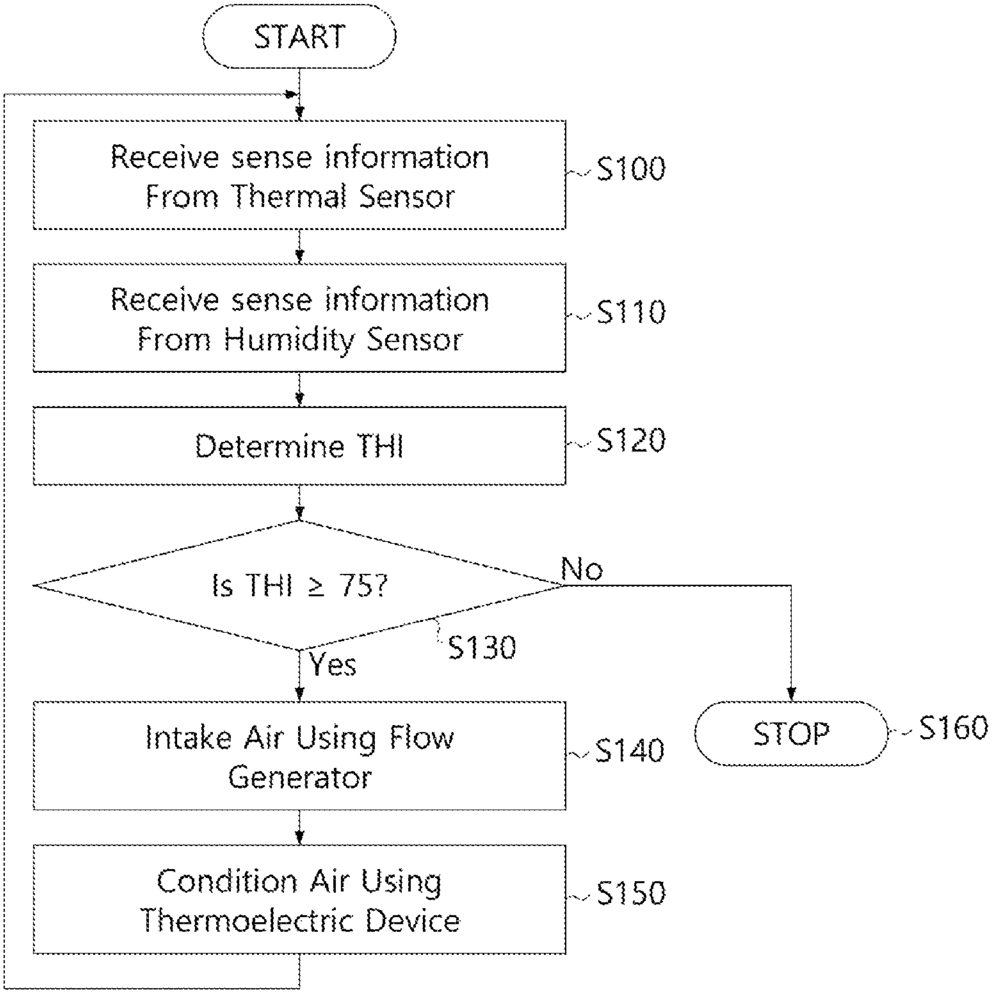
[Fig 25]

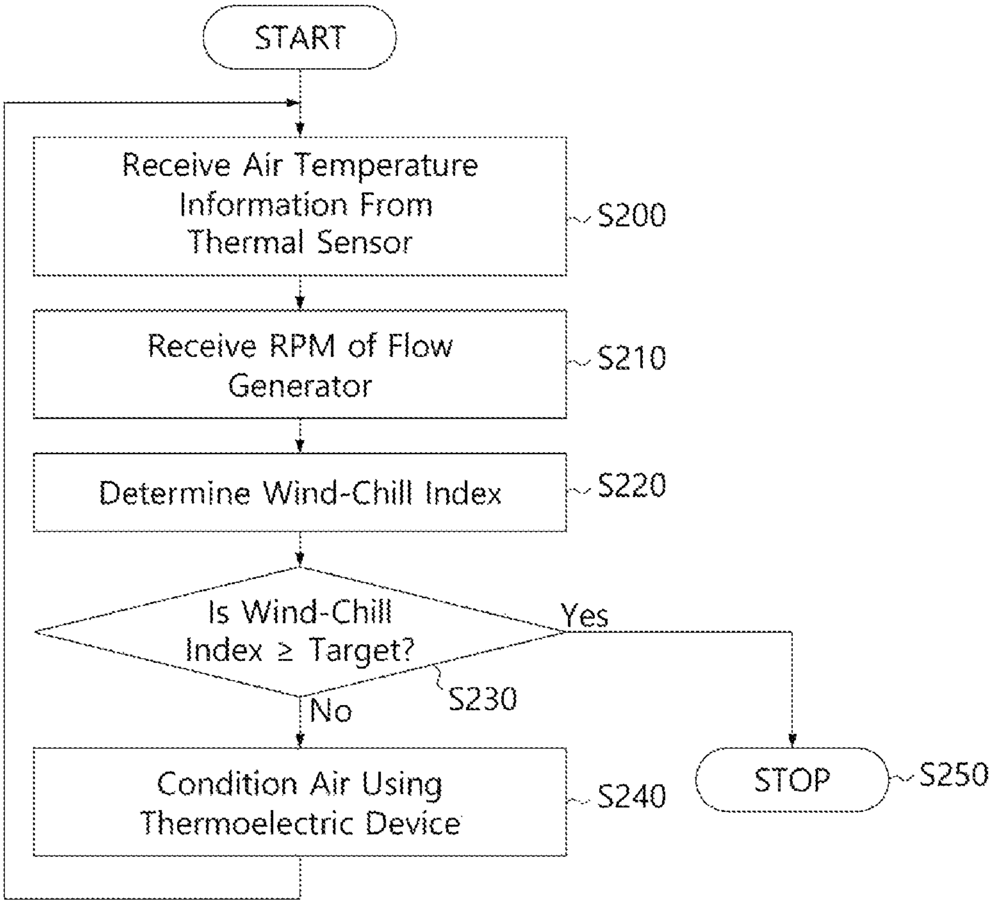
[Fig 26]

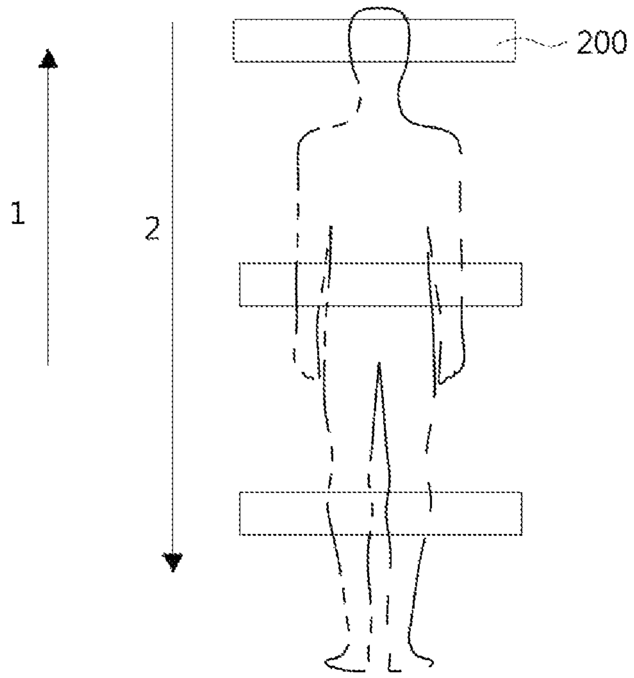
[Fig 27A]

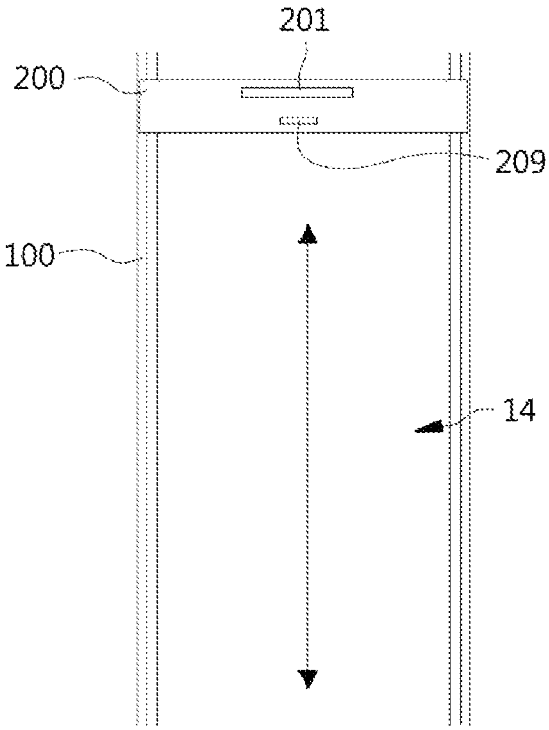
[Fig 27B]

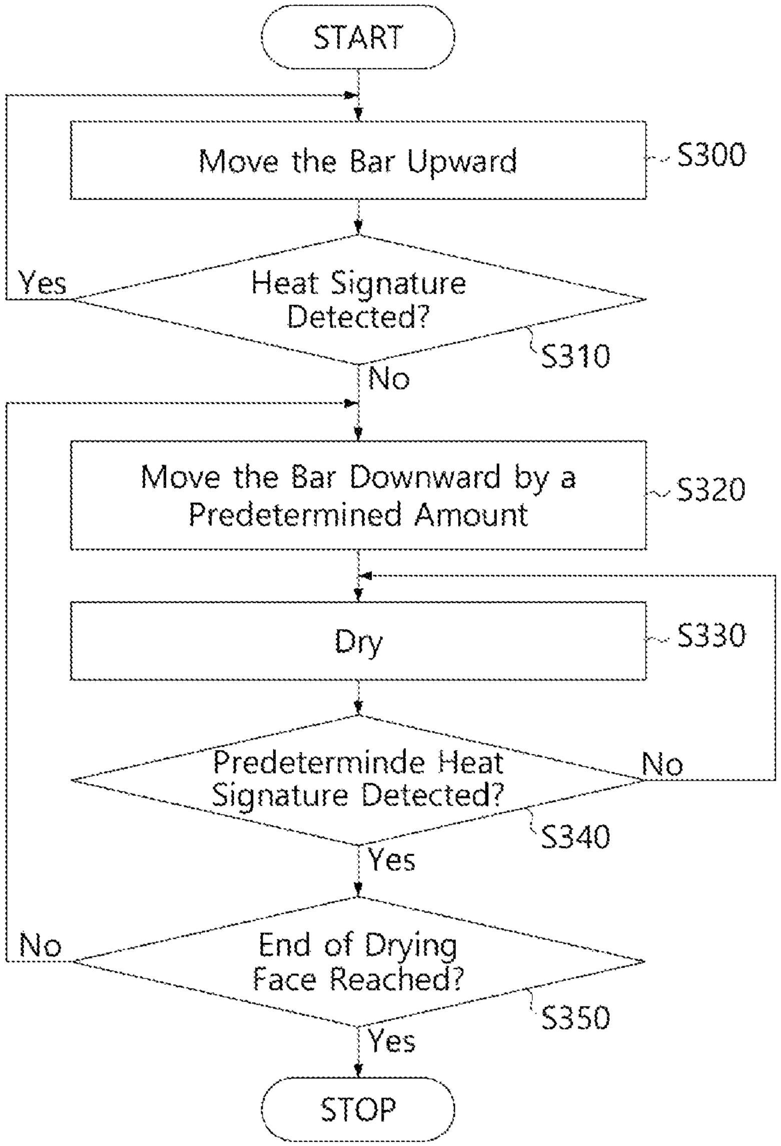
[Fig 28]

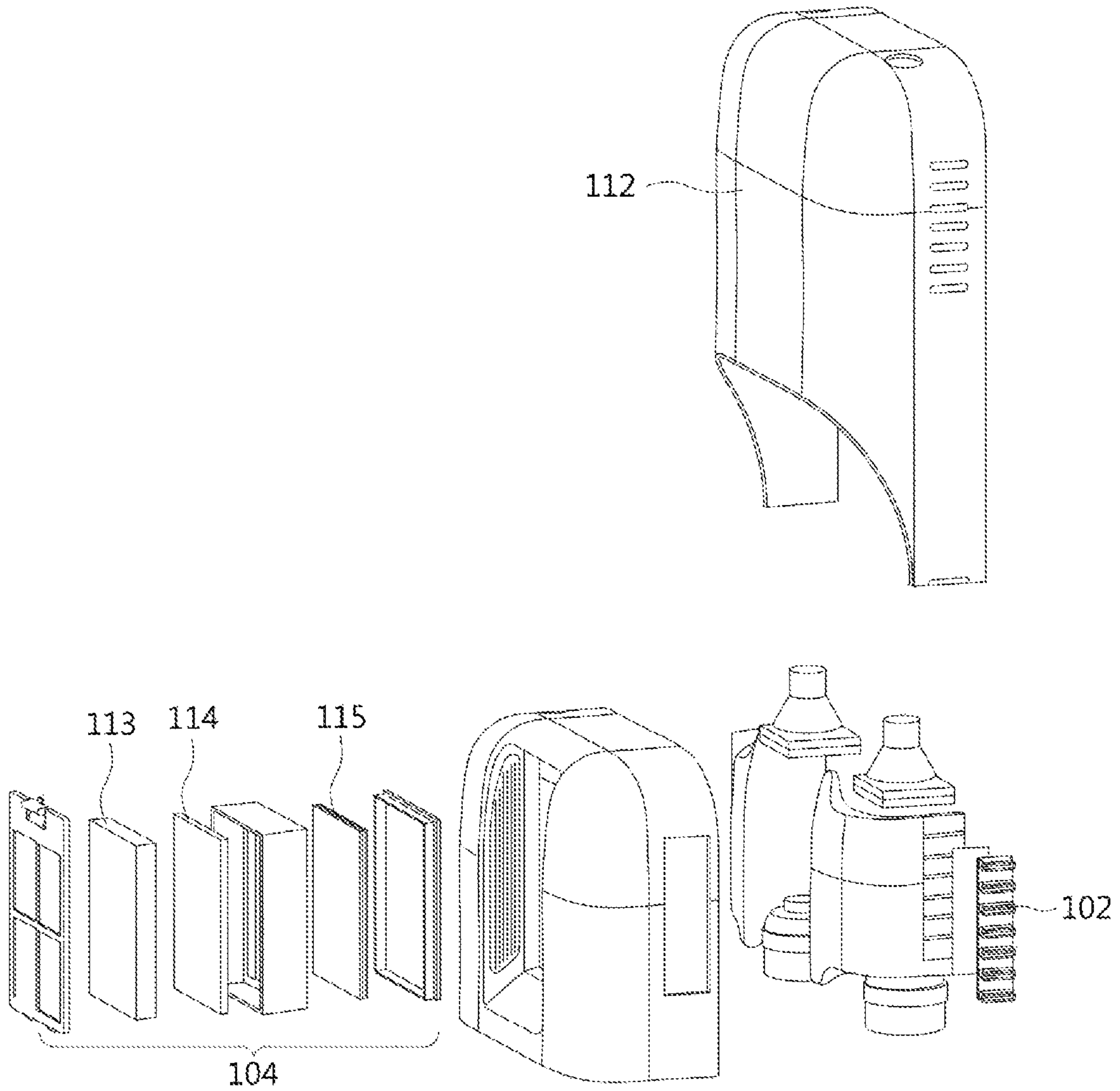
[Fig 29]

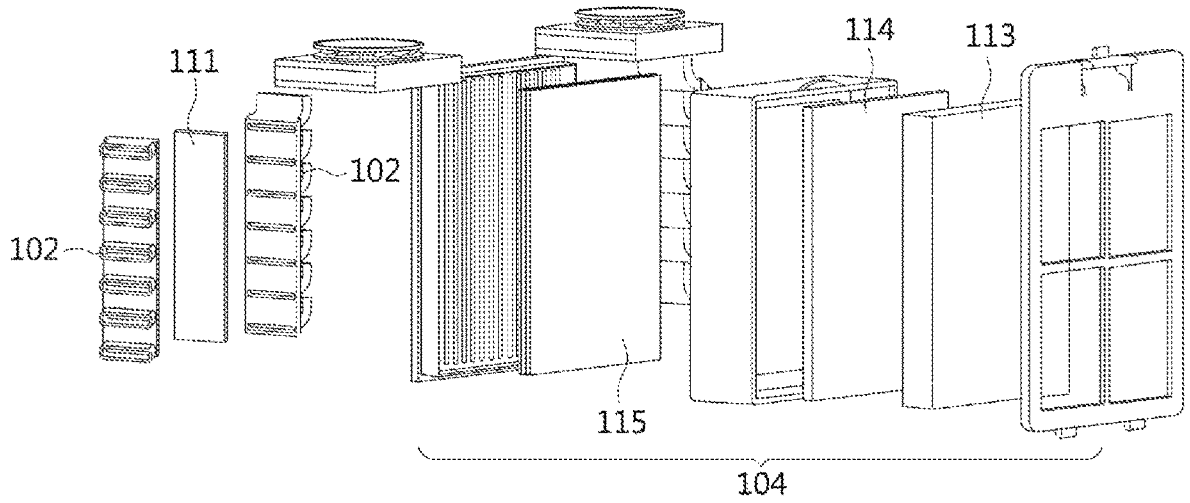
[Fig 30]

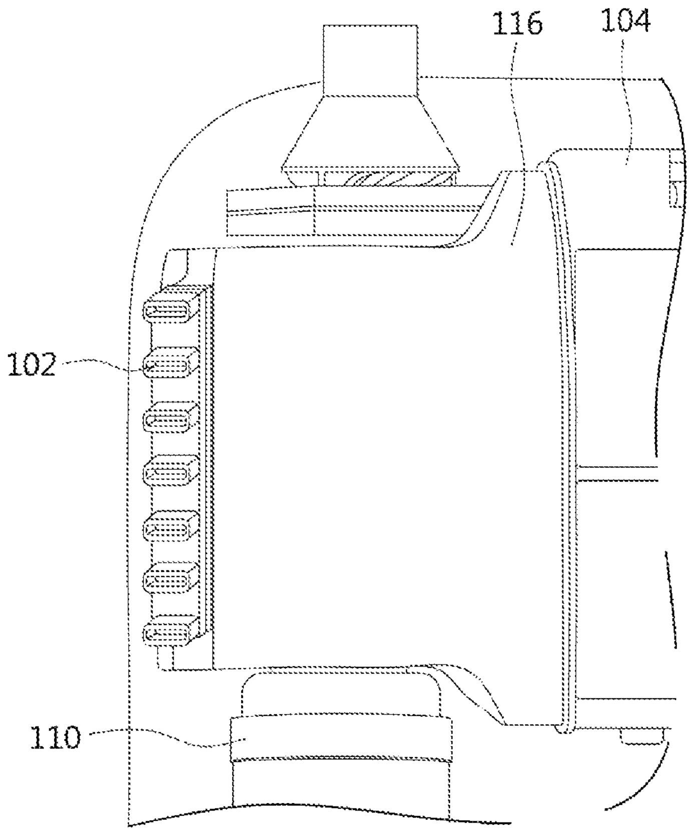
[Fig 31]

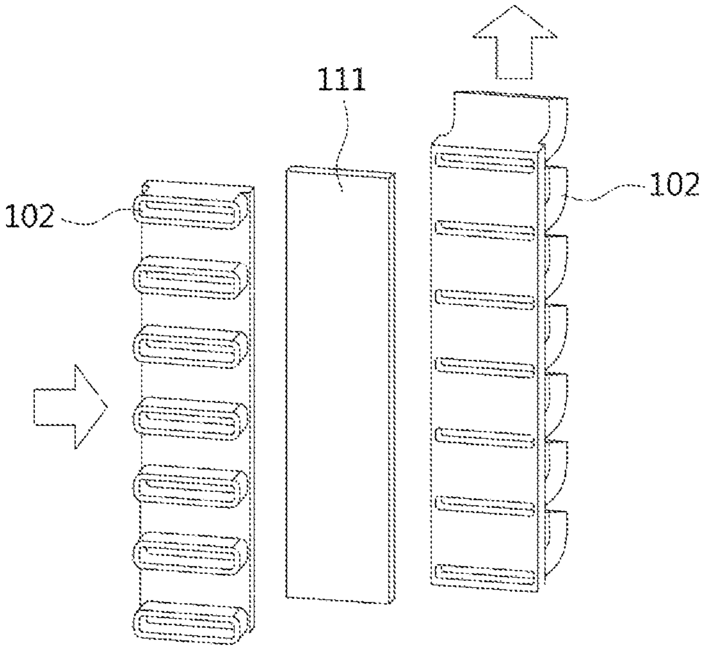
[Fig 32]

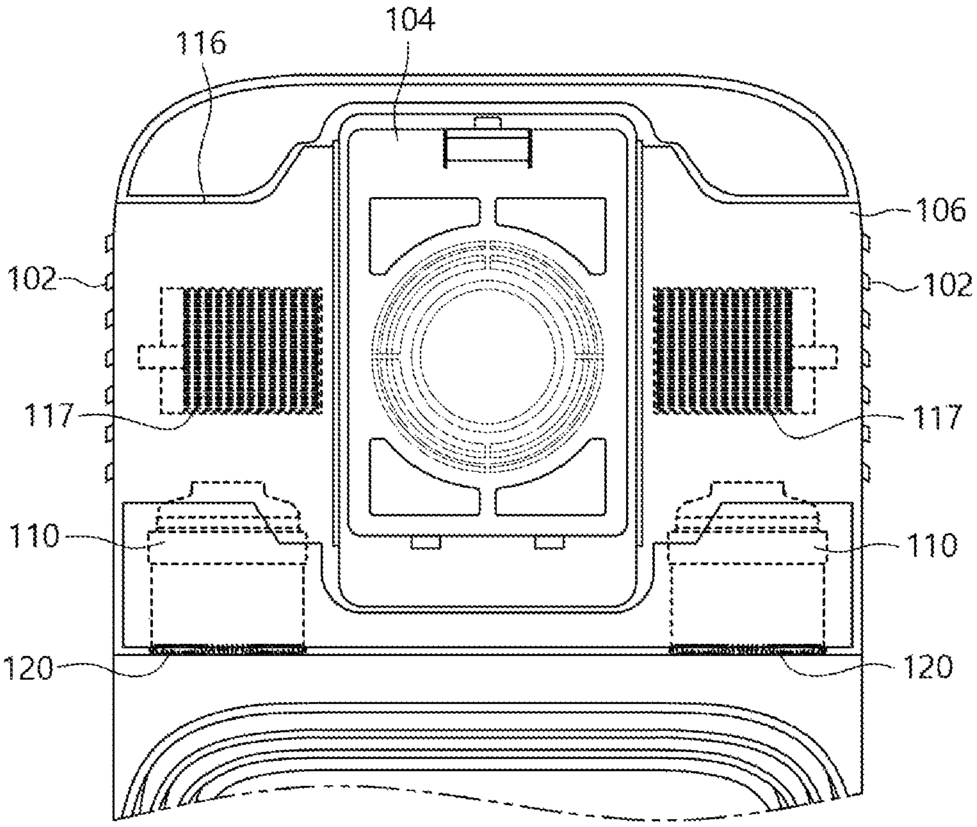
[Fig 33]

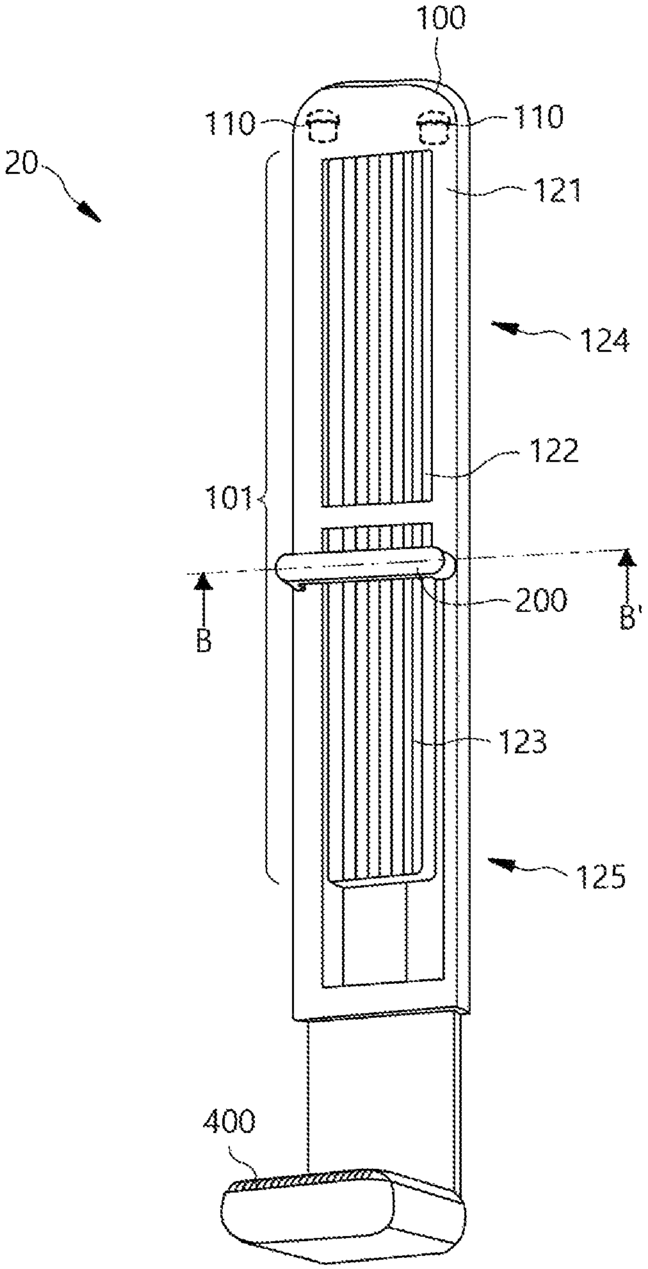
[Fig 34]

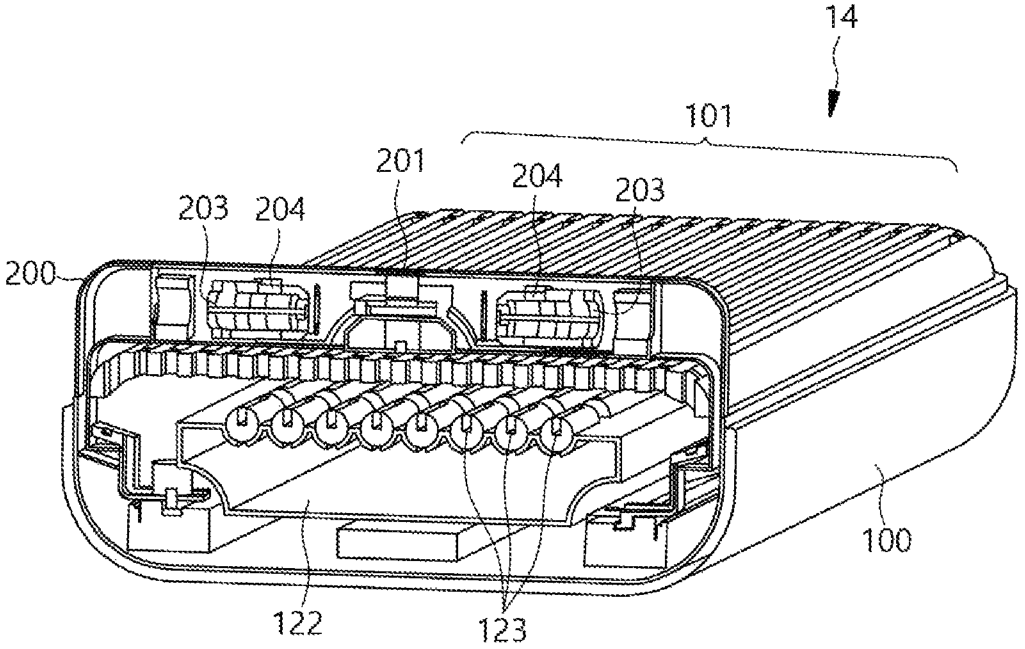
[Fig 35]

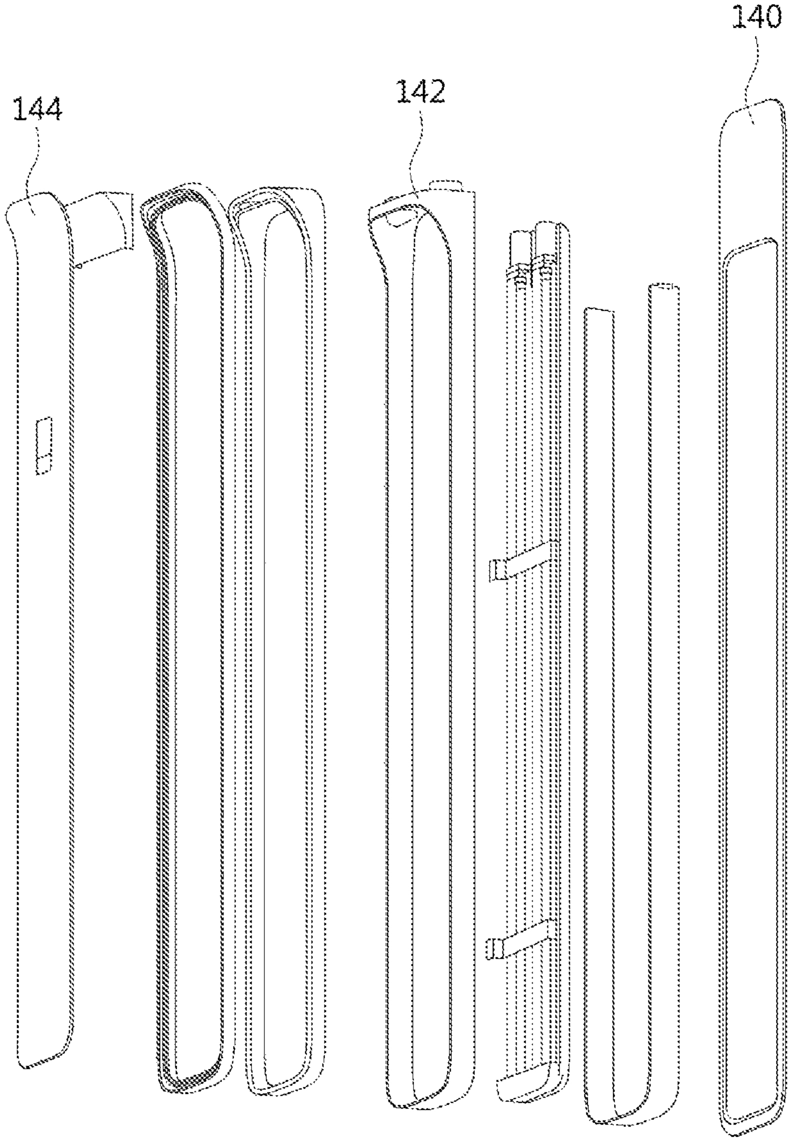
[Fig 36]

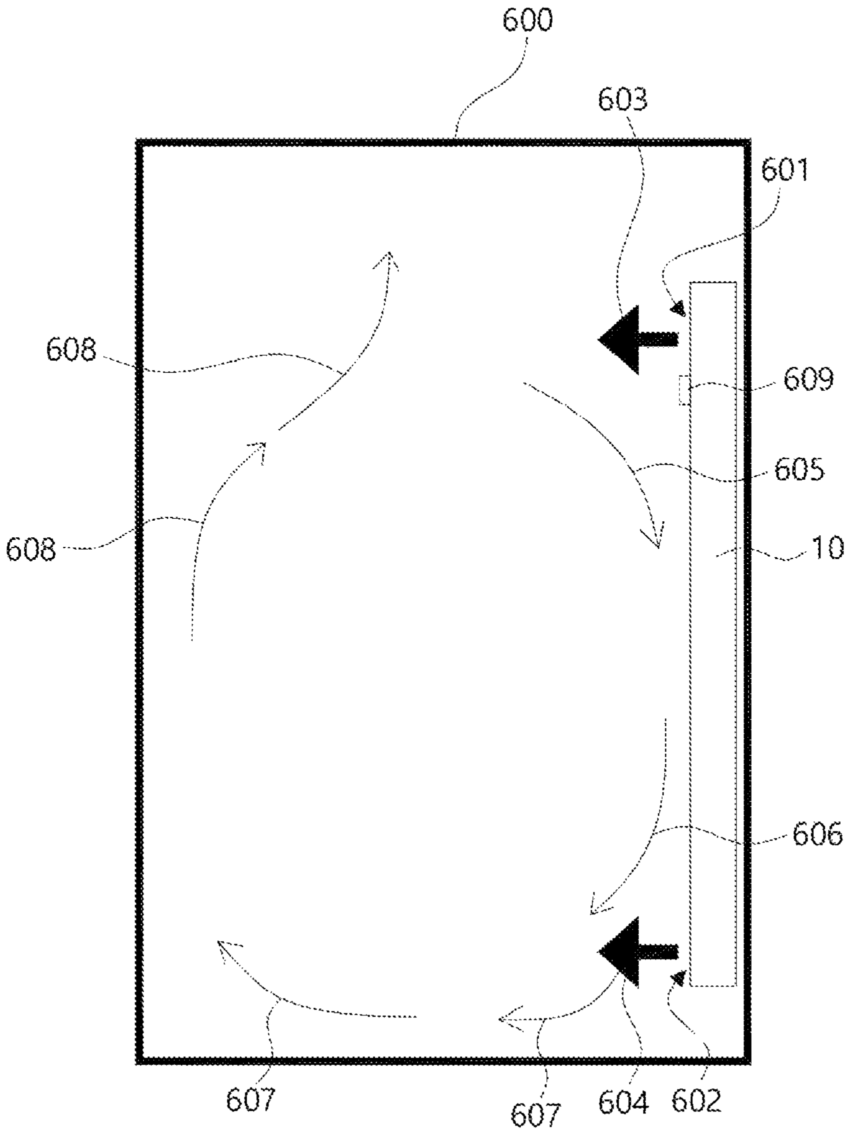
[Fig 37]

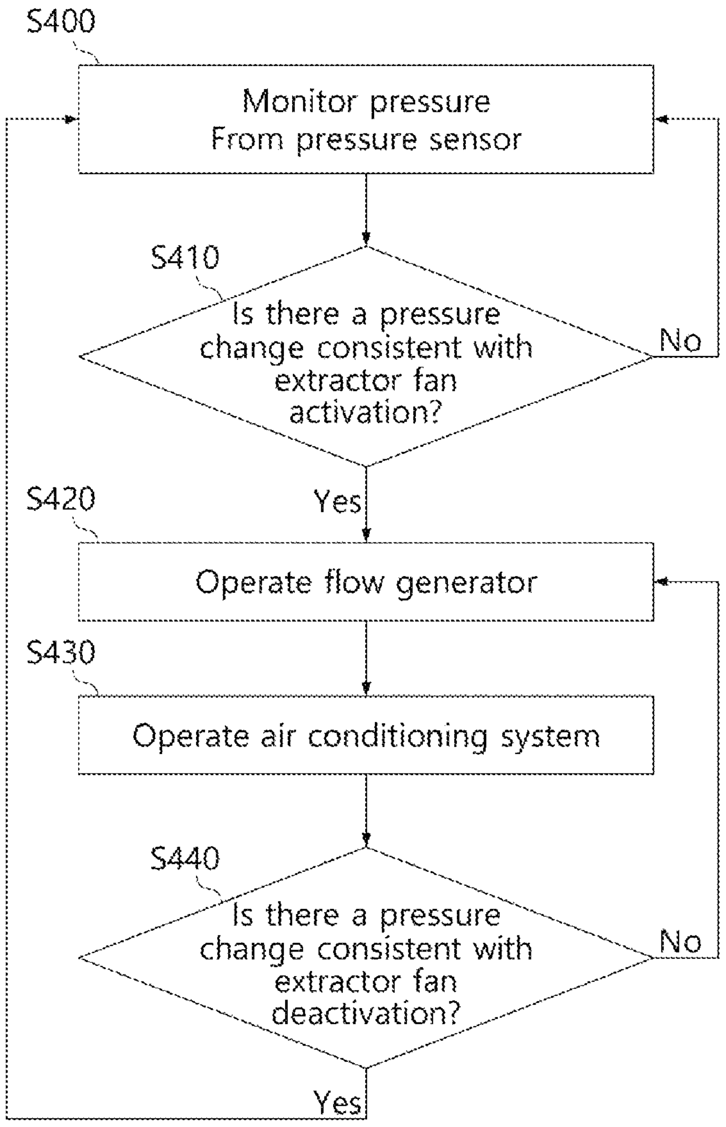
[Fig 38]

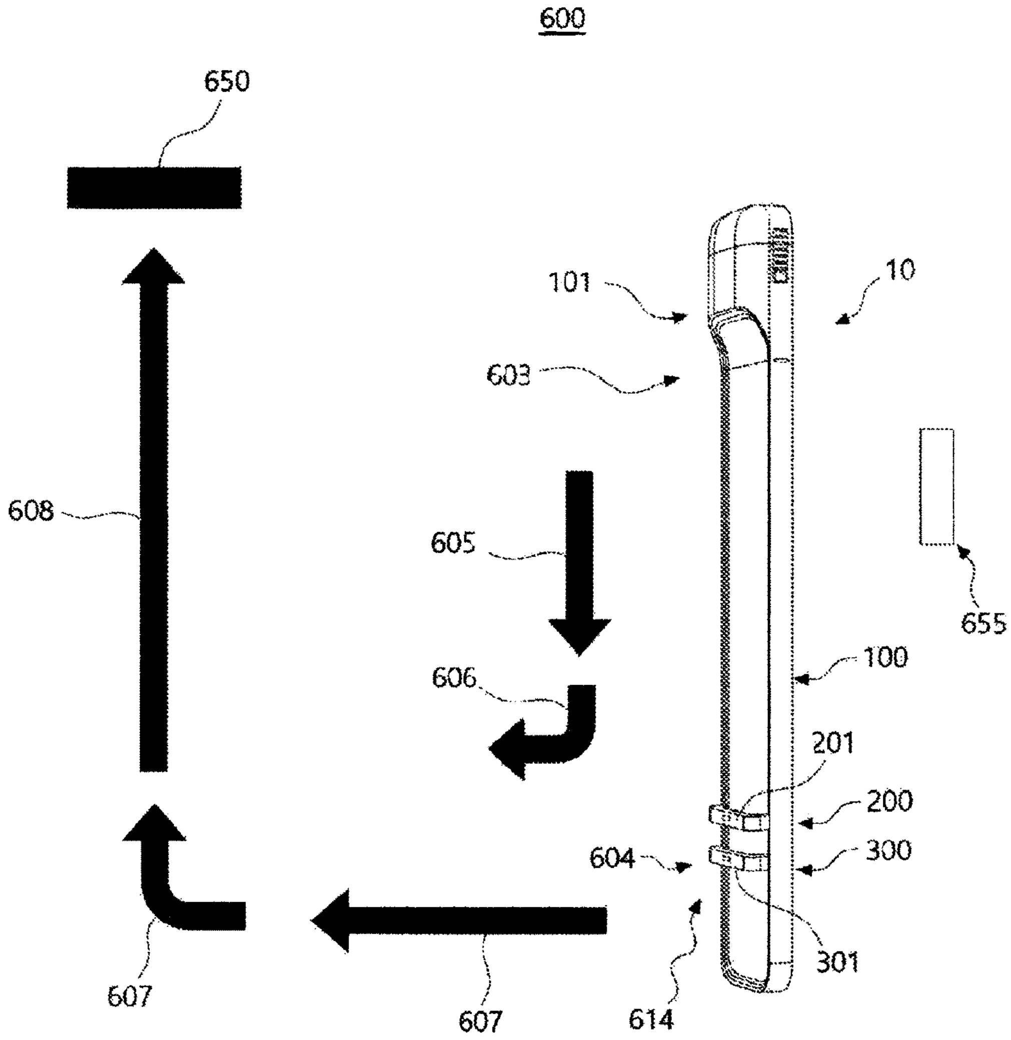
[Fig 39]

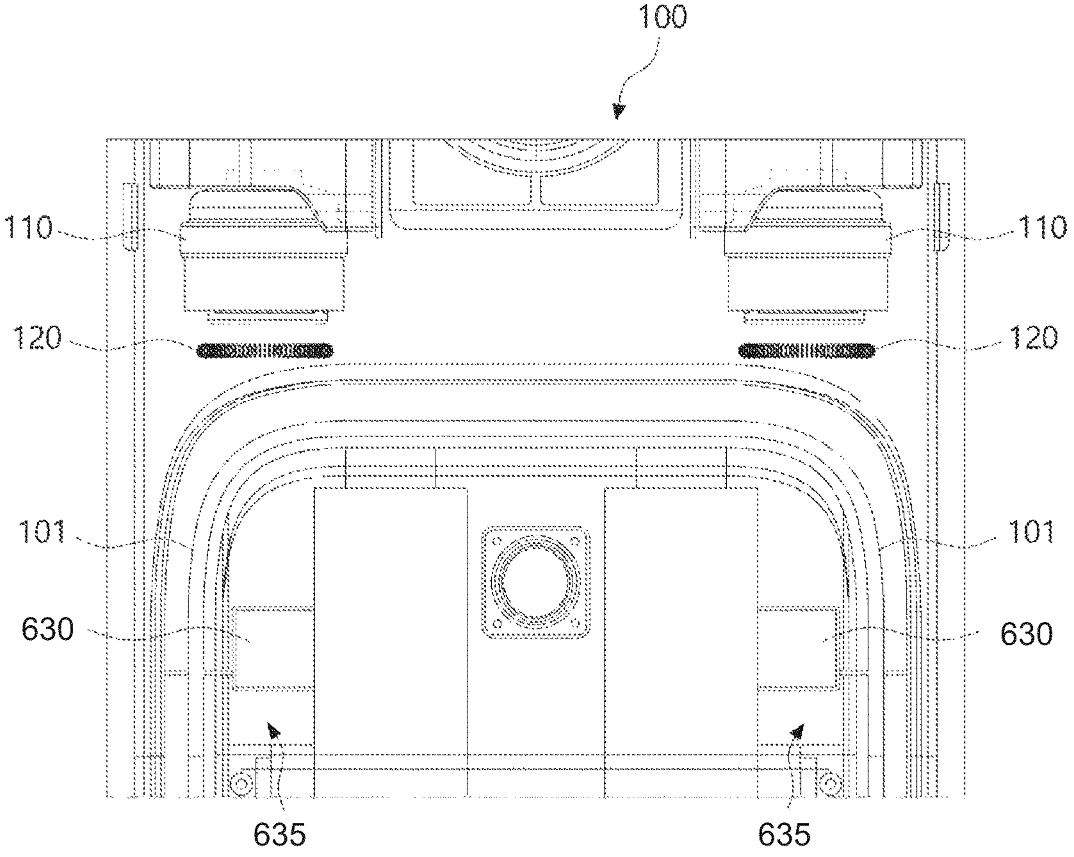
[Fig 40]

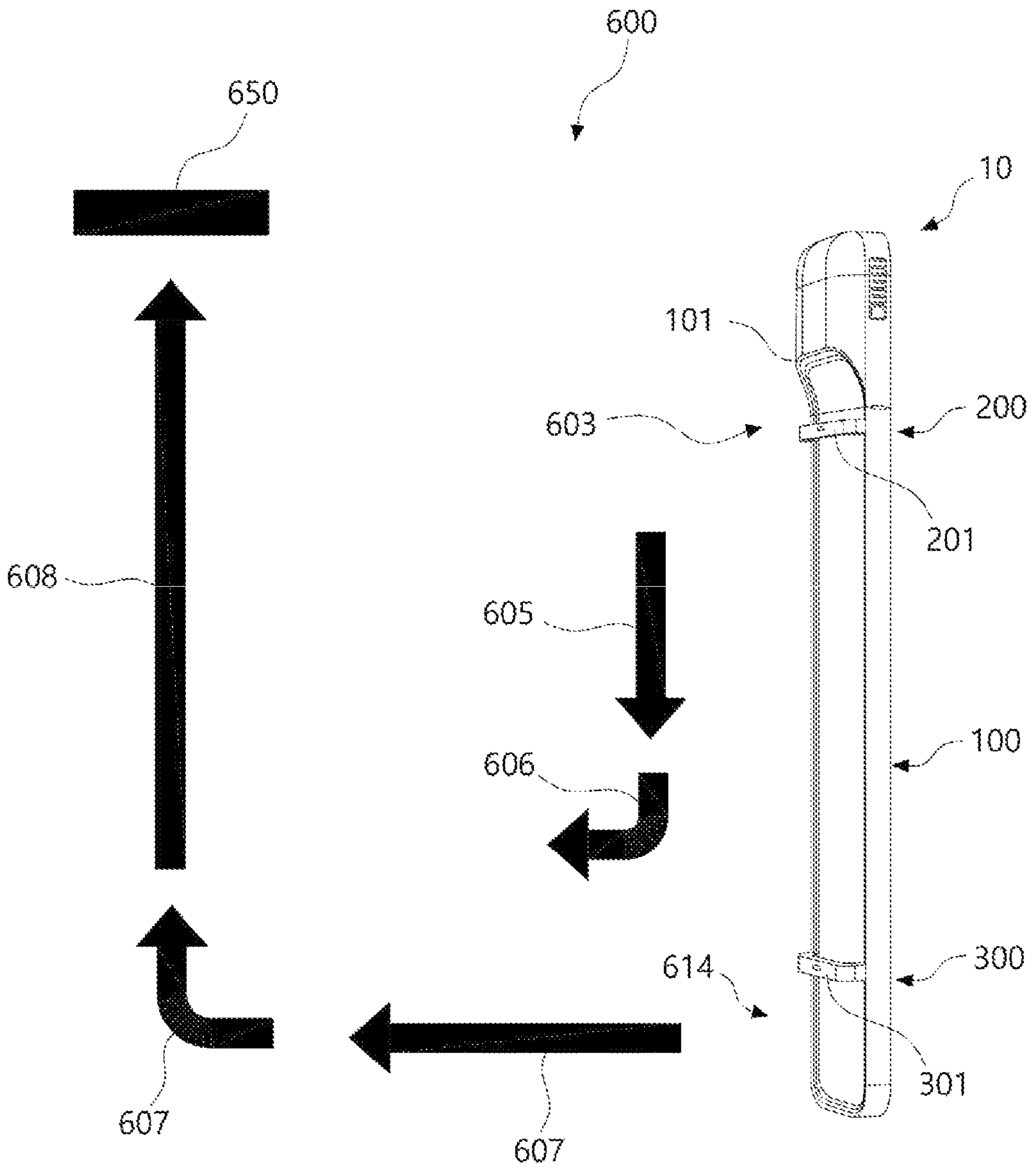
[Fig 41]

AIR CIRCULATION APPARATUS AND RELATED METHODS

This application claims the benefit and priority to U.S. Provisional Application No. 62/992,138, filed on Mar. 19, 2020, and Korean Application No. 10-2020-0052552, filed on Apr. 29, 2020, all of which are hereby incorporated by reference in their entirety for all purposes as if fully set forth herein.

FIELD OF THE DISCLOSURE

The present disclosure relates to drying apparatuses and methods of drying, and more particularly, to air circulation apparatuses and methods of air circulation based on a drying apparatus.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Regular showering or bathing are commonplace activities across modern society. In many cultures, a shower bath is taken on a daily basis. People may even wash more than once a day, for example, where they have done some form of exercise during the day.

As a result of washing, or also due to perspiration, a person may become wet. Drying of this moisture is important to a person's health in order to prevent bacterial and fungal growth on the person.

Given the right environment, such moisture may evaporate away on its own, but for expediency and comfort, most people towel themselves dry following washing or exercise. Toweling can be a good way to remove water from a person, but drying effectively to prevent bacterial and fungal growth—particularly around the feet—can be time consuming thus such areas may commonly be inadequately dried. Towel drying of hair, particularly for those with long hair, can additionally be a frustrating and involved process.

Aside from any issues with the use of towels to desirably dry a person, the number towels used and frequency of their use means that towels account for a significant proportion of total laundry loads. This is particularly the case in settings where towels are only used once, such as in gyms, sports clubs, and commonly in hotels.

Laundering of towels is energy intensive, and consumption of fresh water is also of concern from an environmental point of view. The depletion of fresh water resources is known to be a widespread issue across many parts of the world. The number of towels washed and frequency with which they are commonly washed consumes significant amounts of water resources.

In addition, showering and bathing often leave behind water residues that evaporate over time leading to moist air in the bathroom. A bathroom is usually a confined space that traps these moist air leading to dampness, humidity, and an unpleasant smell. Further, such atmosphere fosters bacterial and fungal growth that may lead to health problems such as congestion and asthma attacks. Furthermore, hot bath or showers usually results in a hot and humid environment which may be unpleasant to the user in the bathroom after such hot bath or showers.

Many bathrooms include extractor fans which are intended to remove moist air or hot and humid air from the bathroom as they accumulate in the bathroom. An extractor fan may remove some of these moist air or hot and humid air when they are operational and is usually manually operated by the user when the user is in the bathroom. However, the extractor fan is usually turned off when the user exits the bathroom. While the extractor fan may aid in removing some of the moist air or hot and humid air from the bathroom, the duration being used may not completely remove the moist or hot humid air. Also, existing conditions remain that may continue to generate moist air or hot and humid air, which if left unchecked, leads to dampness, humidity, and an unpleasant smell as well as mold related issues.

It is desired to address or ameliorate one or more of the problems discussed above by providing a drying apparatus to at least provide the public with a useful alternative.

While certain aspects of conventional technologies have been discussed to facilitate the disclosure, Applicants in no way disclaim these technical aspects, and it is contemplated that the claimed invention may encompass or include one or more of the conventional technical aspects discussed herein.

SUMMARY

The present disclosure seeks to address one or more of the above-mentioned issues by providing apparatus and methods that improve health and hygiene, as well as have a positive impact on the environment.

It should be understood that, unless expressly stated otherwise, the claimed invention comprehends any and all combinations of the individual features, arrangements and/or steps detailed herein, including but not limited to those features, arrangements and/or steps set forth in the appended claims.

The disclosure describes an air circulation system that includes at least one flow generator to generate an airflow, an air inlet, a first air outlet and a second air outlet each for exhausting airflow, an air conditioning device to air condition the exhausted airflow, and a controller. The controller is configured to position at least one of the first and second air outlets to be vertically separated from each other and to operate the flow generator to provide the exhaust airflow to the first and second air outlets. The exhaust airflow from the first and second air outlets are of different temperature.

As used herein the term "and/or" means "and" or "or", or both.

As used herein "(s)" following a noun means the plural and/or singular forms of the noun.

For the purposes of this specification, the term "plastic" shall be construed to mean a general term for a wide range of synthetic or semisynthetic polymerization products, and includes hydrocarbon-based polymer(s).

For the purpose of this specification, where method steps are described in sequence, the sequence does not necessarily mean that the steps are to be chronologically ordered in that sequence, unless there is no other logical manner of interpreting the sequence, or expressly stated.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the embodiments of the invention may become apparent from the following description which is given by way of example only and with reference to the accompanying drawings.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

Preferred embodiments or aspects of the invention will be described by way of example only and with reference to the drawings, in which:

FIG. 1 is a perspective view of a drying apparatus according to an embodiment of the present invention.

FIG. 2 is a side view of the drying apparatus according to the embodiment of FIG. 1.

FIG. 3 is a front view of the drying apparatus according to the embodiment of FIG. 1.

FIG. 4 is a view of an upper region of the drying apparatus according to the embodiment of FIG. 1.

FIG. 5 is a view showing some internal components of the upper region of FIG. 4.

FIG. 6 is a view of an air flow through the internal components of the upper region of FIG. 5.

FIG. 7 is another view of the air flow through the internal components of the upper region.

FIG. 8 is a view showing a connection between flow generators and a first air outlet according to an embodiment of the present invention.

FIG. 9A is a view showing a connection between the flow generators and the first air outlet according to another embodiment of the present invention.

FIG. 9B is a rear perspective view showing a connection between one of the flow generators and the first air outlet of FIG. 9A.

FIG. 10 is a cross-sectional view of the first air outlet along line A-A' of FIG. 3.

FIG. 11A is a perspective view of the drying apparatus of FIG. 1 with a bar thereof in a first position.

FIG. 11B is a perspective view of the drying apparatus of FIG. 1 with the bar thereof in a second position.

FIG. 12A is a perspective view showing a driving apparatus for a drying apparatus according to an embodiment of the present invention.

FIG. 12B is a close up view of the portion A of FIG. 12A.

FIG. 12C is bottom view of FIG. 12B.

FIG. 12D is a view showing a fastening mechanism of a bar of a drying apparatus according to an embodiment of the present invention.

FIG. 13 is a perspective view showing a drying apparatus including additional bars according to an embodiment of the present invention.

FIG. 14 is a top perspective view of a bar of a drying apparatus according to an embodiment of the present invention.

FIG. 15 is a bottom perspective view of the bar of FIG. 14.

FIG. 16 is a rear view of a bar according to another embodiment of the present invention.

FIG. 17 is a partial view of various internal parts of the bar of FIGS. 14-16 according to an embodiment of the present invention.

FIG. 18 is an exploded view of various parts of the bar of FIGS. 14-17 according to an embodiment of the present invention.

FIGS. 19 and 20 are views showing exemplary ways in which forced air may be expelled from the bar of FIGS. 14-18 according to embodiments of the present invention.

FIGS. 21A and 21B are views of a portion of a body showing a bar rotated according to an embodiment of the present invention.

FIGS. 22A-22D are side views of a drying apparatus with varying configurations of an airflow from an outlet of a bar according to embodiments of the present invention.

FIGS. 23A-23F are varying airflow configurations of an air outlet of the bar according to embodiments of the present invention.

FIG. 24 is an electrical schematic diagram of the drying apparatus according to an embodiment of the present invention.

FIG. 25 is a flowchart for control of temperature-humidity index (THI) by a controller according to one embodiment of the present invention.

FIG. 26 is a flowchart for control of wind chill index by a controller according to one embodiment of the present invention.

FIGS. 27A and 27B are views showing a user being dried with the bar of the drying apparatus according to an embodiment of the present invention.

FIG. 28 is a flowchart for drying of a user by the controller according to an embodiment of the present invention.

FIG. 29 is an exploded view of an upper region of the drying apparatus showing an exploded view of a filter unit according to an embodiment of the present invention.

FIG. 30 is another exploded view of the filter unit of FIG. 26 according to an embodiment of the present invention.

FIG. 31 is a front view of an air inlet and an inlet pathway at a flow generator housing according to an embodiment of the present invention.

FIG. 32 is a partial exploded view of the air inlet of FIG. 28.

FIG. 33 is a front transparent view of an upper region of a drying apparatus according to another embodiment of the invention.

FIG. 34 is a perspective view of a drying apparatus according to an alternative embodiment of the present invention.

FIG. 35 shows a cross-sectional view along line B-B' of FIG. 34.

FIG. 36 is an exploded view of components of a drying apparatus according to an embodiment of the present invention.

FIG. 37 is a view of a drying apparatus providing air circulation within a space according to an embodiment of the present invention.

FIG. 38 is a flowchart for control of an air circulation mode of a drying apparatus by a controller according to an embodiment of the present invention.

FIG. 39 a view of a drying apparatus providing air circulation within a space according to an embodiment of the present invention.

FIG. 40 is a view of an air conditioning system of the drying apparatus of FIG. 39.

FIG. 41 is a view showing variation of a drying apparatus providing air circulation within a space according to an embodiment of the present invention.

DETAILED DESCRIPTION OF PREFERRED EMBODIMENTS

Reference is made in detail to one or more embodiments of the present invention, examples of which are illustrated in the accompanying drawings.

A drying apparatus may be provided according to the disclosure for a range of applications. In at least a primary application, the drying apparatus may be a dryer for drying a person, such as following bathing or showering. The drying apparatus may be provided as a supplement to towel drying, or in various preferred forms may be provided as a substitute for towel drying. By the use of the drying apparatus as a body dryer, a person may present themselves and be dried by one or more forced airflows of the drying apparatus.

FIG. 1 is a perspective view of a drying apparatus according to an embodiment of the present invention; FIG. 2 is a side view of the drying apparatus; and FIG. 3 is a front view of the drying apparatus.

Referring to FIG. 1, a drying apparatus 10 may comprise a body 100 and a bar 200. While the term "bar" is used, "bar" should not be construed as being limited to a bar shape but may have various kinds of shapes according a design criteria or an intended result. The bar 200 may be supported by the body 100, and may be moveable relative to the body 100. The bar 200 may be driven relative to the body 100 by a drive apparatus, as will be explained in greater detail herein.

The drying apparatus 10 may be sized so as to correspond to human body dimensions. For example, in the configuration of the drying apparatus as shown in FIG. 1, the drying apparatus 10, and in particular the body 100, may be sized in proportion to human body dimensions to enable the delivery of the forced airflow across the human body.

The forced airflow may be provided through a first air outlet 101 distributed along a periphery of the body 100. The forced airflow may also be provided through a second air outlet 201 located at the bar 200. Unlike the first air outlet 101 which is stationary with respect to the body 100, the second air outlet 201 moves as the bar 200 travels along a longitudinal length L1 of the body 100 to expel forced airflow to different parts of the human body.

The body 100 may define a drying side or face 14 adjacent to which a user may present themselves for drying by the drying apparatus 10. The drying face 14 may generally define a face or plane from which the forced airflow is provided by the drying apparatus 10 through the first air outlet 101 and/or the second air outlet 201. For example, FIG. 2 shows a side view and FIG. 3 shows a front view of such a drying face 14.

For example, when the drying apparatus 10 is to be provided within a confined space, such as a bathroom, it may be desirable that a minimum of space is taken up by the drying apparatus 10, and perhaps, be aesthetically pleasing. To this end, the portion including the drying face 14 of the body 100 may be provided having a low profile, such as is seen in the side view of FIG. 2. This low profile may provide for a slim look.

To achieve this low profile, at least some internal components of the body 100 which are bulky may be distributed toward an upper region of the body 100 (in the vicinity of the air inlets 102 shown in FIG. 2), so as not to interfere with the low profile of the portion having the drying face 14. The upper region of the body 100 may be at or above the head of a user. The upper region may include the bulky components such as flow generators, thermoelectric devices, flow guides, and the like. In an alternative embodiment, the internal components of the body 100 may be distributed toward a lower region of the body 100 (not shown) providing for an upper region of the body to have a minimized depth.

FIG. 4 is a view of details of an example upper region of the body 100. In particular, in FIG. 4 a front cover of the upper region has been removed to expose an outlet of one of two flow guides 116, adjacent to a filter unit 104. The other air flow guide 116 is not visible in FIG. 4, but may be provided on the other side of FIG. 4. The filter unit 104 is in opposition to and/or cooperation with flow guide 116 and arranged in a recess at the center of the body 100. The filter unit 104 may or may not be replaceable. Front cover (not shown in FIG. 4) may be removed to replace an old filter unit 104 with a new filter unit. FIG. 5 shows the coverings of the upper region removed to expose some internal components of the upper region of the body 100 shown in FIG. 4.

Referring to FIGS. 4 and 5, together, the upper region of the body 100 may include a pair of flow generators 110, a pair of flow guides 116, a pair of thermoelectric devices 117 (this device includes, for example, a thermoelectric module, a thermoelectric cooler, or other suitable devices), a pair of air inlets 102, the filter unit 104, and the flow generator housing 103 to house the internal components. While one embodiment uses thermoelectric devices 117 which are devices using thermoelectric effect such as Peltier effect, alternative embodiments may include air conditioning or heat-pump systems using a pump, compressors, and evaporators, resistive heating elements, combustion, or other chemical reaction to control temperature. However, other types of air conditioning devices may be used. In one aspect, the upper region may be considered as an air conditioning system of the body 100.

In the illustrated embodiment, a pair of flow generators 110 are used. In alternative embodiments, only a single flow generator, or a greater number of flow generators, may be used. A flow generator may be an axial fan or the like. Embodiments that include multiple flow generators may cooperate to produce an even airflow into the body 100. Embodiments also include generating independent airflows into the body 100 to vary the strength of the airflow at various portions of the body 100. In the present embodiment, outside air may be received into the flow generator housing 103, by operation of the pair of flow generators 110, through a pair of air inlets 102. The pair of air inlets 102 provide inlet points for outside air into the body 100.

As seen in FIG. 5, each flow generator 110 has its own respective air inlet 102. However, a single inlet 102 may be used with the pair of flow generators 110. Alternatively, more than two air inlets may be used with the pair of flow generators.

Air received at the air inlets 102 is ducted by respective flow guides 116 located between the air inlets 102 and the filter unit 104. In the present embodiment, each flow guide 116 may also in part define an outlet air flow pathway 105 (see FIG. 7) which may be a portion of a flow path where filtered air from the filter unit 104 flows to a respective flow generator 110. Further details of the flow path including the outlet air flow pathway 105 will be described in connection with the description of FIGS. 6 and 7.

Because the present embodiment is described as comprising a pair of flow guides 116, it will be understood that the following description of one flow guide 116 also reflects the other flow guide of the flow guide pair 116. To this end, each flow guide 116 may have a curved form as seen in FIG. 5. One end of each flow guide 116 is connected to a respective air inlet 102, and the other end opens to the upstream side of the filter unit 104. The body of each flow guide 116 includes a curved inner surface and a curved outer surface. The curved inner surface faces the outlet air flow pathway 105 and forms part of the flow path between the downstream side of the filter unit 104 and a respective flow generator 110.

Thus, each flow guide 116 forms a flow path between a respective air inlet 102 and the upstream side of the filter unit 104. Also each flow guide 116 forms, at least in part, a wall of the flow path between the downstream side of the filter unit 104 and a respective flow generator 110. In this configuration, each flow guide 116 may duct air received from a respective air inlet 102 and pass the air to the filter unit 104. Air passed through the filter unit 104 may flow to the outlet air flow pathway 105 where a flow generator 110 may force the air to the first air outlet 101.

In the configuration above, each flow guide 116 may function to separate between the inlet side and outlet side of the filter unit 104. Each flow guide 116 may also function to separate the air received from the air inlet 102 from the filtered air flowing towards the flow generator 110.

In an alternative configuration, the flow guide 116 may not have a dual function of guiding inlet air to the filter unit and guiding filtered air between the filter unit outlet and the flow generator. For example, the air inlets 102, the flow guides 116, the filter unit 104, and the flow generators 110 may be arranged to be linear or sequentially adjacent to each other. Here, each flow guide 116 only ducts the air between the air inlet 102 and the filter unit 104.

A pair of thermoelectric devices 117 may also be included in the upper region of the body 100. Each thermoelectric device 117 may be a semiconductor device that heats and/or cools air, for example, using the Peltier effect. In alternative embodiments, other types of known thermal elements may be employed, such as, a heater, a cooler, or a combination thereof. For example, a refrigeration cycle, having a compressor, evaporator, and condenser, may be utilized to provide cooling and/or heating of air. In another example, a resistance heater may be utilized to provide heating of the air.

In the present embodiment, there is a pair of thermoelectric devices 117. Thus, in the following description of one of the thermoelectric device 117, it will be understood that other thermoelectric device is the same. To this end, each thermoelectric device 117 has a first side 118 and a second side 119. Depending on the direction of current supplied to the thermoelectric device 117, one side may be cooled or heated while the other side is respectively heated or cooled. For example, when the first side (i.e., outward) 118 is cooled, the second side (i.e., inward) 119 is heated. Conversely, when the first side 118 is heated, the second side 119 is cooled.

Each thermoelectric device 117 may heat or cool the air in the outlet air flow pathway 105 (see FIG. 7) that has passed through the filter unit 104. To facilitate this, the second side 119 of the thermoelectric device 117 may be exposed to the outlet air flow pathway 105. Depending on the operation mode of the thermoelectric device 117, the second side 119 may heat or cool the air passing through the outlet air flow pathway 105. The heated or cooled air may then be sucked into a respective flow generator 110.

A processor may control the direction of the current flowing through thermoelectric device 117. For example, a voltage source coupled to the thermoelectric device 117 may be coupled to an analog-to-digital converter (A/D). The A/D converter may be able to generate positive or negative values to control the voltage and therefore the current applied to the thermoelectric device 117. In other embodiments, the A/D converter could have half of its output values corresponding to negative current and half corresponding to positive current.

An exhaust vent 130 may be provided at the upper region of the body 100 when a thermoelectric device 117 is used in the drying apparatus. FIG. 5 shows a pair of exhaust vents 130 associated with the pair of thermoelectric devices 117 that are included in the upper region of the body 100, as illustrated in FIG. 5. Each exhaust vent 130 may be coupled to the first side 118 of a respective one of the thermoelectric devices 117. One or more exhaust vents 130 may be provided at the upper region of the body.

When the thermoelectric device 117 operates as a heater, the cool exhaust air may be vented by a respective exhaust vent 130 to the outside of the drying apparatus 10. When the thermoelectric devices 117 operates as a cooler, the hot exhaust air may be vented by the exhaust vents 130.

FIG. 6 is an illustration of air flow through the parts of the upper region of the body 100 according to the embodiment of the present invention. FIG. 7 is another illustration of the air flow through the parts of the upper region of the body 100. The air flow through the components of the upper region of the body 100 will be described with respect to one flow generator 110 as the air flow will be similar for the other flow generator 110.

The present embodiment will now be described in greater detail with reference to FIGS. 6 and 7. When the flow generator 110 operates, air is received through the air inlet 102 and through the flow guide 116 thereby arriving at the front surface of the filter unit 104 as illustrated by air flow arrows 106 and 107 in FIG. 7. The air then passes through the front surface of the filter unit 104. The filtered air exits through the sides of the filter unit 104.

The filtered air, after exiting filter unit 104, arrives at the outlet air flow pathway 105 illustrated by air flow arrows 108 in FIG. 7. The filtered air in the outlet air flow pathway 105 may be heated or cooled by the thermoelectric device 117. The exhaust air from the thermoelectric device 117 may then be vented by the exhaust vent 130 as described above, and as illustrated by air flow arrow 131. The heated or cooled air illustrated by air flow arrow 108 is sucked down into and through the flow generator 110, and then forced, by the flow generator 110, onwards to the first air outlet 101, as illustrated by air flow arrow 109 in FIG. 7.

A configuration of an air conditioning system of the body 100 has been described above. The drying apparatus 10 having the configuration above may vent cool air or hot air to condition a space in which the drying apparatus is occupying. The space may be a bathroom. During hot days the drying apparatus 10 may cool the bathroom. During cold days the drying apparatus 10 may heat the bathroom. The drying apparatus may also use the air conditioning system described herein to dry a user. For example, the cool air or hot air forced by the flow generator 110 is vented by the first air outlet 101 along the periphery of the body 100 at the drying face 14 (see FIGS. 1-3). A user presenting themselves at the drying face 14 may dry themselves through the vented cool air or hot air.

FIG. 8 is a view illustrating a connection between the flow generators 110 and the first air outlet 101 of the body 100, according to an embodiment of the present invention.

As shown, the flow generators 110 force the airflow into a duct 121. At the duct 121, the forced airflows from the two flow generators 110 are combined into a single forced airflow. The duct 121 then guides the combined forced airflow through a common opening 125 into the first air outlet 101 of the body 100. In the present embodiment, a resistance heater 120 is disposed at the common opening 125 to further heat the forced airflow. This configuration may be used where it is desirable that a heated forced airflow from the flow generators 110 is further heated prior to being expelled into the first air outlet 101. This configuration may be used, for example, where a quick heating of a bathroom is desired or a more heated forced airflow is desired during a drying of the user.

While in FIG. 8, a resistance heater has been illustrated, any other suitable thermal elements may be used. In other configurations the thermal element may be a thermoelectric device that may be used to selectively heat or cool the forced airflow flowing out of the common opening 125.

FIG. 9A illustrates a connection between the flow generators 110 and the first air outlet 101 of the body 100 according to an alternative embodiment of the present invention. Unlike the embodiment illustrated in FIG. 8, the outlet of each of the flow generators 110 directly connects to the first air outlet 101 of the body 100 according to the alternative embodiment of FIG. 9A. The first air outlet 101 thus includes air openings 128 at the upper side of the first air outlet 101. Each air opening 128 communicates directly with the outlet of respective one of the flow generators 110. By having the outlet of each flow generator 110 directly connect to the first air outlet 101 of the body 100, the connection structure may be simplified and the forced airflow may be directly expelled into the first air outlet 101.

The forced airflow in the present embodiment may be stronger than the forced airflow of the embodiment of FIG. 8. The reason is that, in the forced airflow of FIG. 8, the vertical direction of the forced airflows of the respective flow generators are forced into a horizontal direction by the duct 121, then made to collide with each other to form a single forced airflow. The duct 121 then forces the single combined forced airflow to flow vertically downward into the first air outlet 101. In contrast, in the embodiment of FIG. 9A, the forced airflows of the respective flow generators flow vertically downward directly into the first air outlet 101.

FIG. 9B is a rear perspective view showing a connection between one of the flow generators and the first air outlet of FIG. 9A. As shown in FIG. 9B, in this configuration, the flow generator 110 includes a fan assembly 1101 and a conduit 1102. The fan assembly may be an axial fan and the like. Preferably, the fan assembly includes a high speed motor that sucks in air and expels air at high speed. For example, the fan assembly may be Smart Inverter Motor™ available from LG Electronics, Inc., Republic of Korea, that operates at speeds up to 115,000 revolutions per minute (RPM). Similar fan assembly may be used.

The fan assembly 1101 is connected to the conduit 1102 which may be a cylindrical tube that connects to the first air outlet 101. However, it should be appreciated that the conduit 1102 is not limited to a cylindrical tube and other configurations may be used such as an oval tube, a square tube, a rectangular tube, etc. The conduit 1102 contains the air sucked in by the fan assembly 1101 within the confines of the conduit 1102 thereby increasing the speed of the forced airflow if not maintaining the speed of the forced airflow expelled by the fan assembly 1101. Thus, a forced airflow of relatively high speed is introduced into the first air outlet 101.

FIG. 10 is a cross-sectional view along line A-A' of FIG. 3 further illustrating the first air outlet 101 of the body according to an embodiment of the present invention. As shown in part, the first air outlet 101 is distributed around at least a partial periphery of the body 100. In the present embodiment, the first air outlet 101 actually follows the contour of the periphery of the drying face 14 of the body 100 (see FIG. 3). However, one skilled in the art will readily appreciate that the air outlet 101 could take on any one of a number of other configurations. For example, in an alternative embodiment, the first air outlet 101 may be configured as a plurality of slits placed vertically and/or horizontally across the drying face 14 (see, for example, FIG. 34).

Again, referring to FIG. 10, the first air outlet 101 according to the present embodiment, includes a duct 122, a vent 126, and a fin 127. The duct 122 receives the forced airflow from the upper region of the body 100, and ducts the forced airflow along the periphery of the body 100.

The duct 122 is connected to the vent 126 which also runs along the periphery of the body 100 and is visible from the drying face 14 of the body 100 (see FIGS. 1 and 3). The forced airflow exits the body 100 through the vent 126. The fin 127 may be disposed in the vent 126 which also runs along the periphery of the body 100 and divides the space formed by the vent 126 into two. The fin 127 may aid in directing the forced airflow flowing out from the vent 126. In the present embodiment, the fin 127 is fixed in the vent 126 and directs the forced airflow in one direction which is straight outwardly.

In an alternative configuration, the fin may be adjustable to be moved to the left or to the right to direct the forced airflow exiting the body 100 in the left direction or the right direction, as desired. For example, the fin of the left side of the body 100 may be moved in the right direction and the fin on the right side of the body 100 may be moved in the left direction so that at least a portion of the forced airflow may converge inwardly towards a center with respect to the body 100. Conversely, the fin of the left side of the body 100 may be moved in the left direction and the fin on the right side of the body 100 may be moved in the right direction so that at least a portion of the forced airflow may diverge outwardly away from the center with respect to the body 100.

Thus far, the body 100 of the drying apparatus 10 according to embodiments of the present invention has been described. The drying apparatus 10 may include a bar 200 that may expel forced airflow. The bar 200 may be movable relative to the body 100, as previously mentioned.

FIGS. 11A and 11B are views illustrating a bar 200 at two respective driven positions along the longitudinal length L1 of the body 100 according to the embodiment of the present invention.

The bar 200 may be moveable along the longitudinal length L1 of the body 100 driven by a drive apparatus to be described later. The travel bounds of the bar 200 may be fixed to coincide with longitudinal length L1, of the body 100 or, alternatively, it could be adjustable to more closely coincide with the height by a particular user. Accordingly, the drying apparatus 10 may be configured such that when the user is positioned adjacent to the drying face 14, the desired length (e.g., the height) of the user may be covered by the drying airflow of the second air outlet 201 by the movement of the bar 200. For example, the bar 200 may move from the top position as shown in FIG. 11A to the bottom position as shown in FIG. 11B (and back in repetition if desired) while expelling forced airflow from the second air outlet 201, where the distance traveled between the position of the bar 200 in FIG. 11A and in FIG. 11B may correspond with the height of the user.

FIG. 12A is a view illustrating a driving apparatus of the bar 200 according to the embodiment of the present invention. FIG. 12B is a close up view of the drive apparatus illustrated in portion A of FIG. 12A. FIG. 12C is bottom view of the drive apparatus illustrated in FIG. 12B, and FIG. 12D is a view illustrating an exemplary fastening mechanism 210 of the bar 200 according to an embodiment of the present invention.

Referring to FIGS. 12A and 12B, the drive apparatus 11 drives the bar 200 relative to the body 100. The drive apparatus 11 may be provided at the body 100. In accordance with this exemplary embodiment, the drive apparatus 11 includes a lead screw 40, a nut 41, and a motor 50 (see FIG. 13). The lead screw 40 is threaded and may have a length corresponding to the longitudinal length L1 of the drying face 14 of the body 100. The motor 50 may be located at the upper region of the body 100. However, the motor 50 may be located anywhere as long as the motor 50 is able to rotate the lead screw 40 thus causing the nut 41 to move up or down the lead screw 40, depending on the direction of rotation of the lead screw 40, along the longitudinal length L1 of the drying face 14 of the body 100. A shaft of the motor 50 may be coupled to one end of the lead screw 40 (e.g., the upper end of the lead screw 40). Therefore, when the motor 50 rotates the shaft clockwise, the lead screw 40 rotates clockwise. When the motor 50 rotates the shaft counterclockwise the lead screw 40 rotates counterclockwise.

Referring to FIGS. 12B and 12C, the nut 41 is threaded corresponding to the thread of the lead screw 40 and is thus mated with the lead screw 40. The nut 41 is fixed to the bar 200. In the present embodiment, the nut 41 is fixed to a bracket assembly 44 to which the bar 200 is attached. However, one skilled in the art will appreciate that other configurations for fixing the nut 41 to the bar 200, direct or indirect, are possible. When the lead screw 40 is rotated by the motor 50, the nut 41 rides up or down on the lead screw 40 which, in turn, moves the bar 200 up or down.

For example, when the motor 50 rotates the lead screw 40 clockwise, the nut 41 moves up the lead screw 40, which in turn moves the bar 200 up with respect to and along the longitudinal length of the body 100. On the other hand, when the motor 50 rotates the lead screw 40 counterclockwise, the nut 41 moves down the lead screw 40, which in turn moves the bar 200 down with respect to and along the longitudinal length of the bar 200.

In another example, when the motor 50 rotates the lead screw 40 clockwise, the nut 41 moves down the lead screw 40, which in turn moves the bar 200 down with respect to and along the longitudinal length of the body 100. When the motor rotates the lead screw 40 counterclockwise, the nut 41 moves up the lead screw 40, which in turn moves the bar 200 up with respect to and along the longitudinal length of the bar 200.

Referring to FIGS. 12C and 12D, the bracket assembly 44 may have one or more guide members 45 for running in one or more corresponding guide tracks 46 of the body 100. In the present embodiment, as illustrated in FIG. 13, a dual guide track is used, including a guide track 46 which runs vertically on both sides of the body 100. Together, the guide members 45 and guide tracks 46 guide the bar 200 along a predetermined vertical path.

For example, the guide members 45 and guide tracks 46 may operate to retain the bar 200 against rotational movement about the longitudinal axis which may be caused due to the rotation of the lead screw 40. The dual guide tracks 46 may also provide stability to the bar 200 as it moves up and down along the body 100.

In the present embodiment, the bar 200 may include a fastening mechanism 210 to fasten to the guide member 45 of the bracket assembly 44. A fastening mechanism 210 is provided at both ends of the bar 200 in the present embodiment. The guide member 45 may include a recess 47 having a shape corresponding to the shape of the fastening mechanism 210. When the bar 200 is attached to the bracket assembly 44, the fastening mechanism 210 slides into the recess 47 of the guide member 45, thus attaching the fastening mechanism 210 to the guide member 45.

The fastening mechanism 210 may include one or more protrusions 212 that protrude from the sides of the fastening mechanism 210. The one or more protrusions 212 may be elastically deformable or may be spring loaded. When the fastening mechanism 210 has been fully inserted into the recess 47 of the guide member 45, the one or more protrusions 212 may hook into one or more corresponding slots in the recess 47 to attach the bar 200 to the bracket assembly 44.

The fastening mechanism 210 may provide for easy detachment of the bar 200 from the bracket assembly 44. Because the protrusions 212 are elastically deformable or spring loaded, the bar 200 may be detachable from the body 100 by exerting sufficient force. The bar 200 may be replaced with another bar 200 or may be serviced without the need for taking the entire drying apparatus 10 for servicing.

An embodiment of a drive apparatus using a lead screw and nut has been described. In other exemplary configurations, the bar 200 may be driven upon the body 100 by components other than a lead screw and nut. In fact, any suitable drive apparatus capable of providing the desired relative motion may be used. For example, the lead screw and nut may be replaced by a rack and pinion system, a pulley and belt drive, or, where the desired motion is a linear motion, a linear actuator.

FIG. 13 is a front view showing a drying apparatus including a bar 200 and a second bar 300 according to another embodiment of the present invention.

Referring to FIG. 13, a drying apparatus 10 may comprise a bar 200 and a second bar 300. The second bar 300 may include a third air outlet 301 and may be moveably driven relative the body 100. The second bar 300 may be associated with its own nut 43, and the nut 43 with its own lead screw 42. The nut 43 is fixed to its own bracket assembly 48 such that the second bar 300 may be driven relative the body 100. The lead screw 42 may be driven by its own motor 52. The components associated with the driving of the second bar 300, and the functionality thereof, are similar to that described above with respect to the bar 200, and thus further description will be omitted in order to avoid duplicate description.

Based on the configuration of the exemplary embodiment described above, those skilled in the art will readily appreciate that even more bars may be employed in the drying apparatus 10. The drive apparatus 11 may be modular to accommodate multiple bars at the body 100.

As an example, as shown in FIG. 13, the bar 200 is associated with its own motor 50, lead screw 40, nut 41, and bracket assembly 44. By operation of the motor 50, the lead screw 40, and the nut 41, the bar 200 moves up and down relative to the body 100. Similarly, the second bar 300 is associated with its own motor 52, lead screw 42, nut 43, and bracket assembly 48. By operation of the motor 52, the lead screw 42, and the nut 43, the second bar 300 moves up and down relative to the body 100. The motor, the lead screw, the nut, and the bracket assembly associated with one bar do not act on the other bar. That is, the motor, the lead screw, the nut, and the bracket assembly of one bar only operate on that bar.

Accordingly, with each additional bar, a corresponding motor, a lead screw, a nut, and a bracket assembly may be added to the drive apparatus 11 to accommodate that bar. In this manner the drying apparatus 10 may be configured with a number of bars on the body 100 according to the preference of the user. Alternatively, each drive apparatus may accommodate more than one bar spaced apart from each other, which move in unison along the longitudinal length of the body 100.

FIG. 13 shows the bar 200 and the second bar 300 using the same guide track(s). In alternative exemplary configurations, the bar 200 and the second bar 300 may use separate guide tracks. By this configuration the bar 200 or the second bar 300 may be operated to any desired location along the extent of its drive path, irrespective of the position of the bar 200 or the second bar 300.

FIG. 14 is a top perspective view of the bar 200 according to the embodiment of the invention; FIG. 15 is a bottom perspective view of the bar 200 according to the embodiment of the invention; and FIG. 16 is a rear view of the bar 200 according to an alternative configuration to that illustrated in FIG. 15.

Referring to FIGS. 14 and 15, the bar 200 may include a second air outlet 201 in which forced airflow is expelled at different locations relative to the body 100 depending on the location of the bar 200 relative to the body 100. As described previously in relation to the drive apparatus 11 between the bar 200 and body 100, two guide members 45 may guide the bar 200 in its movement relative the body 100.

One or more air inlets 205 may be located at the ends of the bar 200. The air inlet 205 may be protected in a cavity formed between the end of the bar 200 and a shield 206. The shield 206 may extend from the end of the bar 200 to form a shield at the top and side surfaces thereof except for the bottom surface. The open bottom surface of the shield 206 allows for the air inlet 205 to access inlet air. This configuration may act to prevent drips or splashes of water from entering the air inlet 205. The air inlet 205 provides for inlet air to enter into the bar 200 which houses one or more flow generators 204 (see FIG. 17).

FIG. 16 illustrates two air inlets 202 located at a back side of the bar 200 for supplying air to be vented from the second air outlet 201. In contrast, the air inlets 205 in the configuration of FIG. 15 are located at each end of the bar 200, as explained above. As the bar 200 extends laterally towards a user, more so than the body 100, the bar 200 may be more likely to become wet due to its closer proximity to the user. It may thus be desirable that the one or more air inlets 202 are disposed away from the user. As such, in the configuration of FIG. 16, the air inlets 202 are provided on the back side of the bar 200, as previously explained.

FIG. 17 is a partial view of various internal parts of the bar 200 according to an embodiment of the present invention. In particular, FIG. 17 shows the bar 200 with its cover removed to reveal a pair of flow generators 204 and an air conduit 207. The bar 200 may include a pair of flow generators 204 that receives inlet air from the air inlets 202 and generates forced airflow through the air conduit 207. The air conduit 207 may include an intermediate outlet 208 through which the forced airflow may pass and be vented out by the second air outlet 201.

FIG. 18 is an exploded view showing various parts of the bar 200 according to the embodiment of the present invention described above with respect to FIG. 17.

Referring to FIG. 18, the bar 200 has its cover 230 removed to show various internal parts including a pair of flow generators 204, a pair of motors 220, a pair of thermal devices (for example, resistance heaters, thermoelectric devices, and other suitable devices could be used), and an air conduit 207. The bar 200 has a pair of flow generators 204 which receive inlet air from one or more air inlets (see FIGS. 15 and 16). The pair of flow generators 204 generate forced airflow from the received air which has a relatively high speed. For example, the flow generator may be Smart Inverter Motor™ that sucks in air and expels air at high speed by operating up to 115,000 RPM. However, other types of axial fan assembly may be used.

The forced airflow from the pair of flow generators 204 pass through the air conduit 207 to be expelled from the intermediate outlet 208. The air conduit 207 is shown to be cylindrical but is not limited to this shape and other configurations may be used such as an oval tube, a square tube, a rectangular tube, etc. The air conduit 207 contains the air sucked in by the pair of flow generators 204 within the confines of the air conduit 207 thereby increasing the speed of the forced airflow if not maintaining the speed of the forced airflow expelled by the pair of flow generators 204. Thus, a forced airflow of relatively high speed is introduced into the intermediate outlet 208. The expelled air is ultimately forced out of the second air outlet 201. While the present embodiment illustrates using a pair of flow generators, in other configurations a single flow generator or more than two flow generators may be used.

In the present embodiment, a pair of resistance heaters 120 are shown as part of the bar 200. A resistance heater 120 is located downstream of each of the flow generators 204. In alternative configurations, the resistance heater may be located upstream of the flow generator or may be integrated with the flow generator. In the present embodiment, the flow generators 204 and resistance heaters 120 are at least partially enclosed within the air conduit 207 (see FIG. 17). The air conduit 207 may guide the air heated by the resistance heaters 120 towards the intermediate outlet 208 and out through the second air outlet 201.

While this embodiment uses resistance heaters to heat the inlet air flow, in another exemplary embodiment, a thermoelectric device, for example, using the Peltier effect may be used to heat or cool the inlet air flow. In this configuration, the bar 200 is not limited to expelling heated air but may also expel cold air.

The bar 200 may further comprise one or more motors 220. As shown in FIG. 18, one or more motors 220 may be provided along a longitudinal axis of the bar 200 which may be parallel to the drying face 14 of body 100. The one or more motors 220 may cause the bar 200 to tilt up or down by rotating about its longitudinal axis. By tilting the bar 200 up or down, the bar 200 may expand the coverage area to which the forced airflow may be applied. Also, by tilting the bar 200 up and down continuously while blowing forced air, the bar may enhance drying performance.

FIGS. 19 and 20 are views illustrating exemplary ways in which forced air may be expelled from the second air outlet 201, according to exemplary embodiments of the present invention, based on the shape and/or size of the second air outlet 201.

The second air outlet 201 may be configured such that the expelled airflow may cover a width of the user as the bar 200 moves up or down along the length of the user. The bar 200 may be provided with a suitable second air outlet 201 that may direct the forced airflow across the full width of the user.

Referring to FIG. 19, more specifically, the second air outlet 201 may be configured to provide a laterally expanding forced airflow. As the forced airflow flows further away from the second air outlet 201, the forced airflow expands at least horizontally to better cover a width of the user's body. An example of a structure to form an expanding forced airflow is shown in FIG. 18.

The intermediate outlet 208 of the air conduit 207 may be a circular, oval, or quadrilateral air outlet from which the forced airflow may fan out as the air flow travels further from the second air outlet 201. As an example, a circular air outlet may form a relatively narrow but relatively strong forced airflow over a small area of the user's body. A rectangular air outlet may form a relatively wider but relatively weaker forced airflow over a larger area of the user's body.

The degree to which the forced airflow fans out may be determined by the angle of the arc at the intermediate outlet 208. As an example, a narrow arc may form a narrow but strong airflow covering a small part of the user's body. A wider arc may form a wider but weaker airflow covering a wider part of the user's body. The shape of the intermediate outlet 208 and the angle of the arc may be selected depending on a desired effect of the forced airflow over the user's body.

Referring now to FIG. 20, the second air outlet 201 may alternatively be an elongated slit across the longitudinal length (in the lateral direction relative to the longitudinal length of the body) of the bar 200 to expel a planar blade of outlet air. In one configuration, the length of the slit may be sufficient to cover a width of the user's body. In this configuration, as the bar 200 travels vertically up and/or down with respect to the body 100, the forced airflow of the second air outlet 201 may cover all parts of the user's body. For this configuration, the intermediate outlet 208 may be formed as an elongated slit running across the longitudinal length of the air conduit 207. The second air outlet 201 being an elongated slit as shown in FIG. 20 corresponds to the slit of the intermediate outlet 208.

FIGS. 21A and 21B are two views of a portion of a drying apparatus showing a portion of the body 100 and the bar 200 with the second air outlet 201. The orientation of the second air outlet 201 of the bar 200 may be changed based on the drying need. For example, the second air outlet 201 may be selectively reoriented about a substantially horizontal axis by rotating at least a part of the bar 200 in the direction of arrow 213, as shown in FIG. 21B, thereby angling the opening of the second air outlet 201 in a relatively downward direction. The bar 200 may be rotated by a pair of motors 220 located on either end of the bar 200 (see FIG. 18). However, the present embodiment is not limited thereto and other devices may be used to rotate the bar 200. The selective control may be provided by a controller, such as the controller 53, which will be later described.

FIGS. 22A and 22B are side views of a drying apparatus 10 with the second air outlet 201 orientated in two different directions. As illustrated in FIG. 22A, the second air outlet 201 is orientated such that the forced airflow 215 is directed horizontally outwards from the drying apparatus. According to various embodiments, the second air outlet 201 may be controlled, for example, to reorient the forced airflow 215 either upwards in the direction of arrow 214 and/or downwards in the direction of arrow 213. This movement of the second air outlet 201 may be used to blow forced airflow over a wide area. The apparatus of FIG. 22B has the same configuration as illustrated in FIG. 22A, but the orientation of the second air outlet 201 has been changed so that the forced airflow 215 is directed downwards in the direction of arrow 213. Or when the second air outlet 201 is being directed downward, the forced airflow 215 is expelled. The second air outlet 201 is then reorientated to its original position. These movements of the second air outlet 201 may be used to perform a sweeping action.

In addition to being redirected upwards and/or downwards, or around one or more other axes, in some exemplary embodiments the forced airflow 215 may be selectively expanded, as illustrated in FIGS. 22C and 22D.

The second air outlet 201 illustrated in FIG. 22C is substantially similar to the second air outlet 201 illustrated in FIG. 22A. However, the second air outlet 201 of FIG. 22C is configured such that the forced airflow 215 is jet-like with little or no degree of expansion in the vertical or horizontal direction. Alternatively, the second air outlet 201 may be configured to provide a greater degree of expansion of the forced airflow 215. For example, as illustrated in FIG. 22D, the forced airflow 215 may expand in a fan-like configuration. In the configuration of FIG. 22C and FIG. 22D, the degree to which the forced airflow fans out may be determined by the angle of the arc at the intermediate air outlet 208 (see FIGS. 17 and 18). As an example, a narrow arc may form a narrow but strong airflow covering a small part of the area. A wider arc may form a wider but weaker airflow covering a wider area. The shape of the intermediate outlet 208 and the angle of the arc may be selected depending on a desired effect of the forced airflow over the user's body, for example. In one configuration, the intermediate outlet 208 may be formed with an adjustable nozzle so that the angle of the arc at the intermediate outlet 208 is adjustable, thereby depending on the angle of the arc, a jet-like forced airflow or a fan-like airflow may be expelled. A motor under the control of the controller 53 can be used to adjust the adjustable nozzle.

The forced airflow 215 may be additionally, or alternatively, expanded in a lateral direction, and may have different characteristics, as illustrated in FIGS. 23A and 23B.

As illustrated in FIG. 23A, the second air outlet 201 may be localized on the bar 200, and the forced airflow 215 may expand at least laterally from the second air outlet 201. This provides for an forced airflow 215 which increases in width with increasing distance from the bar 200, and the width of the forced airflow 215 is greater than the width of the second air outlet 201.

As illustrated in FIG. 23B, the lateral expansion and contraction of the forced airflow 215 may be controlled. The forced airflow 215 may be controlled to be re-directed in a left and/or right direction as shown by arrows 216 and 217 of FIG. 23B. The airflow direction may be controlled by moving a nozzle or by incorporating fins or flow guides in the nozzle. For example, a nozzle at the intermediate outlet 208 may be moved in a left and right direction. A motor under the control of the controller 53 can be used to move the adjustable nozzle left and right.

As illustrated in FIGS. 23C and 23D, the second air outlet 201 may be an elongated slit across the longitudinal length of the bar 200, such that the forced airflow 215 is substantially planar. In one configuration, the length of the slit may be sufficient to cover a width of the user's body. For this configuration, the intermediate outlet 208 may be formed as an elongated slit running across the longitudinal length of the air conduit 207. The second air outlet 201 being an elongated slit as shown in FIG. 23C corresponds to the slit of the intermediate outlet 208. In this configuration, as the bar 200 travels vertically up and/or down with respect to the body 100, the forced airflow 215 of the second air outlet 201 may cover a width of an area corresponding to the length of the slit.

The forced airflow 215 may be configured to extend from the second air outlet 201 with minimal or no lateral expansion, as illustrated FIG. 23C. Or the forced airflow 215 may be laterally expanded further, or may be constrained to be narrower than the air outlet 201. For example, as illustrated in FIG. 23D, the second air outlet 201 may be configured to change the degree of lateral expansion of the forced airflow 215 by contracting the forced airflow 215 in the direction of the arrows 218 and 219. For this configuration, a plurality of vertical shutters may be formed at the outlet of the intermediate outlet 208. To contract the forced airflow, half of the shutters starting from the left side may be moved in the right direction and half of the shutters starting from the right side may be moved in the left direction. Conversely, to expand the forced airflow, half of the shutters starting from the left side may be moved in the left direction and half of the shutters starting from the right side may be moved in the right direction. The shutters may be moved by a motor under the control of the controller 53.

FIGS. 23E and 23F are alternate views of the bar 200 illustrating another orientation of the second air outlet 201 and the forced airflow 215. The configuration of the second air outlet 201 of FIG. 23E is substantially similar to the configuration of the airflow outlet illustrated in FIGS. 23A and 23B. In addition, or alternatively, to any lateral expansion or contraction of the forced airflow 215, the second air outlet 201 may be operated to laterally redirect the forced airflow 215. For example, as illustrated in FIG. 23E, the forced airflow 215 can be redirected side to side in the direction of the arrow 218. This may be done through a movable nozzle as described above.

The second air outlet 201 of FIG. 23F has an elongated or slit-like configuration, as also illustrated in FIGS. 23C and 23D. As also illustrated in FIG. 23F, the forced airflow 215 from the outlet 201 may also be redirected side to side, for example, in the direction of the arrow 218, as illustrated in FIG. 23F. This may be done through movable shutters as described above.

The up and down movement of the second air outlet 201 may be provided by a corresponding movement of a part or the whole of the bar 200 with which the second air outlet 201 is associated. Examples of such movement of a part or all of the bar 200 are illustrated in FIGS. 11A-11B as described above.

One or more drive mechanisms may be provided between the body 100 and the bar 200 to enable the up and down movement of the bar 200. An example of such a drive mechanism is the drive apparatus 11, as illustrated in previously described FIGS. 12A-12C. One or more drive mechanisms may be provided between the body 100 and the bar 200 to enable the rotational movement of the bar. An example of such a drive mechanism may be a pair of motors 220 provided at each side of the bar 200, as previously illustrated in FIG. 18. The motor 220 may be a rotational motor or a stepper motor.

In addition to, or alternatively, it may be possible to reorient or otherwise configure the second air outlet 201 itself to redirect the forced airflow 215. Examples of such configurations where the air outlet 201 is reoriented to redirect the forced airflow 215 are illustrated in FIGS. 23A-23F. The second air outlet 201 may include one or more nozzles, shutters, or the like to redirect the forced airflow from the second air outlet 201. Examples been previously described herein. The reorientation or reconfiguration of the air outlet 201 may include the reorientation or reconfiguration of one or more of the flow guide elements. For example, when the forced airflow 215 is redirected laterally, as illustrated in FIGS. 23E and 23F, the air outlet 201 may include one or more vertical fin flow guides. These vertical fin flow guides may be reoriented in the direction of the arrow 218 of FIGS. 23E and 23F, such that the forced airflow 215 is reoriented as shown.

Thus far, the various embodiments described herein includes one bar 200. However, the drying apparatus is not limited to having one bar 200. For example, for a faster drying process, two or more bars may be used. All of the exemplary embodiments described herein may include one or more bars.

FIG. 24 is an electrical schematic diagram of a drying apparatus 10 according to an embodiment of the present invention. A controller 53 controls the overall operation of the drying apparatus 10. The controller 53 may be a microprocessor, an integrated circuit, an electrical circuit, a logical electrical circuit, and the like.

The controller 53 may control the operation of the body flow generator 110 and the thermoelectric device 117 of the body 100; the controller 53 may control the operation of the flow generator 204 and the resistance heater 120 associated with the bar, and may control the motor 220, among others. The various operations which are performed by the components have been described above and further description will be omitted. The controller 53 may access or store information in a memory 58 for controlling the operation of the drying apparatus 10.

The drying apparatus 10 may include one or more sensors 209 which are also controlled by the controller 53. These sensors 209 may variously be associated with the body 100 and the bar 200 (e.g., FIGS. 12C and 15). In some embodiments, one or more sensors 209 may be located remotely from the drying apparatus 10.

According to various embodiments, such as the embodiments shown in FIGS. 12C and 15, for example, the one or more sensors 209 may be associated with the bar 200. The controller 53 may receive sensor information from the one or more sensors 209 of the bar 200 and the controller 53 may operate the drying apparatus 10 utilizing the sensor information as an operation parameter.

As an example, sensing information of the one or more sensors may be utilized by the controller 53 to determine various characteristics of the environment surrounding the apparatus and/or various characteristics and/or conditions of a user. For example, the sensing information may be utilized to determine the presence of a user; physical characteristics of the user including their overall and/or particular dimensions; wetness of a user's body and/or different parts of their body; temperature or heat of the ambient air and/or humidity of the ambient air, among others. To achieve this, the drying apparatus 10 may include one or more sensors 209 described below.

The one or more sensors 209 may include a thermal sensor such as an infrared sensor. The infrared sensor may be used to obtain information on the heat of the surroundings. For example an infrared sensor may be used as a temperature sensor to sense the temperature of the ambient air. Information on the temperature of the ambient air may be obtained to determine whether to condition the ambient air.

The infrared sensor may be used on a user's body located adjacent to the drying apparatus 10. Information from the infrared sensor may be utilized to infer or determine moisture levels of the user's body, and/or specific parts of the user's body. Information from the infrared sensor may be utilized to obtain an indication of the overall dimensions of a user's body, where body temperature differs from the temperature of the surrounding air.

The one or more sensors 209 may include a proximity sensor. The proximity sensor may be utilized to determine the proximity of the user to the drying apparatus 10. For example, information from the proximity sensor may be utilized to determine the distance of the user from the drying face 14 of the drying apparatus 10. When the user is within a predetermined distance of the drying face 14, the drying apparatus may be activated to dry the user. Information from the proximity sensor may utilized to control a forced airflow speed from the air outlet 101 and/or the air outlet 201 dependent on the distance of the user, in order to obtain a desired forced airflow speed directed at the user.

The proximity sensor may be utilized to determine if a user is undesirably close to the drying apparatus or a part thereof. For example, for safety reasons, it may be desirable to limit or prevent the movement of the bar 200 when a person is within a particular distance or position relative to it. This may include where part of a person's body is located above or below the bar 200, within its path of movement.

The one or more sensors 209 may include an image sensor. The image sensor may be utilized to obtain image information of the surroundings, determine the presence of a user, and determine overall dimensions of a user's body and/or specific parts of the user's body. The image sensor may be used in conjunction with or in lieu of the thermal sensor for information such as those mentioned above in order to obtain a more accurate information.

The one or more sensors 209 may include a humidity sensor. The humidity sensor may also be utilized to obtain information on the humidity of surrounding ambient air, for example, a humidity level of the bathroom in which the drying apparatus is installed. The drying apparatus 10 may be activated or used to remove moisture in the air until the humidity level is below a predetermined level. The humidity sensor may also be utilized to obtain information regarding the level of wetness/dryness of the user's skin. The information may be used to control heat applied to the forced airflow so that the user's skin does not become too dry.

Besides the exemplary sensors described above, other sensors known in the art may be used to achieve a desired result.

As previously mentioned, the drying apparatus 10 may perform air conditioning of a given space. For example, the space may be a bathroom. During hot days, the drying apparatus 10 may cool the bathroom and during cold days the drying apparatus 10 may heat the bathroom for the comfort of the user. In such a scenario, the controller 53 may determine the ambient temperature or ambient heat level of the bathroom, and use this information to control the temperature to the satisfaction of the user.

For example, in a hot bathroom, the user may perspire to keep cool. The perspiration evaporates taking some of the heat from the user's body providing a sensation of coolness. However, when the humidity level is high in the bathroom, the perspiration does not evaporate as efficiently and thus remains as moisture on the user's body. This may cause discomfort to the user as the user feels hotter than the temperature of the bathroom.

Accordingly, the controller 53 in conditioning the bathroom may need to consider the temperature as well as the humidity. In one embodiment, the controller 53 may consider a comfort level index correlating temperature and humidity to determine user comfort. The temperature-humidity index (THI), also known as the discomfort index, may be used to determine a comfort sensation with respect to the current sensed temperature and the current sensed humidity.

There are several equations devised to determine THI. One equation may be:

$$THI=T_d-(0.55-0.55RH)(T_d-58)$$

where $T_d$ is the dry-bulb temperature in ° F., and RH is the relative humidity in percent, expressed in decimal. For example, 50% relative humidity is 0.5.

It should be noted that the THI is not absolute but relative. Temperatures affect people differently. Various factors such as height, weight, sex, health condition, etc., may cause one person to feel temperature differently than another person.

Below is a table that illustrates a THI which reflects the comfort level of a typical person.

| Level | THI Range | Comfort Level |
|---|---|---|
| Very High | Above 80 | Everyone experiences discomfort |
| High | Between 75 and below 80 | 50% experiences discomfort |
| Normal | Between 68 and below 75 | Discomfort begins to be felt |
| Low | Below 68 | No discomfort is felt |

FIG. 25 is a flowchart illustrating a method for controlling temperature of a given space using a temperature-humidity index (THI), by a controller, according to one embodiment of the present invention.

Referring to FIG. 25, in step S100, the controller 53 may receive sense information from the thermal sensor. The information may be an ambient temperature of the bathroom. In step S110, the controller 53 may receive sense information from the humidity sensor. The information may be a humidity level of the bathroom. In step S120, the controller 53 may use the received temperature information and the humidity level information to determine the THI. One equation that the controller 53 may use to derive the THI may be the equation provided above. The equation may be stored in the memory 58 to be accessed by the controller 53.

In step S130, the controller 53 may determine whether the derived THI is greater than or equal to 75. The reference index of 75 may be stored in the memory 58. It should be noted that the reference index of 75 is not absolute. For example, the reference index of 75 may be increased or decreased in the memory 58 to tailor to individual user's need. If the THI is less than 75 the controller 53 may continue to step S160 where the controller 53 may terminate the control of the THI.

Otherwise, in step S130, if the controller 53 determines that the THI is greater than or equal to 75, the controller 53 may continue to step S140. In step S140, the controller 53 may send a signal to activate the flow generator. The flow generator may be either on or off, i.e., producing a constant air flow. Alternatively, the controller 53 can be configured to control a variable air intake amount by using an air intake amount value corresponding to the desired air flow. For example, the flow generator may be the flow generator 110 located at the body 100. At step S150 the controller 53 may activate the thermoelectric device 117. It should be noted that the activation of the flow generator and the thermoelectric device need not be in sequence; it can be simultaneous or in reverse order.

The controller 53 may send a signal to the thermoelectric device 117 to cool (or warm) the air sucked in through the air inlet 102. The cooled air may reduce the temperature of the intake air as well as dehumidify the air. The cooled, dehumidified air may then be expelled through the air outlet 101. The controller 53 may be configured to adjust the amount of heating or cooling via a heat level value. The heat level value can correspond to a heat level, either cooler or hotter than the ambient air. The controller 53 continues to step S100 to repeat steps S100 to S130.

At step S130, the controller 53 may again determine whether the THI is greater than or equal to 75. If the controller 53 again determines that the THI is greater than or equal to 75, the controller 53 continues to steps S140 and S150 and continues to intake air and to cool the air. The controller 53 continues unless and until the controller 53 determines at step 130 that the THI is less than 75. In which case, the controller 53 continues to step S160 where the controller 53 terminates the method.

In some instance, the forced airflow provides a wind chill to the user, which the system can also use as a comfort level to adjust air intake and temperature. This is where the user perceives the airflow at a temperature lower than that of the ambient air temperature. There are several equations devised to determine wind chill. For the purpose of this disclosure, reference may be made to the North American and UK wind chill index as follows:

$$T_{wc}=13.12+0.6215T_a-35.75v^{+0.16}+0.4275T_a v^{+0.16}$$

where $T_{wc}$ is the wind chill index, based on the Celsius temperature scale; $T_a$ is the air temperature in degrees Celsius; and v is the airflow speed in kilometers per hour.

Based on the above equation, the higher the forced airflow speed the lower the perceived temperature of the air flow by the user. Thus, when airflow speed increases the controller 53 may increase the temperature of the forced airflow to obtain the target temperature.

Embodiments may not have a sensor to determine the airflow speed, but can estimate it due to known constraints within the system. For example, the size of chambers for airflow, the power of the air flow generator, and the size of the outlet for the airflow are all known variables. Therefore, embodiments include estimating the airflow speed based on these known parameters. Embodiments may also include a table that correlates airflow speed with the speed at which the airflow generators operate. Therefore, for a known air flow generator input, the system may know the airflow speed based on corresponding predetermined values. In one embodiment, the target surface skin temperature of the user may be about 30 to about 32 degrees Celsius. Thus forced airflow heating or cooling may be provided to maintain or obtain this temperature.

In one embodiment the temperature of the forced airflow generated by the drying apparatus 10 should be at a temperature that provides little or no discomfort to the user. The Humidex index of apparent temperature may provide a suitable guide on the level of comfort or discomfort provided by a temperature applied to a user's skin. The Humidex index takes into account both temperature and relative humidity in determining the level of comfort or discomfort. The humidex formula is as follows:

$$H = T_{air} + \frac{5}{9}\left[6.11e^{5417.7530\left(\frac{1}{273.16}-\frac{1}{273.15+T_{dew}}\right)} - 10\right]$$

Where H denotes the Humidex, $T_{air}$ is the air temperature in ° C., and $T_{dew}$ is the dew point in ° C.

In some embodiments, the apparent temperature to be applied to the user is between 20 to 39° C. In a preferred embodiment, the apparent temperature to be applied to the user is between 20 and 29° C. As mentioned above, the apparent temperature may be determined by taking into account the wind chill factor of the airflow temperature.

FIG. 26 is a flowchart illustrating a method for controlling temperature using a wind chill index, by a controller, according to one embodiment of the present invention.

Referring to FIG. 26, the controller 53 may control the flow generator 204 to direct forced airflow to the user's body through the air outlet 201 based on the thermal sensor information and a wind-chill index. At step S200, the controller 53 receives information from the thermal sensor. The information may for example, reflect an air temperature in the vicinity of the bar 200, if the thermal sensor location is the location of sensor 209 as shown in FIG. 15.

In step S210, the controller 53 receives the revolutions per minute (RPM) of the flow generator 204. In this configuration, the RPM of the flow generator 204 is variable. In a configuration where the flow generator 204 is not variable, but fixed, the controller 53 may retrieve the RPM stored in the memory 58. The RPM of the flow generator 204 is equated to an airflow speed of the forced airflow.

In step S220, the controller 53, having the air temperature at the bar 200 and the airflow speed of the forced airflow, may determine the wind chill index. One equation that the controller 53 may use to derive the wind chill index may be the equation provided above. The equation may be stored in the memory 58 where it is accessed by the controller 53.

In step S230, the controller 53 determines whether the derived wind chill index is greater than or equal to a predetermined target. The predetermined target may be chosen from among many different temperatures or temperature ranges. For example, the target may be the target surface skin temperature of about 30 to about 32 degrees Celsius. The target may be stored in the memory 58.

If the wind chill index is less than the target, the controller 53 may continue to step S240. In step S240, the controller 53 may increase the temperature of the forced airflow by heating the air flow using the resistance heater 120 at the bar 200, for example. The controller 53 may continue to step S200 and then repeat steps S200 to S230. Since the thermal sensor is close to the air outlet 201, the thermal sensor may sense an increase in temperature. Also, step S210 may be skipped where the RPM of the flow generator does not change.

As indicated, the controller 53 repeats the process unless and until the controller 53 determines, at step S230, that the wind chill index is greater than or equal to the target. If the wind chill index is greater than or equal to the target, the controller 53 continues to step S250, deactivates the resistance heater 120 and terminates the method.

FIGS. 27A and 27B are views illustrating a user being dried by the bar 200 of the drying apparatus 10 according to an embodiment of the present invention.

Referring to FIGS. 27A and 27B, the bar 200 includes sensor 209 which may be a thermal sensor positioned such that it faces the user when the user is present at the drying face 14 of the body 100. While the bar 200 may be located at any position along the longitudinal length L1 of the drying face 14 of the body 100, in the present embodiment the starting position of the bar 200 may be somewhere approximating a middle portion of the drying face 14. When the drying apparatus 10 is activated, the bar 200 may be driven upward by the drive apparatus 11 in the direction of arrow 1. Coincidently, the thermal sensor may be activated.

As the bar 200 is driven upward, the thermal sensor scans the user. When the thermal sensor no longer detects thermal heat from the user, then the height of the user is determined to have been reached and the drive apparatus 11 may stop the movement of the bar 200. The drive apparatus 11 now may move the bar 200 downwards in the direction of arrow 2. At the same time the thermal sensor scans the user. The thermal sensor may operate to detect wetness at the part of the user being scanned. The thermal sensor may detect wetness on the user as being a cooler temperature and dryness as being a warmer temperature. The flow generator 204 and perhaps the resistive heater 120 may be activated to dry the user.

In another configuration, the flow generator 110 and perhaps the thermoelectric device 117 may be activated to dry the user. The flow generator 110 and the thermoelectric device 117 may be operated in combination with the operation of the flow generator 204 and the resistive heater 120 of the bar 200. The flow generator 110 and the thermoelectric device 117 may be continuously operated until the bar 200 has reached the bottom of the drying face 14 and then the flow generator 110 and the thermoelectric device 117 may be deactivated.

As shown in FIG. 27B, the bar 200 may be positioned by the head of the user. Because hair usually retains a lot of water, the thermal sensor may detect significant wetness when the bar 200 is in this position. Accordingly, the bar 200 may not move while the second air outlet 201 expels heated forced airflow to dry the user's head. When the thermal sensor detects that the user's head is sufficiently dry the drive apparatus 11 may move the bar 200 downwards in the direction of the arrow 2.

As the bar 200 moves downward in the direction of the arrow 2, the heated forced airflow expelled from the second air outlet 201 may dry the head, the body, and eventually the legs. While the bar 200 is transitioning from the head to the legs, the bar may stop, dry parts of the user which are more wet than other parts, before moving further down in the direction of arrow 2, until the bar 200 has reached to the bottom of the drying face 14.

In another embodiment, the bar 200, after initially reaching the head of the user, may move up and down repeatedly from head to toe until the thermal sensor senses that the user is dry. The movements of the bar described are exemplary and other forms of movement of the bar to dry the user may be conceived.

FIG. 28 is a flowchart illustrating an exemplary method for drying a user, by the controller, according to an embodiment of the present invention.

Referring to FIG. 28, in step S300, the controller 53 moves the bar 200 upward with respect to the body 100. The controller 53 also receives heat information from the thermal sensor. In step S310, the controller 53 determines whether the thermal sensor detects heat. If the thermal sensor detects heat, the controller 53 continues to move the bar 200 upward in step S300. Otherwise, if the thermal sensor does not detect heat, the controller 53 stops the movement of the bar 200, on the assumption the bar 200 has reached the height of the user, and continues to step S320.

In step S320, the controller 53 moves the bar 200 downward by a predetermined amount, such as one width of the user's body covered by the forced airflow from the bar 200. In step S330, the controller 53 operates the flow generator 204. In this step, the controller 53 may also activate the flow generator 110 and perhaps the thermoelectric device 117. Thus forced airflow from the air outlet 201 may dry a corresponding part of the user adjacent to the bar 200. Also, the forced airflow from the air outlet 101 may aid in the drying of the user. The controller 53 then continues to step S340.

In step S340, the controller 53 determines whether the thermal sensor detects heat greater than or equal to a predetermined amount. The predetermined amount may indicate that the part of the user is sufficiently dry. If the thermal sensor detects heat less than the predetermined amount, the controller 53 continues with step S330 where the controller 53 continues to dry corresponding the part of the user. Otherwise, the controller 53 continues to step S350.

In step S350, the controller 53 determines whether the bar 200 has reached the bottom of the drying face 14 of the body 100. If the bar 200 has not reached the bottom of the drying face 14, the controller 53 continues to step S320, and repeats steps S320 to S340. Otherwise, if the bar 200 has reached the bottom of the drying face 14, the controller 53 deactivates the flow generator 204 and the resistance heater 120. If the flow generator 110 and the thermoelectric device 117 were activated, the controller 53 deactivates these as well.

FIG. 29 is an exploded view of an upper region of the drying apparatus 10 illustrating an exploded view of a filter unit according to an embodiment of the present invention; and FIG. 30 is another exploded view of the filter unit according to an embodiment of the present invention.

The filter unit 104 may provide one or more filtrations or treatments to inlet air flow. Ambient air, particularly in cities or other urban settings, may contain undesirable levels of particulate matter. Such particulate matter may be harmful to a person's health, and may also have undesired effects on a person's skin if blown onto the person when using the drying apparatus to dry their body.

For example, particulate matter may be either basic or acidic, and thus cause damage to a user's body. The filter unit 104 may comprise one or more particulate filters 113, such as is seen in FIG. 30, to capture particulate matter. The one or more particulate filters 113 may be in the form of any commonly available filter, for example, a fiberglass filter, a polyester filter, or a High Efficiency Particulate Air (HEPA) filter.

Ambient air is also likely to contain bacteria and viruses, which may pose a risk of infection to a user of the drying apparatus. If not entrained by a particulate filter 113, a filter unit 104 may include a bacterial and/or viral filter 114. Such a filter may include antimicrobial or antibacterial elements.

It may be desirable to reduce or remove moisture in inlet air before it is vented for drying. The filter unit 104 may include one or more dehumidifying filters 115, having for example a desiccant material.

In the present embodiment, a pair of air inlets 102 each pass the inlet air to the filter unit 104. The use of a single filter unit 104 may be desirable particularly where there are multiple flow generators to provide for a single point of servicing of any filters within the filter unit.

FIG. 31 is a front view of an air inlet and an inlet pathway at a flow generator housing according to an embodiment of the present invention; and FIG. 32 is an exploded view of the air inlet of FIG. 31.

Referring to FIG. 31, an inlet pathway, which involves the air inlet 102 and the flow guide 116, directs inlet air from the air inlet 102 to the filter unit 104. However, because the drying apparatus 10 may be used in a wet environment, such a bathroom or shower, water may be splashed onto the drying apparatus 10 or into the air surrounding the drying apparatus 10, including the air inlets 102. Additionally, in use, there may be suction at the air inlets 102 due to operation of the flow generators 110 which could pull nearby water into the air inlets 102. It is undesirable that such water enters the drying apparatus 10. In addition to water making its way into the air inlets 102, the flow path may intake other matter passing through the air inlets 102 and into the flow guide 116.

As shown in FIGS. 31 and 32, the air inlets 102 provide for an upwardly deflected flow path into the flow guide 116. This upward deflection may act as a gravitational barrier to the ingress of water or other solid objects into the drying apparatus 10. To further prevent unwanted water or other matter passing into the flow path, an obstruction in the inlet flow path may additionally or alternatively be provided in the form of an inlet filter 111, for example as seen in FIG. 32. This inlet filter 111 may, more specifically, be in the form of a particulate filter, for filtering particles from the inlet air.

Alternatively the inlet filter 111 may be in the form of a macroscopic filter, such as a macroscopic mesh filter for guarding against the inletting of larger matter. Where it is desired to guard against water being drawn in with the inlet air or to dehumidify the inlet air the inlet filter 111 it may include a desiccant material for absorbing water.

As a further measure to dehumidify the inlet air, a resistance heater (not shown) may be placed adjacent to the inlet filter 111. When operated, the resistance heater may heat the inlet air to remove moisture in the air. Further, the resistance heater may remove moisture in the inlet filter 111 to increase the life of the inlet filter 111.

FIG. 33 is a front transparent view of an upper region of a drying apparatus according to another embodiment of the invention. For example, similar to the configuration shown in FIG. 9A, a connection between the flow generators 110 and the first air outlet 101 of the body 100 is such that the outlet of each of the flow generators 110 directly connects to the first air outlet 101 of the body 100. To provide added comfort for a user and/or increased drying efficiency, it may be desirable to further heat the air heated by the thermoelectric device 117. As seen in FIG. 33, air flowing from the filter unit 104 may pass by one side of the thermoelectric device 117 to be selectively heated or cooled.

While FIG. 33 shows a square shaped thermoelectric device 117 covering a portion of the outlet air flow pathway 105, it should be appreciated that the thermoelectric device 117 may be rectangular covering all of the outlet air flow pathway 105. That is, the thermoelectric device 117 may have a rectangular shape that covers all of the filtered air airflow pathway starting from the outlet of the filter unit 104 and ending at the inlet of the flow generator 110. Where the air is to be further heated, it may be desirable to heat the heated air downstream of the flow generator 110.

Thermal elements such as resistance heaters 120 may be provided at the downstream side of respective flow generators 110. The resistance heaters 120 may further heat the air forced by the flow generators 110 towards the first air outlet 101. The resistance heater 120 may be used as a booster to further heat or super heat the air heated by the thermoelectric device 117.

While in FIG. 33, the thermal elements are shown as resistance heaters, any other suitable thermal elements may be used. In other configurations the thermal element may be a thermoelectric device that may be used to selectively heat or cool the air at the downstream side of the flow generator.

FIG. 34 illustrates a view of a drying apparatus 20 according to another exemplary embodiment of the present invention. FIG. 35 shows a cross-sectional view of a body 100 and a bar 200 of the drying apparatus of FIG. 34.

As shown in FIG. 34, in a drying apparatus 20, the first air outlet 101 may be distributed across at least a portion of the drying face of the body 100. Unlike the drying apparatus 10 described above, where the first air outlet 101 runs along a periphery of the body 100, the first air outlet 101 of the drying apparatus 20 includes outlet ducts 123 that are distributed across the face of the drying face 14. In the present embodiment, the outlet ducts 123 are a plurality of vertical slits running along a longitudinal length of the body 100 and disposed across the drying face 14. The outlet ducts 123 are provided in two zones, an upper zone 124 and a lower zone 129. This configuration may allow for differences in venting between different regions of the first air outlet 101.

FIG. 35 shows a cross-sectional view along line B-B' of FIG. 34 through the body 100 and the bar 200 where the first air outlet 101 is a distributed outlet across the drying face 14 of the body 100. In the drying apparatus 20, a pair of flow generators 110 may expel forced airflow to a duct 121 (similar to that shown in FIG. 8), to a duct 122, and finally on to a plurality of outlet ducts 123 from which the forced airflow is vented from the drying apparatus 20. Shown in cross-section is the duct 122 which may receive the forced airflow from the duct 121. The duct 122 may include a plurality of vertical slits running along a longitudinal length of the body 100 corresponding to the vertical slits of the outlet ducts 123. The duct 122 may vent the forced airflow to the plurality of outlet ducts 123 through the plurality of slits which, in turn is vented to the outside of the body 100 by the outlet ducts 123. The duct 122 and the plurality of outlet ducts 123 may comprise the first air outlet 101.

In this embodiment, the bar 200 may receive air from the flow generator or generators 110 of the body 100. For example, the bar 200 may have one or more air inlets, such as air inlets 203 as shown in FIG. 35. One example of a bar 200 having this configuration is shown in FIG. 16. Referring to FIG. 16, the bar 200 having a pair of air inlets 202 at the back side of the bar 200 may receive forced airflow from portions of the plurality of outlet ducts 123 which the pair of air outlets 202 covers. Referring to FIG. 35, the one or more air inlets 203 may receive air from the flow generators 110 in the body 100 and vent the air from the second air outlet 201.

In the present embodiment, the bar 200 is provided with a pair of flow generators 204 that further speeds the forced airflow received from the flow generators 110 of the body 100. However, in other embodiments, the bar 200 is not provided with flow generators 204 and vents the forced airflow received from the flow generators 110 of the body 100 as is. Although not shown, the bar 200 may include resistance heaters 120 as shown in FIG. 18. Although not shown, the bar 200 may include thermoelectric devices instead of resistance heaters. The bar 200 may further air condition the received forced airflow from the body 100. Otherwise, the bar 200 may not include an air conditioning device and may vent forced airflow air conditioned by the thermoelectric devices 117 of the body 100 without further air conditioning the received forced airflow from the body 100.

Referring back to FIG. 34, the drying apparatus 20 may further include a feet resting portion 400 on which a person may place their feet. The duct 122 may continue on to connect to the feet resting portion 400. The duct 122 may supply air flow to one or more air outlets of the feet resting portion 400 through which air vented from the one or more air outlets may dry the feet of the person. In the configuration shown in FIG. 34, the feet resting portion 400 may be configured to retract into the body 100 of the drying apparatus 20, for example, when not in use. However, in other embodiments, the feet resting portion 400 does not retract and may be stationary supported by the floor.

FIG. 36 is an exploded view of the body according to an embodiment of the present.

The body 100 may be covered with molded plastic covering. As shown in FIG. 36, the molded plastic covering may comprise a back panel 140, a side panel 142 and a front panel 144 covering the body 100. In another embodiment, the plastic covering may have a thin metallic plate adhered to its surface. Parts of the plastic covering may be snap fitted together. For example, one part may have a protrusion portion and another part to be fitted to may have a corresponding recess portion. When the two parts are snap fitted together, the protrusion portion fits into the recess portion and the two parts are fixed to each other. The plastic covering form an outer appearance of the body 100 and provide an aesthetically pleasing look. Being snap fitted together, the plastic covering of the body 100 may be removed by pulling the plastic covering off the body 100 and replacing with another plastic covering having a design or pattern meeting the preference of the user, and thereby being customized to the user according to their taste. It should be noted that the plastic covering 230 (see FIG. 18) of the bar 200 may also be removed and replaced with another plastic covering having a design or pattern meeting the preference of the user, and thereby being customized to the user according to their taste.

Embodiments of the drying apparatus described above may be used as an air circulation system, for example, in a confined space such as a bathroom. Description will now be provided of implementations of the drying apparatus as an air circulation system for circulating air. This air circulation may be independent of or used together with an extractor fan.

FIG. 37 shows an air circulation system in a form of a drying apparatus 10 according to an embodiment of the present invention. The drying apparatus 10 may be located within a space 600. While the space 600 will subsequently be described as a bathroom, the space 600 may, for example, be a shower booth or a bathtub booth, which may be located within a bathroom.

The drying apparatus 10 is shown located on a wall of the bathroom 600. The drying apparatus 10 may extend vertically along at least a part of the height of the wall on which it is located.

With reference to FIG. 37, the drying apparatus 10 may include a first air outlet 601 and a second air outlet 602. The two air outlets may be spaced apart along the vertical height of the drying apparatus, with the first air outlet 601 located higher than the second air outlet 602.

For use as an air circulation system, the drying apparatus 10 such as shown in FIG. 37 may include an air conditioning system to generate hot air and/or cold air and a flow generator or flow generators to generate forced airflow to the first air outlet 601 and the second air outlet 602. Embodiments of a drying apparatus having these features have been described above.

For example, an air conditioning device to generate hot air and/or cold air may include one or more thermoelectric devices 117. An air conditioning device to generate just hot air may include one or more resistance heaters 120. The drying apparatus 10 having such air conditioning devices and one or more flow generators may expel forced airflow 603 from the first air outlet 601 which may have a temperature different from the forced airflow 604 expelled from the second air outlet 602. To generate a circulating air flow within the bathroom 600, the forced airflow 603 from the first air outlet airflow 601 may have a different temperature to that of the forced airflow 604 from the second air outlet airflow 602 which will be further described below.

The drying apparatus 10 expels forced airflow 603 from the first air outlet airflow 601 which has a colder temperature than the forced airflow 604 expelled from the second air outlet airflow 602. This relative difference in temperature may be achieved by either or both of a cooling of the forced airflow 603 from the first air outlet 601 or a heating of the forced airflow 604 from the second air outlet 602. Any heating or cooling will be understood to generally be with reference to the ambient temperature of the air in the bathroom 600.

In the present embodiment, the forced airflow 603 from the first air outlet 601 is cooled while the forced airflow 604 from the second air outlet 602 is heated. In another embodiment the temperature difference may be provided by a heating of the forced airflow 604 from the second air outlet 602 with no forced airflow 603 being expelled from the first air outlet 601 or the forced airflow 603 is expelled from the first air outlet 601 at ambient temperature (e.g., the forced airflow 603 is expelled with no air conditioning being performed on the forced airflow 603).

Where the forced airflow 603 from the first air outlet 601 has been cooled by the air conditioning system of the drying apparatus 10, the forced airflow 603 may cool the air surrounding the first air outlet 601 to a temperature lower than the ambient air temperature. The cooled air may be relatively denser than the ambient air and may begin to sink as falling airflows 605 and 606. Meanwhile, the forced airflow 604 from the second air outlet 602 is heated to a temperature higher than the ambient air temperature. The forced airflow 604 may heat the air surrounding the second air outlet 602. The heated air may be relatively less denser than the ambient air and may begin to rise from the bottom of the bathroom towards the top as rising airflows 607 and 608.

Where the forced airflow 603 from the first air outlet 601 has been cooled and the forced airflow 604 from the second air outlet 602 has been heated, the temperature difference in relative air density between the first air outlet 601 and the second air outlet 602 may become relatively large, and results in a circulation of the air in the bathroom 600 illustrated as the airflows 605-608 in FIG. 37. The greater the temperature difference is between the first air outlet 601 and the second air outlet 602, the greater the circulation of airflows 605-608 may be amplified.

To increase the effect of any air circulation and to circulate as much air as possible in the bathroom 600, it may be desirable to space the first air outlet 601 and the second air outlet 602 to be apart from each other as far as possible. For example, as shown in FIG. 37, the first air outlet 601 and second air outlet 602 may be located at substantially opposite vertical ends of the drying apparatus 10. By having a temperature difference between the first air outlet 601 and the second air outlet 602 as described above, and having the first air outlet 601 and the second air outlet 602 set apart as shown in FIG. 37, the generated airflows 605-608 may have sufficient circulation, including air speed and flow rate, to circulate the air in most if not all of the bathroom 600.

The circulating air may be sufficient to evaporate the water residuals remaining in the bathroom. The circulating air may be sufficient to expel the moist air or hot and humid air through the bathroom door when opened. In various configurations, the circulating air may be vented through the extractor fan located in the bathroom 600. Various ways in which the circulating air may be used to ventilate the bathroom may be conceived.

In various embodiments a drying apparatus 10 configured to perform air circulation may include a sensor 609. In one embodiment, the sensor 609 may be a humidity sensor under the control of the controller 53. The humidity sensor may sense a humidity level of the bathroom 600 and provide the sensed information to the controller 53. The controller 53 may activate the circulating air operation of the drying apparatus 10 when the humidity level is above a predetermined threshold. In another configuration, the sensor 609 may be a pressure sensor. The pressure sensor under the control of the controller 53 may sense an air pressure within the bathroom 600, and dependent on a sensed change in pressure, the controller 53 may activate the circulating air operation of the drying apparatus 10. For example, an extractor fan (not shown) may be installed in the bathroom 600. When the extractor fan is activated, a change in pressure may be detected by the pressure sensor and sent to the controller 53. The controller 53 may then activate the circulating air operation of the drying apparatus 10. The circulating air operation of the drying apparatus 10 may assist or enhance the extraction of the air in the bathroom 600 by the extractor fan. Besides the sensors described above, other sensors may be used. For example, a thermal sensor may be used to detect hot and humid air. Various sensors may be used to achieve a desired result.

FIG. 38 illustrates a flowchart for control of a circulating air operation of a drying apparatus by a controller dependent on sensed pressure information according to one embodiment of the present invention. In this embodiment, the drying apparatus includes a pressure sensor and the bathroom includes an extractor fan. Referring FIG. 38, a controller such as the previously described controller 53 may beginning at step S400 to monitor the pressure sensor for sensed pressure information in the bathroom. This monitoring may be initiated upon a powering on of the drying apparatus, may be initiated by a user input, or may be initiated automatically subsequent to the use of the drying apparatus to dry a person's body. In one example, the monitoring may be performed while the drying apparatus is in a standby mode.

At step S410, the controller may check if the monitored pressure information matches some predetermined criteria. For example, this may include a predetermined relative or absolute decrease in pressure associated with the activation of an extractor fan in the bathroom. If such predetermined criteria is met, the controller may then operate to step S420.

In another configuration, the operation of the controller leading up to the step S410 may be independent of sensed pressure information. For example, the controller may operate beginning from step S420 when the drying apparatus has completed or is in the process of drying the user without checking the pressure information from the pressure sensor.

At step S420, the controller may operate the flow generator or flow generators to generate a flow of air to the first air outlet and the second air outlet of the drying apparatus. In one configuration, the drying apparatus may take the form illustrated in FIG. 37. That is, the first air outlet and second air outlet may be located at substantially opposite vertical ends of the drying apparatus with the first air outlet being located relatively higher than the second air outlet. At step S430, the controller operates the air conditioning system of the drying apparatus to air condition one or more of the first air outlet airflow and second air outlet airflow. Preferably, the first air outlet airflow and the second air outlet airflow are air conditioned so that there is a temperature difference between the first air outlet airflow and the second air outlet airflow. In the preferred embodiment, the air conditioning system of the drying apparatus may cool the first air outlet airflow and heat the second air outlet airflow. In other embodiments, the air conditioning system may operate differently, some of which has been previously described. The steps S420 and S430 may generate a circulating airflow within the bathroom.

The monitored pressure information matching another predetermined criteria may be utilized to cease the operation of the drying apparatus to provide air circulation. This is shown at step S440. This second predetermined criteria may include a predetermined relative or absolute increase in pressure associated with the switching off of an extractor fan in the bathroom. If the predetermined criteria is met, the controller may operate back to step S400 or otherwise cease the control process. The operating back to step S400 or ceasing of the control process may include switching off the flow generator or flow generators and/or switching off the air conditioning system. If the predetermined criteria is not met, the controller may operate back to step S420 to continue generating the circulating airflow.

FIG. 39 shows an implementation of a drying apparatus for generating or augmenting air circulation in a bathroom according to one embodiment of the present invention. FIG. 40 shows an air conditioning system of the drying apparatus of FIG. 39 to air condition forced airflow from a first air outlet of the body.

Referring to FIG. 39, the drying apparatus 10 is shown with a body 100 having first air outlet 101 and a bar 200 having a second air outlet 201. In this configuration, the drying apparatus 10 further includes a second bar 300 having a third air outlet 301. However, the drying apparatus 10 having the second bar 300 may be an additional component that compliments or augments the bar 200, and the air circulation can be achieved without the second bar 300. The drying apparatus 10 having just the bar 200 can achieve air circulation in the bathroom. However, The use of both the bar 200 and second bar 300 to generate heated airflows may increase the amount of air circulation in the bathroom.

In the air circulation mode, the drying apparatus 10 may position the bar 200 and the second bar 300 to be at an end of the drying apparatus 10 such that the first air outlet 101, and the second air outlet 201 and third air outlet 301 are located at substantially vertical ends of the drying apparatus 10. While the second air outlet 201 and the third air outlet 301 do not necessarily need to be located at the opposite end of the drying apparatus 10, it may be desirable to space the first air outlet 101, and the second air outlet 201 and the third air outlet 301 to be apart from each other as far as possible to achieve optimal air circulation.

Referring now to FIG. 40, the air conditioning system for the first air outlet 101 may be similar to the configuration shown in FIG. 33, and may include a pair of flow generators 110 and a pair of thermoelectric devices 117 (not shown in FIG. 40, but shown in FIG. 33). It should be understood that in other configurations, one or more than two flow generators may be used and/or one or more than two thermoelectric devices may be used. In the present embodiment, the drying apparatus 10 may further include a pair of resistance heaters 120. However, in other configurations, the drying apparatus 10 may not include the resistance heaters 120. While the configuration of the drying apparatus of FIG. 40 may be similar to that of the drying apparatus of FIG. 33, the difference is that the drying apparatus of FIG. 40 includes a pair of dampers 630. These dampers are operable by damper actuators 635 to selectively open or close off a lower region of the first air outlet 101. The damper actuators 635 may be controlled by the controller 53.

An operation of the air circulation mode of the drying apparatus 10 according to the embodiment of FIGS. 39 and 40 will now be described. Once the controller 53 has positioned the bar 200 and the second bar 300 for air circulation of the bathroom as shown in FIG. 39, the controller 53 controls the damper actuators 635 to cause the dampers 630 to close off the duct of the first air outlet 101 at the dampers 630, thereby preventing any forced airflow from flowing into the region of the first air outlet 101 beyond the dampers 630. Then the controller 53 may activate the flow generators 110 to suck in intake air and expel to the first air outlet 101. Meanwhile, the controller 53 may also activate the thermoelectric devices 117 to cool the intake air. The cooled air is sucked in by the flow generators 110 and expelled out towards the first air outlet 101 as cooled forced airflow. The cooled forced airflow flows through the duct of the first air outlet 101 but is prevented from going further than the dampers 630 which blocks the pathway of the duct beyond the dampers 630. Hence, as shown in FIG. 39, the cooled forced airflow is expelled out through the upper region of the first air outlet 101 as cooled forced airflow 603.

Meanwhile, the controller 53 controls the bar 200 and the second bar 300 to expel heated forced airflow. This operation will now be described. The bar 200 may have a configuration similar to the bar shown in FIG. 18. The second bar 300 may also have a similar configuration as the bar shown in FIG. 18, and thus both bars will be described with reference to bar 200. The bar 200 may include a pair of flow generators 204 and a pair of resistance heaters 120. It should be understood that in other configurations, one or more than two flow generators may be used and/or one or more than two resistance heaters may be used. In other configurations, a thermoelectric device may used instead of the resistance heater. The controller 53 may activate the flow generators 204 to suck in intake air which expels the air through the second air outlet 201. Meanwhile, the controller 53 may also activate the resistance heaters 120 to heat the intake air. The heated air is sucked in by the flow generators 204 and expelled out towards the second air outlet 201 as heated forced airflow 604. The second bar 300 may operate similarly to expel out heated forced airflow through the third air outlet 301 as heated forced airflow 614.

Where the forced airflow 603 from the first air outlet 101 has been cooled and the forced airflows 604 and 614 from the respective second air outlets 201 and 301 have been heated, there is a relative temperature difference between the first air outlet 101, and the second air outlet 201 and the third air outlet 301. The greater the temperature difference is between the first air outlet 101, and the second air outlet 201 and the third air outlet 301, the greater the circulation of airflows 605-608 may be amplified. The temperature difference in relative air density between the first air outlet 101, and the second air outlet 201 and the third air outlet 301 may result in a circulation of the air in the bathroom 600 illustrated as the airflows 605-608 in FIG. 39. The circulation of the air in the bathroom will now be described.

The forced airflow 603 may cool the air surrounding the first air outlet 101 to a temperature lower than the ambient air temperature. The cooled air may be relatively denser than the ambient air and may begin to sink as falling airflows 605 and 606. Meanwhile, the forced airflows 604 and 614 from the respective second air outlet 201 and third air outlet 301 may heat the air surrounding the second air outlet 201 and the third air outlet 301. The heated air may be relatively less denser than the ambient air and may begin to rise from the bottom of the bathroom towards the top as rising airflows 607 and 608.

In the present embodiment, the bathroom 600 is provided with an extractor fan 650. This may be a conventional extractor fan which is already installed in the bathroom 600. When the extractor fan 650 is operational, the suction of the extractor fan 650 may accelerate the airflow 608 rising towards the extractor fan 650 which is then sucked out of the bathroom 600 through the extractor fan 650. The extractor fan 650 may be manually operated by the user. In the present embodiment, the extractor fan may be wired/wirelessly operated by the drying apparatus 10. The controller 53 of the drying apparatus 10 may wired/wirelessly activate the extractor fan 650 through the extractor fan switch 655 mounted on the wall of the bathroom or may wired/wirelessly activate the extractor fan 650 directly through a wired/wireless receiver installed at the extractor fan 650. Various configurations may be conceived. For example, the drying apparatus may include a humidity sensor as described above. Based on the humidity of the bathroom 600, the drying apparatus may activate the extractor fan 650 and also activate the air circulation mode. Other sensors may be used, some which have been described above and others that may be conceived based on the present disclosure.

FIG. 41 shows a variation of the configuration of FIG. 39. The drying apparatus of FIG. 41 in the air circulation mode may locate the bar 200 towards an uppermost bound of its travel on the body 100, while the second bar 300 is located towards a lowermost bound of its travel on the body 100. The second bar 300 may include a flow generator or flow generators and a resistance heater or resistance heaters. For example, the second bar 300 may have a configuration similar to that shown in FIG. 18. Similarly, the bar 200 may have a configuration similar to that shown in FIG. 18. In this configuration, the forced air flow 603 from the bar 200 may be an ambient airflow.

It may be desirable that the bar 200 provides a relatively cooler forced airflow than an ambient airflow. The cooler forced airflow may amplify the air circulation effect as the cooler air may be relatively denser than the ambient air and may begin to sink faster as falling airflows 605 and 606. Thus, in another configuration, unlike the second bar 300, the bar 200 may include a flow generator or flow generators and a thermoelectric device or thermoelectric devices instead of a resistance heater or resistance heaters. The bar 200 having a thermoelectric device is able to generate cool air as well as heated air.

In another configuration the body and the bars of the drying apparatus may take a form similar to that illustrated in FIGS. 34-35. The drying apparatus may have the first air outlet 101 distributed across at least a portion of the drying face of the body 100. Unlike the drying apparatus 10 described above, where the first air outlet 101 runs along a periphery of the body 100, the first air outlet 101 of the drying apparatus includes outlet ducts 123 that are distributed across the face of the drying face 14 (see FIG. 34). The outlet ducts 123 are a plurality of vertical slits running along a longitudinal length of the body 100 and disposed across the drying face 14. The outlet ducts 123 are provided in two zones, an upper zone 124 and a lower zone 129. This configuration may allow for differences in venting between different regions of the first air outlet 101.

In the drying apparatus, a pair of flow generators 110 may expel forced airflow to a duct 121, to a duct 122, and finally on to a plurality of outlet ducts 123 from which the forced airflow is vented from the drying apparatus. The duct 122 may receive the forced airflow from the duct 121. The duct 122 may include a plurality of vertical slits running along a longitudinal length of the body 100 corresponding to the vertical slits of the outlet ducts 123. The duct 122 may vent the forced airflow to the plurality of outlet ducts 123 through the plurality of slits which, in turn is vented to the outside of the body 100 by the outlet ducts 123 (see FIG. 35).

In this embodiment, the bar 200 may receive air from the flow generator or generators 110 of the body 100. For example, the bar 200 may have one or more air inlets, such as air inlets 203 as shown in FIG. 35. One example of a bar 200 having this configuration is shown in FIG. 16. Referring to FIG. 16, the bar 200 having a pair of air inlets 202 at the back side of the bar 200 may receive forced airflow from portions of the plurality of outlet ducts 123 which the pair of air outlets 202 covers. Referring to FIG. 35, the one or more air inlets 203 may receive air from the flow generators 110 in the body 100 and expel the air from the second air outlet 201. The bar 200 may further include an air conditioning device such as a thermoelectric device or a resistance heater that air conditions the air received from the body prior to expelling the air from the second air outlet 201. The second bar 300 may have a similar configuration.

An operation of the air circulation mode of the present embodiment will now described. In the air circulation mode, the controller 53 may position the bar 200 in the uppermost bound and the second bar 300 in the lowermost bound of their travel on the body 100. Then the controller 53 may activate the flow generators of the bar 200 to suck in intake air and expel towards the second air outlet 201. The controller 53 may also activate the thermoelectric devices of the bar 200 to cool the intake air. Thus, the flow generators of the bar 200 expel out cool forced airflow 603 from the second air outlet 201. Meanwhile, the controller 53 may activate the flow generators of the second bar 300 to suck in intake air and expel towards the third air outlet 301. The controller 53 may also activate the resistance heaters 120 of the second bar 300 to heat the intake air. Thus, the flow generators of the second bar 300 expel out heated forced airflow 614 from the third air outlet 301.

Where the forced airflow 603 from the second air outlet 201 has been cooled and the forced airflow 614 from the third air outlet 301 have been heated, there is a relative temperature difference between the second air outlet 201, and the third air outlet 301. The greater the temperature difference is between the second air outlet 201 and the third air outlet 301, the greater the circulation of airflows 605-608 may be amplified. The temperature difference in relative air density between the second air outlet 201 and the third air outlet 301 may result in a circulation of the air in the bathroom 600 illustrated as the airflows 605-608 in FIG. 41. The circulation of the air in the bathroom will now be described.

The forced airflow 603 may cool the air surrounding the second air outlet 201 to a temperature lower than the ambient air temperature. The cooled air may be relatively denser than the ambient air and may begin to sink as falling airflows 605 and 606. Meanwhile, the forced airflow 614 from the third air outlet 301 may heat the air surrounding the third air outlet 301. The heated air may be relatively less denser than the ambient air and may begin to rise from the bottom of the bathroom towards the top as rising airflows 607 and 608.

In the configuration where the drying apparatus 10 includes dampers similar to that illustrated in FIG. 40, the forced airflow 603 may be further cooled by the air conditioning system of the body 100. This is further described below.

The controller 53 controls the damper actuators to cause the dampers to close off the duct of the first air outlet 101 at the dampers, thereby preventing any forced airflow from flowing into the region of the first air outlet 101 beyond the dampers. Then the controller 53 may activate the flow generators to suck in intake air and expel to the first air outlet 101. Meanwhile, the controller 53 may also activate the thermoelectric devices to cool the intake air. The cooled air is sucked in by the flow generators and expelled out towards the first air outlet 101 as cooled forced airflow. The cooled forced airflow flows through the duct of the first air outlet 101 but is prevented from going further than the dampers which blocks the pathway of the duct beyond the dampers. Hence, the cooled forced airflow is expelled out through the upper region of the first air outlet 101 as cooled forced airflow which may enhance the cooled forced airflow 603 being expelled from the second air outlet 201. The greater temperature difference between the first air outlet 101 and the second air outlet 201, and the third air outlet 301, may result in an amplification of the circulation of airflows 605-608.

FIG. 41 shows the bathroom 600 provided with an extractor fan 650. This may be a conventional extractor fan which is already installed in the bathroom 600. When the extractor fan 650 is operational, the suction of the extractor fan 650 may accelerate the airflow 608 rising towards the extractor fan 650 which is then sucked out of the bathroom 600 through the extractor fan 650.

Exemplary embodiments of the drying apparatus have been described above. Embodiments may be modified for particular usage or suitability.

For example, regarding the above described embodiments shown in FIGS. 39 and 41, the bars may take the form shown in FIG. 21A-21B where a bar is rotatable to reorient the airflow from an outlet of the bar to achieve a desired result.

For example, the bars may take the forms shown in FIG. 22A-22D having varying configurations of an airflow from an outlet of a bar to achieve a desired result.

For example, the bars may take the forms shown in FIG. 23A-23F having varying configurations of an airflow from an outlet of a bar to achieve a desired result.

Where in the foregoing description reference has been made to elements or integers having known equivalents, then such equivalents are included as if they were individually set forth.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

None of the features recited herein should be interpreted as invoking 35 U.S.C. § 112(f) unless the term "means" is explicitly used.

Many modifications will be apparent to those skilled in the art without departing from the scope of the present invention as herein described with reference to the accompanying drawings.

What is claimed is:

1. An air circulation apparatus comprising:

at least one flow generator to generate an airflow;

an inlet to pass air from surroundings to the at least one flow generator;

a first air outlet and a second air outlet, each air outlet for exhausting the airflow from the at least one flow generator;

a drive apparatus operable to move the second air outlet;

an air conditioning device operable to air condition the airflow to be exhausted from at least the second air outlet; and a controller configured to operate an air circulation mode to circulate air by movably positioning the second air outlet below the first air outlet, operate the at least one flow generator to generate the airflow, and operating the air conditioning device to air condition the airflow to be exhausted from the second air outlet, wherein an air temperature of the exhausted airflow of the second air outlet is greater than an air temperature of the exhausted airflow of the first air outlet, wherein the air circulation apparatus comprises:

a body, a bar, and the drive apparatus provided between the body and the bar and operable to drive the bar relative the body, and the first air outlet is disposed at the body and the second air outlet is disposed at the bar, wherein the first air outlet extends around a periphery of the body, the body comprises one or more dampers, the controller configured to operate the one or more dampers to selectively shut off a lower portion of the first air outlet.

2. The air circulation apparatus of claim 1, wherein the at least one flow generator comprises a first flow generator and a second flow generator, the first flow generator to exhaust the airflow through the first air outlet and the second flow generator to exhaust the airflow through the second air outlet.

3. The air circulation apparatus of claim 1, wherein the controller is configured to move the second air outlet to a lowermost bound of travel of the second air outlet at the air circulation apparatus.

4. The air circulation apparatus of claim 3, wherein the drive apparatus is operable to move the first air outlet, the controller configured to move the first air outlet to an uppermost bound of travel of the first air outlet at the air circulation apparatus.

5. The air circulation apparatus of claim 1, wherein the air conditioning device comprises a first air conditioning device and a second air conditioning device, the controller configured to operate the first air conditioning device to cool the airflow to be exhausted from the first air outlet, and operate the second air conditioning device to heat the airflow to be exhausted from the second air outlet.

6. The air circulation apparatus of claim 5, wherein the first air conditioning device is a thermoelectric device and the second air conditioning device is a resistance heater.

7. The air circulation apparatus of claim 1, wherein the air circulation apparatus comprises a pressure sensor, the controller is configured to receive a signal from the pressure sensor indicating an air pressure change, and initiate the operation of the air circulation mode to circulate air.

8. The air circulation apparatus of claim 1, wherein the air circulation apparatus comprises a humidity sensor, the controller is configured to receive a signal from the humidity sensor indicating presence of humidity, and initiate the operation of the air circulation mode to circulate air.

9. The air circulation apparatus of claim 8, wherein the controller initiating the operation of the air circulation mode to circulate the air includes activating an extractor fan.

10. The air circulation apparatus of claim 1, wherein the controller is configured to operate the drive apparatus to move the bar towards a lowermost bound of travel of the bar at the body.

11. The air circulation apparatus of claim 10, wherein the at least one flow generator comprises:

a first flow generator and a second flow generator, the first flow generator to exhaust the airflow through the first air outlet and the second flow generator to exhaust the airflow through the second air outlet;

the controller configured to operate the dampers to shut off the lower portion of the first air outlet; and the air conditioning device comprises a first air conditioning device and a second air conditioning device, the controller configured to operate the first air conditioning device to cool the airflow to be exhausted from an upper portion of the first air outlet, and operate the second air conditioning device to heat the airflow to be exhausted from the second air outlet.

12. The air circulation apparatus of claim 11, further comprising:

a third bar including a third air outlet;

a third flow generator to exhaust the airflow through the third air outlet;

a third air conditioning device; and the controller configured to operate the drive apparatus to move the third bar towards a lowermost bound of travel of the third bar at the body, and operate the third air conditioning device to heat the airflow to be exhausted from the third air outlet.

13. An air circulation apparatus comprising:

at least one flow generator to generate an airflow;

an inlet to pass air from the surroundings to the at least one flow generator;

a first air outlet and a second air outlet, each air outlet for exhausting the airflow from the at least one flow generator;

a drive apparatus operable to move the second air outlet;

an air conditioning device operable to air condition the airflow to be exhausted from at least the second air outlet; and a controller configured to operate an air circulation mode to circulate air by movably positioning the second air outlet below the first air outlet, operate the at least one flow generator to generate the airflow, and operating the air conditioning device to air condition the airflow to be exhausted from the second air outlet, wherein an air temperature of the exhausted airflow of the second air outlet is greater than an air temperature of the exhausted airflow of the first air outlet wherein the air circulation apparatus comprises:

a body, a bar, a second bar; and the drive apparatus provided between the body, and the bar and the second bar, and operable to drive the bar and the second bar relative the body, and the first air outlet is disposed at the bar and the second air outlet is disposed at the second bar, wherein the body comprises:

a third air outlet extending around a periphery of the body, the body comprises one or more dampers, the controller configured to operate the one or more dampers to selectively shut off a lower portion of the third air outlet.

14. The air circulation apparatus of claim 13, wherein the controller is configured to operate the drive apparatus to move the bar towards an uppermost bound of travel of the bar at the body and move the second bar towards a lowermost bound of travel of the second bar at the body.

15. The air circulation apparatus of claim 14, wherein the at least one flow generator comprises:

a first flow generator and a second flow generator, the first flow generator to exhaust the airflow through the first air outlet and the second flow generator to exhaust the airflow through the second air outlet; and the air conditioning device comprises a first air conditioning device and a second air conditioning device, the controller configured to operate the first air conditioning device to cool the airflow to be exhausted from the first air outlet, and operate the second air conditioning device to heat the airflow to be exhausted from the second air outlet.

16. The air circulation apparatus of claim 15, wherein the controller is further configured to activate an extractor fan.

17. The air circulation apparatus of claim 13, wherein the controller is configured to operate the one or more dampers to shut off the lower portion of the third air outlet; and the air conditioning device comprises a third air conditioning device, the controller configured to operate the third air conditioning device to cool the airflow from an upper portion of the third air outlet.

* * * * *